(12) United States Patent
Liu et al.

(10) Patent No.: US 11,595,164 B2
(45) Date of Patent: Feb. 28, 2023

(54) SELF-CONTAINED SUBFRAME CONFIGURATION METHOD AND APPARATUS

(71) Applicant: Huawei Technologies Co., Ltd., Shenzhen (CN)

(72) Inventors: Yun Liu, Shenzhen (CN); Jian Wang, Beijing (CN); Da Wang, Shenzhen (CN); Yongbo Zeng, Beijiing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 896 days.

(21) Appl. No.: 16/333,113

(22) PCT Filed: Sep. 30, 2016

(86) PCT No.: PCT/CN2016/101310
§ 371 (c)(1),
(2) Date: Mar. 13, 2019

(87) PCT Pub. No.: WO2018/058630
PCT Pub. Date: Apr. 5, 2018

(65) Prior Publication Data
US 2019/0357208 A1  Nov. 21, 2019

(51) Int. Cl.
*H04L 5/00* (2006.01)
*H04L 41/0803* (2022.01)
(Continued)

(52) U.S. Cl.
CPC .......... *H04L 5/003* (2013.01); *H04L 27/2602* (2013.01); *H04L 41/0803* (2013.01);
(Continued)

(58) Field of Classification Search
CPC ..... H04W 16/14; H04W 84/12; H04W 24/10; H04W 88/06; H04W 28/22; H04W 28/06;
(Continued)

(56) References Cited

U.S. PATENT DOCUMENTS

2006/0114877 A1  6/2006  Heo et al.
2011/0149813 A1*  6/2011  Parkvall ............ H04W 72/0446
370/280
(Continued)

FOREIGN PATENT DOCUMENTS

CN  101330372 A  12/2008
CN  102026209 A  4/2011
(Continued)

OTHER PUBLICATIONS

Machine Translation and Abstract of Chinese Publication No. CN104125644, Oct. 29, 2014, 22 pages.
(Continued)

*Primary Examiner* — Un C Cho
*Assistant Examiner* — Rasha K Fayed
(74) *Attorney, Agent, or Firm* — Conley Rose, P.C.

(57) ABSTRACT

A self-contained subframe configuration method includes obtaining configuration information of a self-contained subframe of a current frequency band based on a subframe transmission direction of a neighboring frequency band. The self-contained subframe includes a downlink control (DL-control) field, a first transmission subframe, a second transmission subframe, a guard period (GP), and an uplink control (ULcontrol) field. The first transmission subframe or the second transmission subframe of the self-contained subframe is transmitted in the same subframe transmission direction used during subframe transmission on the neighboring frequency band. Alternatively, the first transmission subframe or the second transmission subframe of the self-contained subframe is transmitted in a guard period of the neighboring frequency band.

20 Claims, 19 Drawing Sheets

(51) Int. Cl.
  *H04W 72/04* (2009.01)
  *H04W 72/14* (2009.01)
  *H04L 27/26* (2006.01)
  *H04W 72/0446* (2023.01)

(52) U.S. Cl.
  CPC ... *H04W 72/0406* (2013.01); *H04W 72/0446* (2013.01); *H04W 72/14* (2013.01)

(58) Field of Classification Search
  CPC ... H04W 28/04; H04W 56/001; H04W 56/00; H04W 52/146; H04W 52/325; H04W 52/346; H04W 52/38; H04W 52/18; H04W 52/281; H04L 41/0803; H04L 5/0092; H04L 5/0094; H04L 5/14; H04L 5/003; H04L 5/00; H04L 5/0044; H04L 5/0037; H04L 5/0007; H04L 5/0082; H04L 5/0053; H04L 5/0041; H04L 5/0098; H04L 27/2602; H04L 27/26; H04L 27/2607; H04L 27/2646; H04L 1/0032; H04L 1/0057; H04L 1/0029; H04L 1/1642; H04L 1/1861; H04L 1/0007; H04B 1/1027; H04B 7/2643; H04B 7/2656; Y02D 30/70
  See application file for complete search history.

(56) References Cited

U.S. PATENT DOCUMENTS

| | | | |
|---|---|---|---|
| 2012/0213116 A1 | 8/2012 | Koo et al. | |
| 2015/0043363 A1* | 2/2015 | Koskinen | H04W 16/14 370/252 |
| 2017/0230994 A1* | 8/2017 | You | H04L 5/0053 |
| 2017/0311276 A1* | 10/2017 | Tsai | H04B 7/0695 |
| 2018/0070192 A1* | 3/2018 | Lee | H04L 27/26265 |
| 2019/0014560 A1* | 1/2019 | Takeda | H04L 1/1861 |
| 2019/0089502 A1* | 3/2019 | Yi | H04W 72/0453 |
| 2019/0103931 A1* | 4/2019 | Yi | H04L 5/001 |
| 2019/0109695 A1* | 4/2019 | Kim | H04L 5/0051 |
| 2019/0173553 A1* | 6/2019 | Park | H04L 27/2607 |
| 2020/0275473 A1* | 8/2020 | Takeda | H04W 72/1289 |
| 2020/0336249 A1* | 10/2020 | Yi | H04L 5/003 |

FOREIGN PATENT DOCUMENTS

| | | | |
|---|---|---|---|
| CN | 102334368 A | | 1/2012 |
| CN | 103430618 A | | 12/2013 |
| CN | 104125644 A | | 10/2014 |
| CN | 105323838 A | | 2/2016 |
| CN | 105451358 A | | 3/2016 |
| EP | 2401884 B1 | | 1/2012 |
| EP | 2717640 A1 | | 4/2014 |
| EP | 3139530 A1 | | 3/2017 |
| WO | 2015176293 A1 | | 11/2015 |

OTHER PUBLICATIONS

Huawei, et al.,"Impact of directional transmission on NR numerology for high frequency bands," R1-164381, 3GPP TSG RAN WG1 Meeting #85bis, Nanjing, China, May 23-27, 2016, 6 pages.
Foreign Communication From a Counterpart Application, PCT Application No. PCT/CN2016/101310, English Translation of International Search Report dated Jan. 25, 2017, 2 pages.
Foreign Communication From a Counterpart Application, PCT Application No. PCT/CN2016/101310, English Translation of Written Opinion dated Jan. 25, 2017, 4 pages.
Huawei, et al., "Overview of frame structure for NR," R1-166102, 3GPP TSG RAN WG1 #86, Aug. 22-26, 2016, 8 pages.
ITL,"On Frame Structure for NR," R1-167754, 3GPP TSG RAN WG1 Meeting#86, Gothenburg, Sweden, Aug. 22-26, 2016, 4 pages.
Foreign Communication From a Counterpad Application, European Application No. 16917380.4, Extended European Search Report dated Aug. 21, 2019, 13 pages.

* cited by examiner

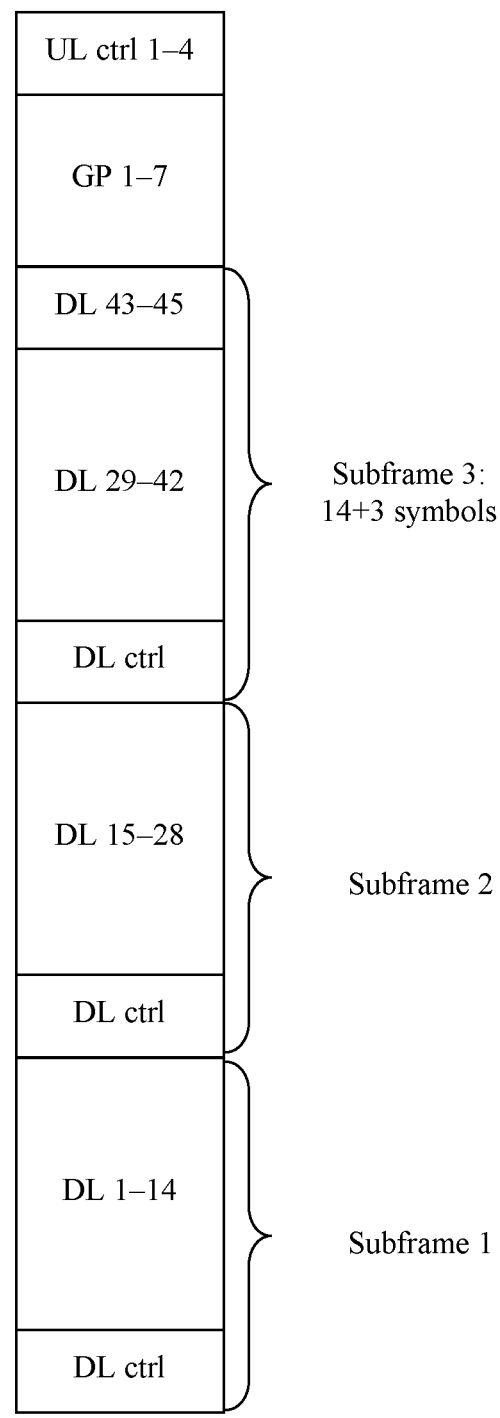
FIG. 5-a

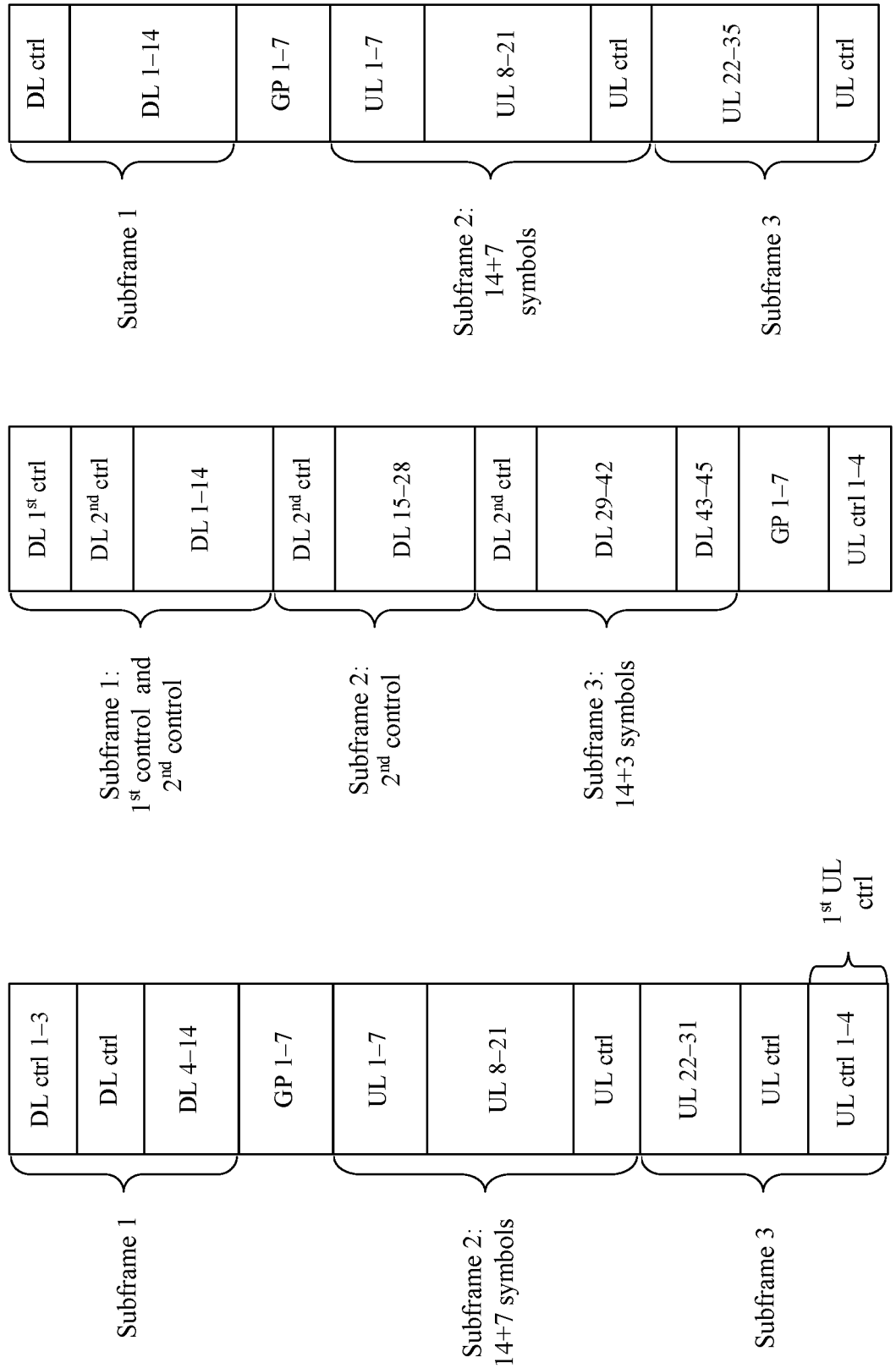

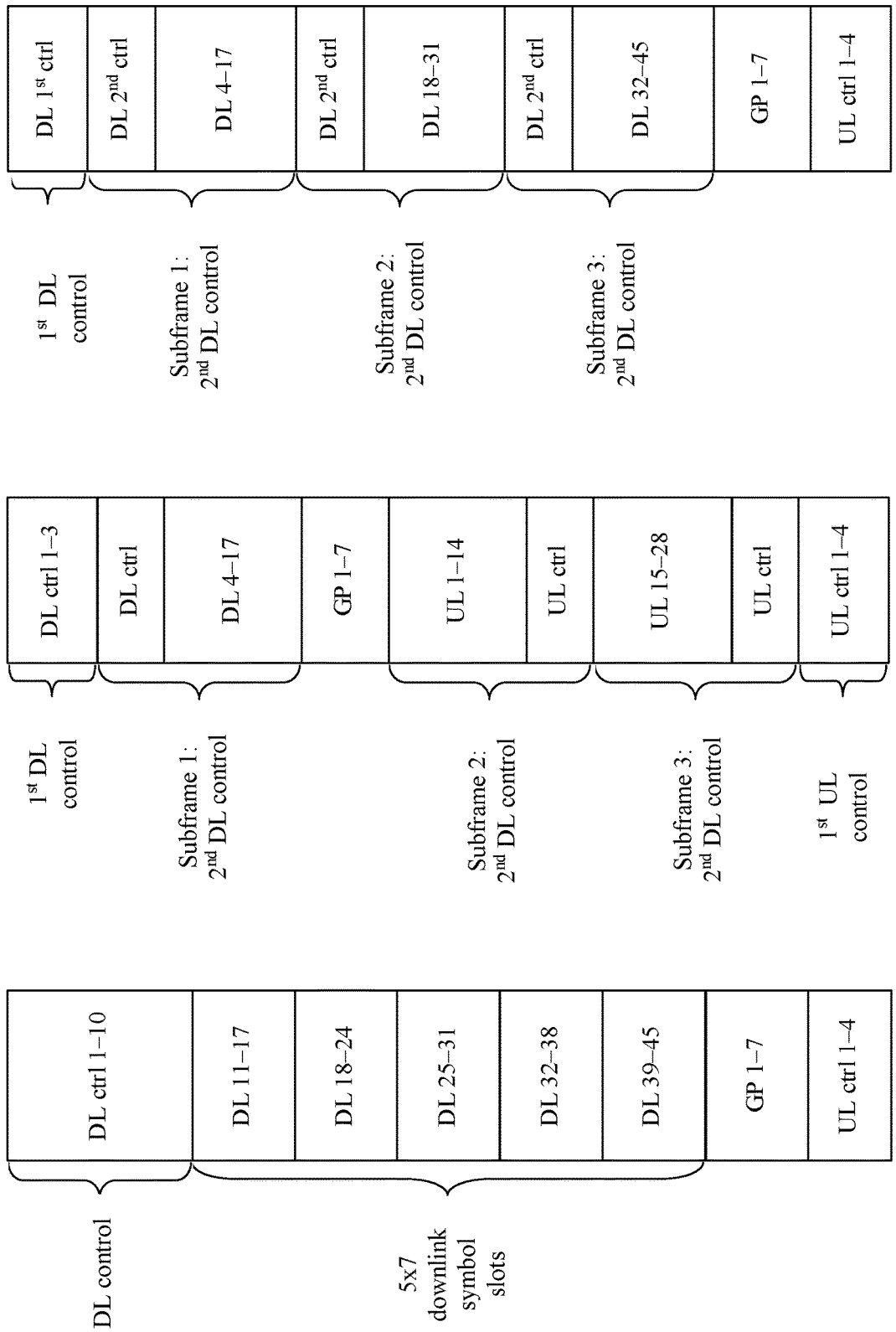

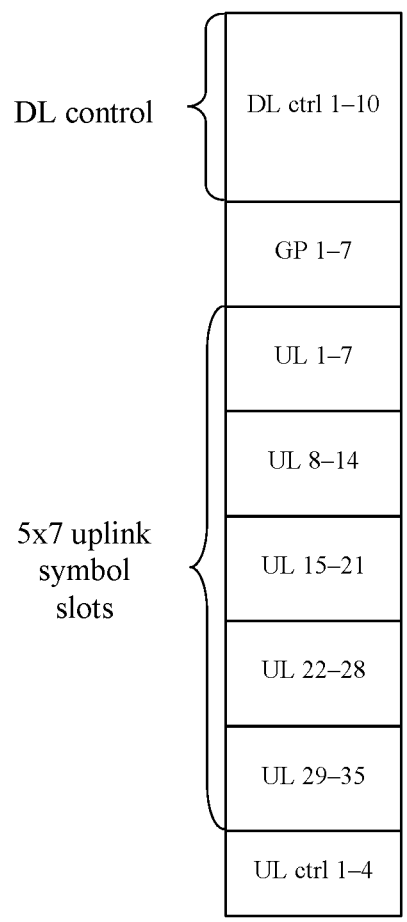
FIG. 5-h
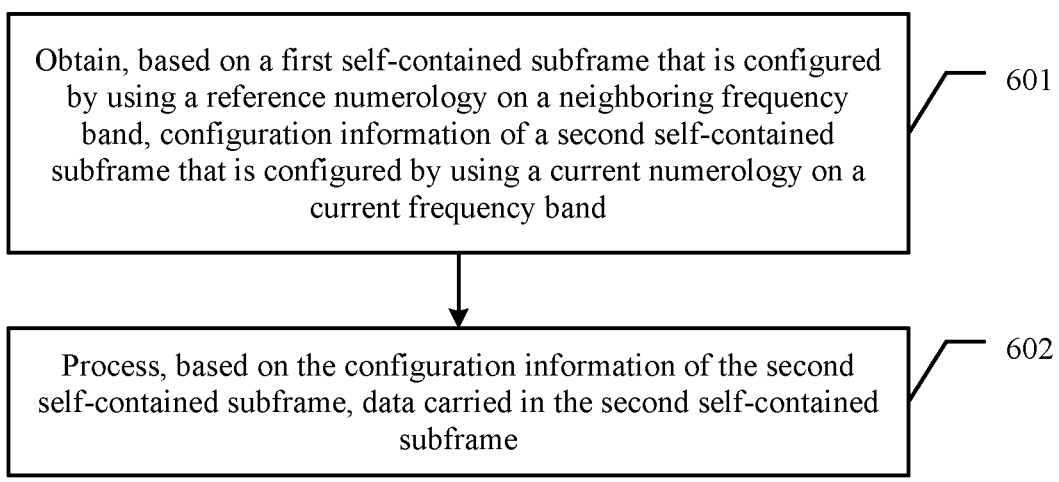
FIG. 6

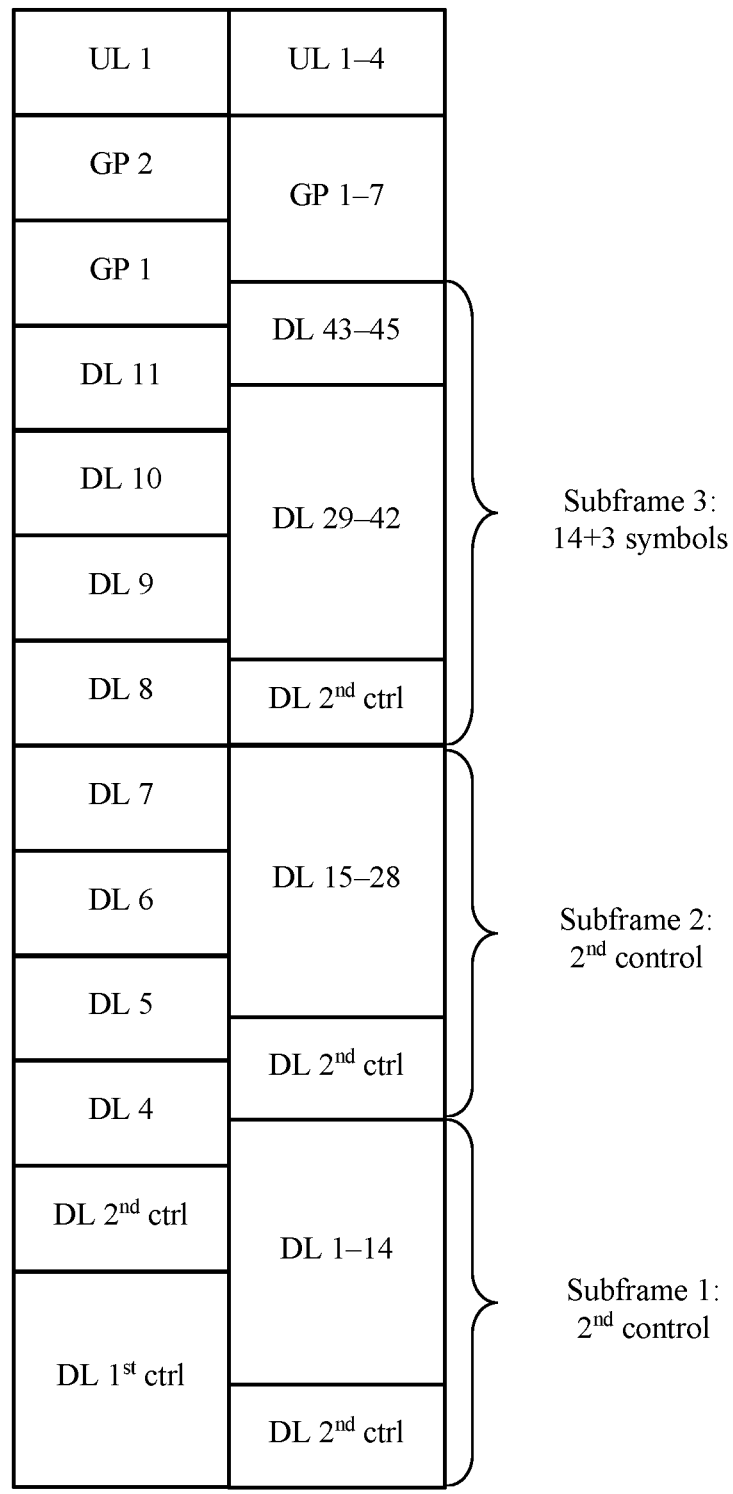
FIG. 7-a

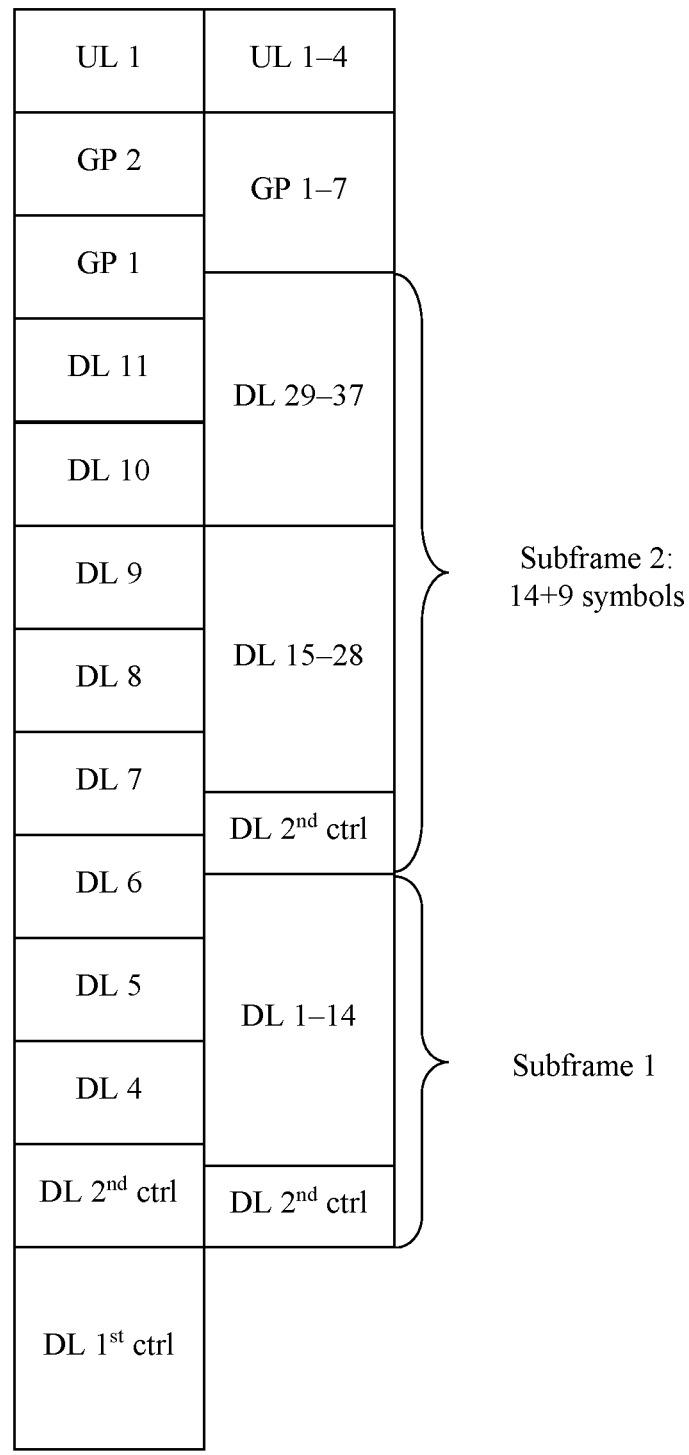
FIG. 7-b

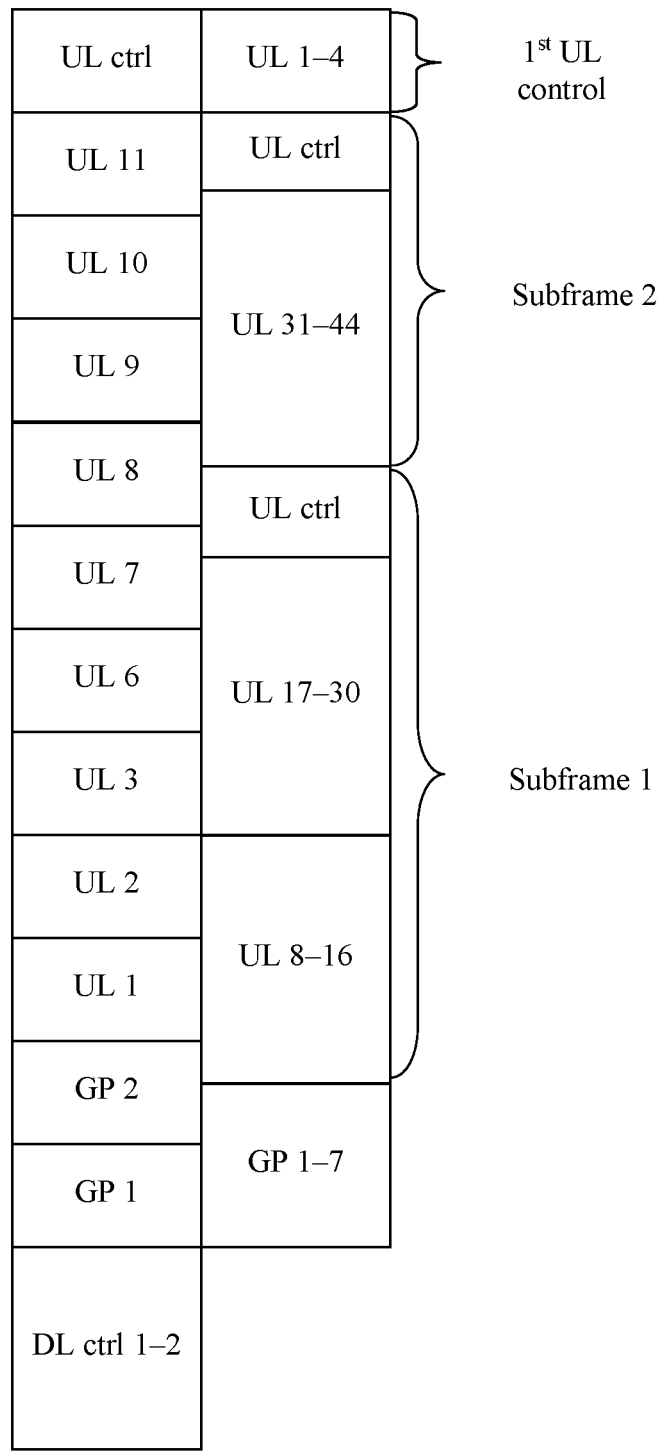
FIG. 7-c

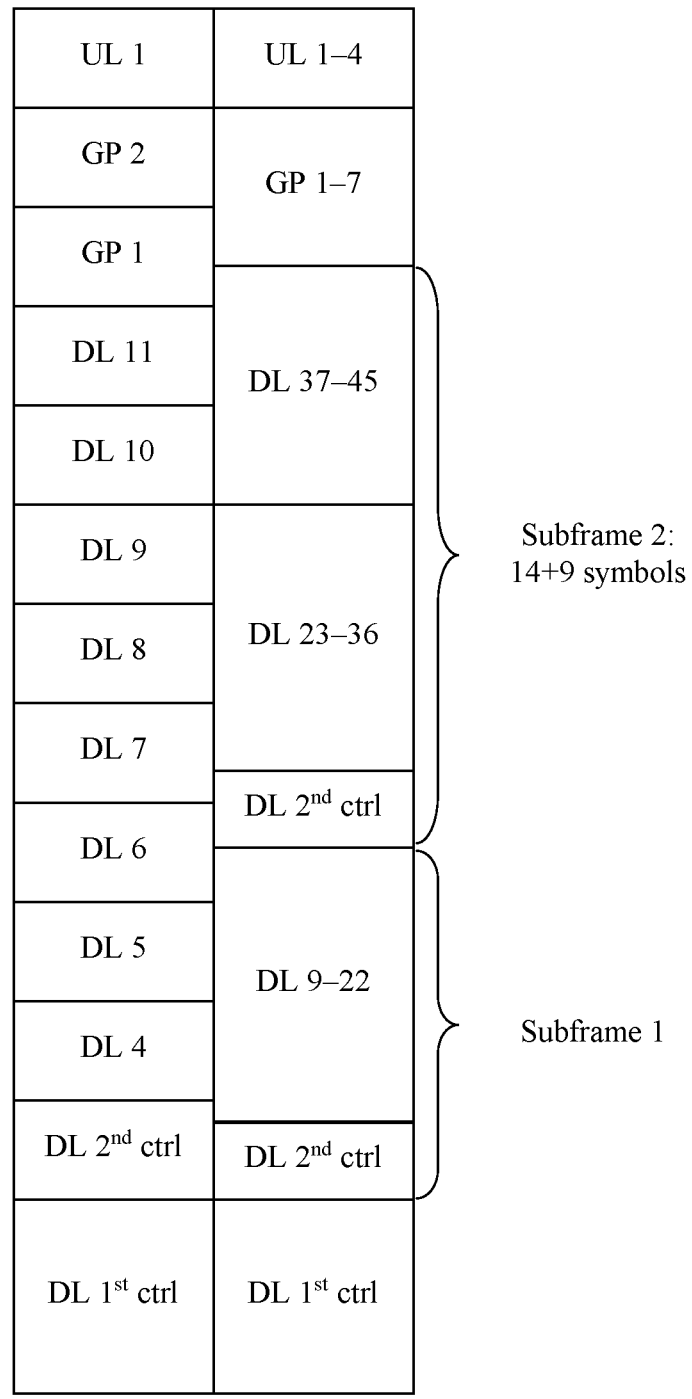
FIG. 7-d

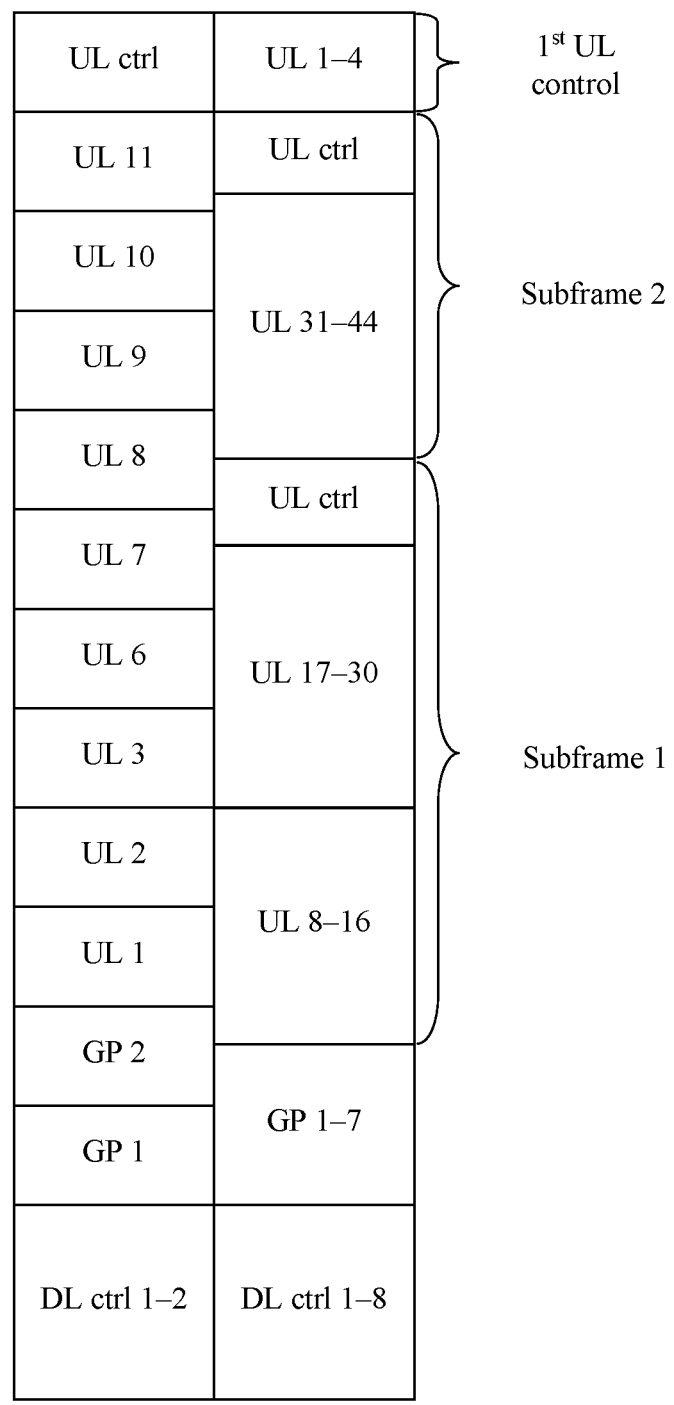
FIG. 7-e

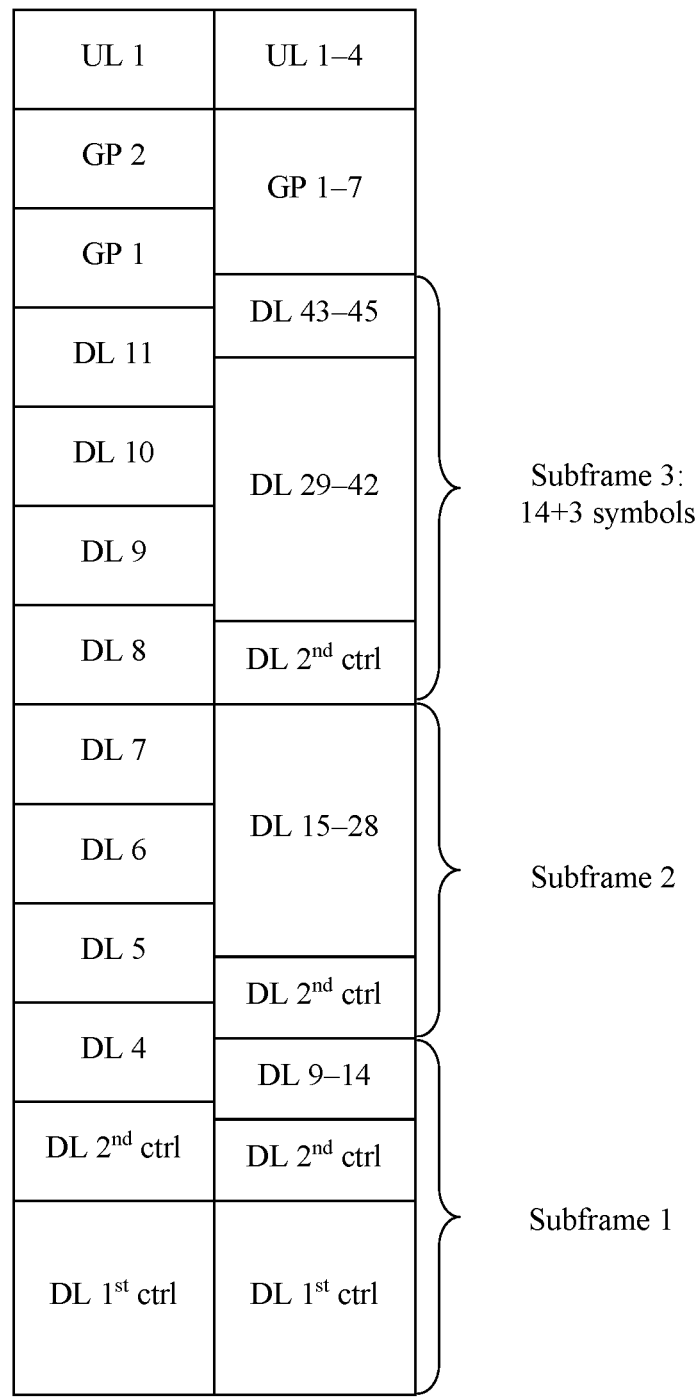
FIG. 7-f

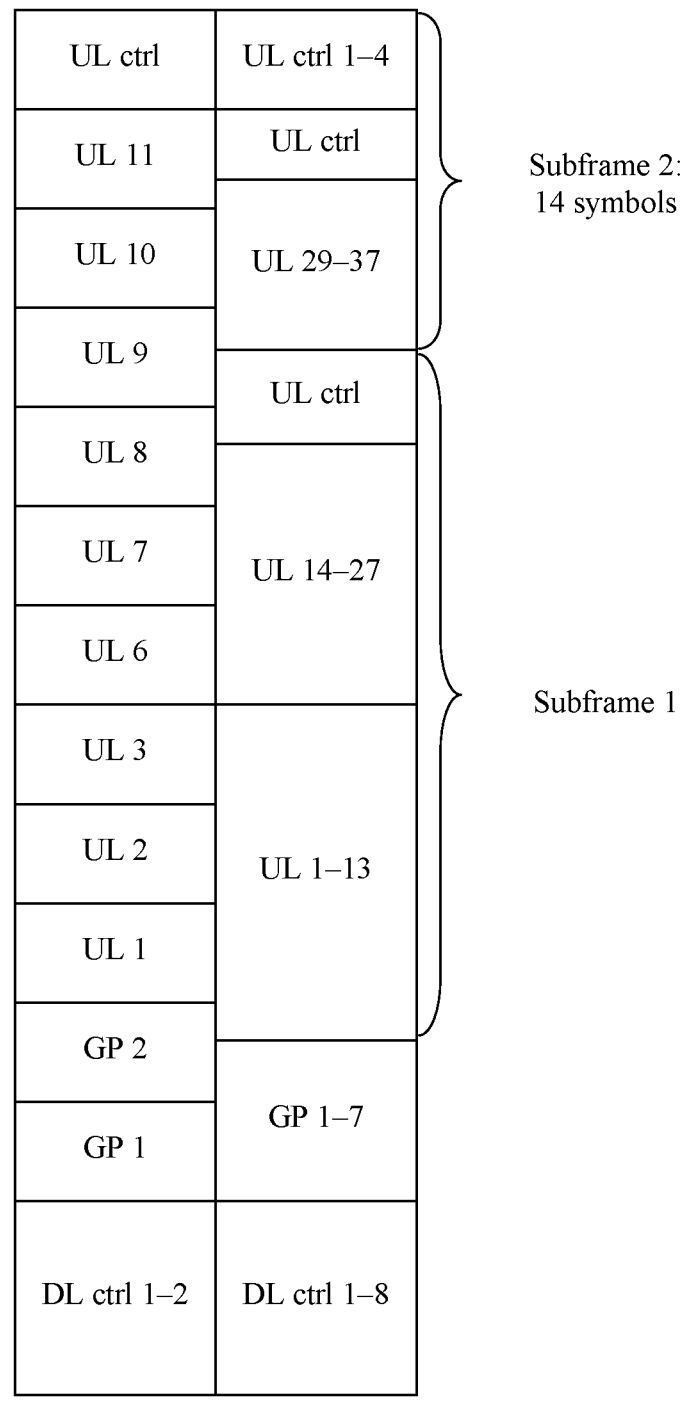
FIG. 7-g

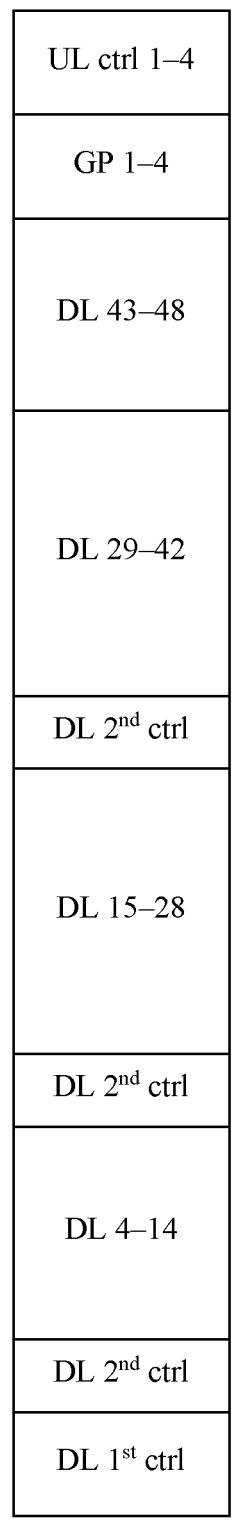
FIG. 7-h

FIG. 7-k

SELF-CONTAINED SUBFRAME CONFIGURATION METHOD AND APPARATUS

CROSS-REFERENCE TO RELATED APPLICATIONS

This application is a U.S. National Stage of International Patent Application No. PCT/CN2016/101310 filed on Sep. 30, 2016, which is hereby incorporated by reference in its entirety.

TECHNICAL FIELD

Embodiments of the present invention relate to the communications field, and in particular, to a self-contained subframe configuration method and apparatus.

BACKGROUND

The 5G New Radio (5G New Radio, 5G NR) protocol is a topic recently proposed by the 3rd Generation Partnership Project (3rd Generation Partnership Project, 3GPP) organization. In the nearly 10 years that have elapsed, the Long Term Evolution (Long Term Evolution, LTE) standard proposed by the 3GPP organization has been widely used worldwide, and is referred to as the 4G communications technology.

As the new-generation 5G technologies enter a discussion phase, whether to continue to use a system structure and an access procedure that have been achieved in the original 4G LTE is still under study. On one hand, because a communications system is backward compatible, a new technology developed later tends to be compatible with a technology that has been previously standardized. On the other hand, because a large quantity of existing designs already exist in 4G LTE, to achieve compatibility, flexibility of 5G is undoubtedly sacrificed greatly, thereby reducing performance. Therefore, currently studying is being undertaken in two parallel research directions in the 3GPP organization, and a technical discussion group that does not consider backward compatibility is referred to as 5G NR.

In a discussion process of 5G NR, a self-contained subframe stricture (Self-contained Structure) is proposed, as shown in FIG. 1. The self-contained subframe includes three parts. The first part is a downlink control (DL control) field, and may transmit a downlink grant (DL grant) or an uplink grant (UL grant), so as to notify user equipment (User Equipment, UE) of a resource configuration manner. The second part is a data (data) part, and may be used by an evolved NodeB (Evolved Node B, eNB) to transmit downlink data, or used by UE to transmit uplink data based on a resource allocated by a previous UL grant. The third part is an uplink control (UL control) field. On the resource, the eNB may reply with an acknowledgement/negative acknowledgement (Acknowledgement/Negative acknowledgement, ACK/NACK) for the previous downlink data or transmit uplink channel state information (Channel State Information, CSI) to assist the eNB in subsequent scheduling. In some cases, the UL control part is occupied by UL data. To distinguish between subframes of different types, a self-contained subframe for transmitting downlink data is referred to as a downlink-dominant self-contained subframe, and a self-contained subframe for transmitting uplink data is referred to as an uplink-dominant self-contained subframe.

In the downlink-dominant self-contained subframe, the eNB notifies the UE of resources on which the eNB will transmit the downlink data; and then, after the DL grant is transmitted, the downlink data is transmitted. After the downlink data is transmitted, a guard period (Guard Period, GP) later, the UE replies with an ACK or a NACK based on a result of decoding the downlink data. In the uplink-dominant self-contained subframe, there are two cases: When the eNB allocates all remaining time of an entire subframe to the UE to transmit uplink data, the UE transmits uplink data after the GP until the subframe ends. In the other case, the eNB allocates only the data part to the UE for uplink transmission. In this case, after the GP, the UE transmits the uplink data based on the resource allocated in the UL grant, and after transmission is completed, the scheduled UE transmits uplink control information such as CSI.

In 5G NR, a plurality of future service types will be supported, for example, automated driving, drone networking, 4 k high definition online video transmission, virtual reality, and augmented reality. Different services have different latency and bandwidth requirements. Correspondingly, carrier spacings may also be different. Transmission of different configuration types based on time domain and frequency domain is shown in FIG. 2. A configuration type is also referred to as a transmission type or a numerology. A meaning of the numerology is a transmission type, and includes parameters such as a subcarrier spacing and symbol duration. When UE or an eNB uses a numerology, transmission is performed by using a subcarrier spacing in the numerology. UE or an eNB may use a plurality of numerologies, for example, several different subcarrier spacings such as 15 kHz, 30 kHz, and 60 kHz, and perform transmission on neighboring frequency bands in frequency domain. FIG. 2 is a schematic diagram of transmission on neighboring frequency bands in a plurality of numerologies.

In the prior art, at least the following technical problems exist: First, transmission in different numerologies is separately scheduled, and mutual interference may occur between neighboring frequency bands. For example, on the neighboring frequency bands, uplink transmission at a 60 kHz subcarrier spacing may occur in case of downlink transmission at a 15 kHz subcarrier spacing. Because uplink and downlink power is greatly different from each other, it is very difficult to implement full filtering and differentiation. Therefore, when a signal from a downlink transmission part is leaked to an uplink transmission part, the signal becomes interference to an uplink transmission receive end. FIG. 3 is a schematic diagram of mutual interference between transmission on neighboring frequency bands in a plurality of numerologies. Uplink transmission at an ACK part and a UL data part in a numerology at a subcarrier spacing of 60 kHz is easily interfered with by a DL data part in a numerology at a subcarrier spacing of 15 kHz.

Therefore, it is necessary to use a new self-contained subframe structure to resolve a problem of mutual interference between neighboring frequency bands.

SUMMARY

Embodiments of the present invention provide a self-contained subframe configuration method and apparatus, and provide a new self-contained subframe structure, to resolve a problem of mutual interference between neighboring frequency bands.

According to a first aspect, an embodiment of the present invention provides a self-contained subframe configuration method, including: obtaining configuration information of a self-contained subframe of a current frequency band based on a subframe transmission direction of a neighboring frequency band, where the self-contained subframe includes a downlink control DLcontrol field, a first transmission subframe, a second transmission subframe, a guard period GP, and an uplink control ULcontrol field, the first transmission subframe or the second transmission subframe of the self-contained subframe is transmitted in the same subframe transmission direction used during subframe transmission on the neighboring frequency band, or the first transmission subframe or the second transmission subframe of the self-contained subframe is transmitted in a guard period of the neighboring frequency band, the first transmission subframe and the second transmission subframe have a same subframe transmission direction, a length of the first transmission subframe is less than or equal to a length of the second transmission subframe, and the GP is set in an interval, in the self-contained subframe, in which an uplink or downlink transmission direction changes and processing, based on the configuration information of the self-contained subframe, data carried in the self-contained subframe.

In this embodiment of the present invention, in the self-contained subframe proposed in 5G NR, to distinguish between different types of subframes, a self-contained subframe for transmitting downlink data is referred to as a downlink-dominant self-contained subframe, and a self-contained subframe for transmitting uplink data is referred to as an uplink-dominant self-contained subframe. However, regardless of the downlink-dominant self-contained subframe or the uplink-dominant self-contained subframe, in transmission on neighboring frequency bands in a plurality of numerologies, transmission of data carried by a self-contained subframe of a current frequency band is affected by a self-contained subframe of the neighboring frequency band, causing mutual interference between the neighboring frequency bands. In this embodiment of the present invention, in a self-contained subframe structure used by UE or an eNB, the GP is set in an interval, in the self-contained subframe, in which uplink and downlink transmission directions change. Therefore, in the self-contained subframe, uplink data transmission and downlink data transmission may be implemented. The first transmission subframe or the second transmission subframe of the self-contained subframe is transmitted in the same subframe transmission direction used during subframe transmission on the neighboring frequency band, or the first transmission subframe or the second transmission subframe of the self-contained subframe is transmitted in the guard period of the neighboring frequency band. The first transmission subframe and the second transmission subframe have the same subframe transmission direction. Therefore, at a moment of uplink subframe transmission on the neighboring frequency band, the self-contained subframe provided in this embodiment of the present invention does not perform downlink transmission; and at a moment of downlink subframe transmission on the neighboring frequency band, the self-contained subframe provided in this embodiment of the present invention does not perform uplink transmission. Therefore, the self-contained subframe structure used by the current frequency band provided in this embodiment of the present invention does not cause mutual interference to a subframe of the neighboring frequency band. Therefore, when data transmission is performed according to the self-contained subframe structure designed in this embodiment of the present invention, a problem of mutual interference between neighboring frequency bands can be avoided, in the self-contained subframe structure in this embodiment of the present invention, the first transmission subframe and the second transmission subframe have the same subframe transmission direction, and the length of the first transmission subframe is less than or equal to the length of the second transmission subframe. Therefore, the first transmission subframe and the second transmission subframe may be configured based on a symbol quantity for specific data that needs to be carried in the self-contained subframe, so that the second transmission subframe becomes a transmission subframe that can accommodate more types of symbol quantities, to meet a requirement that the self-contained subframe needs to carry different data symbol quantities.

With reference to the first aspect, in a first possible implementation of the first aspect, the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is less than a length of the second downlink transmission subframe, and in the self-contained subframe, the second downlink transmission subframe is located after the first downlink transmission subframe; and the downlink control field includes a first downlink control symbol and a second downlink control symbol, the first downlink control symbol is set at a start part of the first downlink transmission subframe, and the second downlink control symbol is set at a start part of the second downlink transmission subframe; the GP is set between the second downlink transmission subframe and the uplink control field; and the uplink control field is set at an end part of the self-contained subframe. In the downlink-dominant self-contained subframe, the downlink control field may be divided into two types of downlink control symbols. A downlink control symbol is set at the start of each of the first downlink transmission subframe and the second downlink transmission subframe, the first downlink control symbol is set at the start part of the first downlink transmission subframe, and the second downlink control symbol is set at the start part of the second downlink transmission subframe, so that a downlink control symbol in each downlink transmission subframe can carry control signaling.

With reference to the first aspect, in a second possible implementation of the first aspect, a difference $N_{rest}$ between the length of the second transmission subframe and the length of the first transmission subframe is calculated as follows:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot};$$

where $N_{sym}$ indicates a quantity of symbols in the self-contained subframe, $N_{GP}$ indicates a quantity of symbols in the GP, $N_{ctrl,UL}$ is a quantity of symbols in the uplink control field, and $N_{slot}$ indicates a quantity of symbols included in one scheduling subframe.

With reference to the first aspect, in a third possible implementation of the first aspect, the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is less than a length of the second uplink transmission subframe, and in the self-contained subframe, the second uplink transmission subframe is located before the first uplink transmission subframe; and the uplink control field includes a first uplink control symbol and a second uplink control symbol, the first uplink control symbol is set at an end part of the first uplink transmission subframe, and the second uplink control symbol is set at an end part of the second uplink transmission subframe; the GP is set between the downlink control field and the second uplink transmission subframe; and the downlink control field is set at a start part of the self-contained subframe. In the uplink-dominant self-contained subframe, the uplink control field may be divided into two types of uplink control symbols. An uplink control symbol is set at the start of each of the first uplink transmission subframe and the second uplink transmission subframe, the first uplink control symbol is set at the end part of the first uplink transmission subframe, and the second uplink control symbol is set at the end part of the second uplink transmission subframe, so that an uplink control symbol in each uplink transmission subframe can carry control signaling.

With reference to the first aspect, in a fourth possible implementation of the first aspect, the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is less than a length of the second downlink transmission subframe, and in the self-contained subframe, the second downlink transmission subframe is located after the first downlink transmission subframe; and the downlink control field includes a first-type downlink control field and a second-type downlink control field, the first-type downlink control field is set at a start part of the self-contained subframe, and the first-type downlink control field is set at a start part of the first downlink transmission subframe; and the second-type downlink control field includes a first downlink control symbol and a second downlink control symbol, the first downlink control symbol is set after the first-type downlink control field in the first downlink transmission subframe, and the second downlink control symbol is set at a start part of the second downlink transmission subframe; the GP is set between the second downlink transmission subframe and the uplink control field; and the uplink control field is set at an end part of the self-contained subframe. The downlink control field may be divided into two levels: the first-type downlink control field and the second-type downlink control field. The first level appears at the start of a new subframe structure, and the second level appears at the start of each subframe, so that a downlink control symbol in each downlink transmission subframe can carry control signaling.

With reference to the first aspect, in a fifth possible implementation of the first aspect, the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is less than a length of the second uplink transmission subframe, and in the self-contained subframe, the second uplink transmission subframe is located before the first uplink transmission subframe; and the uplink control field includes a first-type uplink control field and a second-type uplink control field, the first-type uplink control field is set at an end part of the self-contained subframe, and the first-type uplink control field is set at an end part of the first uplink transmission subframe; and the second-type uplink control field includes a first uplink control symbol and a second uplink control symbol, the first uplink control symbol is set before the first-type uplink control field in the first uplink transmission subframe, and the second uplink control symbol is set at an end part of the second uplink transmission subframe; the GP is set between the downlink control field and the second uplink transmission subframe and the downlink control field is set at a start part of the self-contained subframe. The uplink control field may be divided into two levels: the first-type uplink control field and the second-type uplink control field. The first level appears at the end of a new subframe structure, and the second level appears at the end of each subframe, so that an uplink control symbol in each uplink transmission subframe can carry control signaling.

With reference to the fifth possible implementation of the first aspect, in a sixth possible implementation of the first aspect, the self-contained subframe further includes a downlink transmission subframe, where the downlink control field is set at a start part of the downlink transmission subframe and the downlink control field includes a first-type downlink control field and a second-type downlink control field, the first-type downlink control field is set at a start part of the self-contained subframe, the first-type downlink control field is set at the start part of the downlink transmission subframe, and the second-type downlink control field is set after the first-type downlink control field in the downlink transmission subframe. The downlink control field is set at the start part of the downlink transmission subframe, and the downlink control field may be divided into two levels: the first-type downlink control field and the second-type downlink control field. The first level appears at the start of a new subframe structure, and the second level appears at the start of each subframe, so that the downlink control field in the downlink transmission subframe can carry control signaling.

With reference to the first aspect, in a seventh possible implementation of the first aspect, the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is equal to a length of the second downlink transmission subframe, and in the self-contained subframe, the second downlink transmission subframe is located after the first downlink transmission subframe; the downlink control field includes a first-type downlink control field and a second-type downlink control field, the first-type downlink control field is set at a start part of the self-contained subframe, and the first-type downlink control field is set before the first downlink transmission subframe; and the second-type downlink control field includes a first downlink control symbol and a second downlink control symbol, the first downlink control symbol is set at a start part of the first downlink transmission subframe, and the second downlink control symbol is set at a start part of the second downlink transmission subframe; the GP is set between the second downlink transmission subframe and the uplink control field; and the uplink control field is set at an end part of the self-contained subframe. The first-type downlink control field in the downlink control field is independent of the first downlink transmission subframe, and the length of the first downlink transmission subframe is equal to the length of the second downlink transmission subframe, so as to facilitate subframe transmission.

With reference to the first aspect, in an eighth possible implementation of the first aspect, the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is equal to a length of the second uplink transmission subframe, and in the self-contained subframe, the second uplink transmission subframe is located before the first uplink transmission subframe; the uplink control field includes a first-type uplink control field and a second-type uplink control field, the first-type uplink control field is set at an end part of the self-contained subframe, and the first-type uplink control field is set after the first uplink transmission subframe; and the second-type uplink control field includes a first uplink control symbol and a second uplink control symbol, the first uplink control symbol is set at an end part of the first uplink transmission subframe, and the second uplink control symbol is set at an end part of the second uplink transmission subframe; the GP is set between the downlink control field and the second uplink transmission subframe; and the downlink control field is set at a start part of the self-contained subframe. The uplink control field may be divided into two levels: the first-type uplink control field and the second-type uplink control field. The first level appears at the end of a new subframe structure, and the second level appears at the end of each subframe, so that an uplink control symbol in each uplink transmission subframe can carry control signaling.

With reference to the eighth possible implementation of the first aspect, in a ninth possible implementation of the first aspect, the self-contained subframe further includes a downlink transmission subframe, where the downlink control field is set at a start part of the downlink transmission subframe; and the downlink control field includes a first-type downlink control field and a second-type downlink control field, the first-type downlink control field is set at a start part of the self-contained subframe, the first-type downlink control field is set before the downlink transmission subframe, and the second-type downlink control field is set at a start part of the downlink transmission subframe. The downlink control field is set at the start part of the downlink transmission subframe, and the downlink control field may be divided into two levels: the first-type downlink control field and the second-type downlink control field. The first level appears at the start of a new subframe structure, and the second level appears at the start of each subframe, so that the downlink control field in the downlink transmission subframe can carry control signaling.

With reference to the first aspect, in a tenth possible implementation of the first aspect, the self-contained subframe is specifically a downlink-dominant self-contained subframe, the self-contained subframe includes M downlink transmission subframes, M is a positive integer, the first transmission subframe is specifically a first downlink transmission subframe in the M downlink transmission subframes, the second transmission subframe is specifically a second downlink transmission subframe in the M downlink transmission subframes, a length of the first downlink transmission subframe is equal to a length of the second downlink transmission subframe, and in the self-contained subframe, the second downlink transmission subframe is located after the first downlink transmission subframe: the downlink control field is set at a start part of the self-contained subframe, the downlink control field is set before the first downlink transmission subframe, M downlink control symbols are divided from the downlink control field, the M downlink control symbols are respectively corresponding to the M downlink transmission subframes, and each downlink control symbol is used to transmit control signaling of a corresponding downlink transmission subframe; the GP is set between the second downlink transmission subframe and the uplink control field; and the uplink control field is set at an end part of the self-contained subframe. Each downlink transmission subframe no longer includes the downlink control symbol; instead, the downlink control field is set at the start part of the self-contained subframe, the downlink control symbols corresponding to the downlink transmission subframes are divided from the downlink control field, and each downlink control symbol is used to transmit control signaling of a corresponding downlink transmission subframe.

With reference to the tenth possible implementation of the first aspect, in an eleventh possible implementation of the first aspect, M is calculated as follows:

$$M = \left\lfloor \frac{N_{sym} - N_{GP} - N_{ctrl,UL}}{N_{slot} + 1} \right\rfloor;$$

where $N_{sym}$ indicates a quantity of symbols in the self-contained subframe, $N_{GP}$ indicates a quantity of symbols in the GP, $N_{ctrl,UL}$ is a quantity of symbols in the uplink control field, and $N_{slot}$ indicates a quantity of symbols included in one scheduling subframe; and a quantity $N_{ctrl,DL}$ of symbols in the downlink control field is calculated as follows:

$$N_{ctrl,DL} = N_{sym} - N_{GP} - N_{ctrl,UL} - M \times N_{slot};$$

where $N_{sym}$ indicates the quantity of symbols in the self-contained subframe, $N_{GP}$ indicates the quantity of symbols in the GP, $N_{ctrl,UL}$ is the quantity of symbols in the uplink control field, and $N_{slot}$ indicates a quantity of symbols included in one scheduling subframe.

With reference to the first aspect, in a twelfth possible implementation of the first aspect, the self-contained subframe is specifically an uplink-dominant self-contained subframe, the self-contained subframe includes M uplink transmission subframes, M is a positive integer, the first transmission subframe is specifically a first uplink transmission subframe in the M uplink transmission subframes, the second transmission subframe is specifically a second uplink transmission subframe in the M uplink transmission subframes, a length of the first uplink transmission subframe is equal to a length of the second uplink transmission subframe, and in the self-contained subframe, the second uplink transmission subframe is located before the first uplink transmission subframe; the downlink control field is set at a start part of the self-contained subframe, M downlink control symbols are divided from the downlink control field, the M downlink control symbols are respectively corresponding to the M uplink transmission subframes, and each downlink control symbol is used to transmit control signaling of a corresponding uplink transmission subframe; the GP is set between the downlink control field and the second uplink transmission subframe; and the uplink control field is set at an end part of the self-contained subframe, and the uplink control field is set after the first uplink transmission subframe. Each uplink transmission subframe no longer includes the uplink control symbol; instead, the downlink control field is set at the start part of the self-contained subframe, and the downlink control field is set at the end part of the self-contained subframe. The uplink control symbols corresponding to the uplink transmission subframes are divided from the uplink control field, and each uplink control symbol is used to transmit control signaling of a corresponding uplink transmission subframe.

With reference to the first aspect, in a thirteenth possible implementation of the first aspect, the self-contained subframe includes M transmission subframes, M is a positive integer, the M transmission subframes include a downlink transmission subframe and an uplink transmission subframe, a quantity of downlink transmission subframes is N, N is a positive integer, a quantity of uplink transmission subframes is (M−N), the first transmission subframe and the second transmission subframe belong to the N downlink transmission subframes, or the first transmission subframe and the second transmission subframe belong to the (M−N) uplink transmission subframes, and in the self-contained subframe, the second transmission subframe is located after the first transmission subframe; the downlink control field is set at a start part of the self-contained subframe, M downlink control symbols are divided from the downlink control field, the M downlink control symbols are respectively corresponding to the N downlink transmission subframes and the (M−N) uplink transmission subframes, and each downlink control symbol is used to transmit control signaling of a corresponding transmission subframe; the GP is set between the first transmission subframe and the second transmission subframe; and the uplink control field is set at an end part of the self-contained subframe, and the uplink control field is set after the uplink transmission subframe. The self-contained subframe includes M transmission subframes, and the M transmission subframes are further classified into an uplink transmission subframe and a downlink transmission subframe based on subframe transmission directions, so as to meet a data transmission requirement in a plurality of application scenarios.

According to a second aspect, an embodiment of the present invention further provides a self-contained subframe configuration method, including:

obtaining, based on a first self-contained subframe that is configured on a neighboring frequency band by using a reference transmission type numerology, configuration information of a second self-contained subframe that is configured on a current frequency band by using a current numerology, where the first self-contained subframe includes a first downlink control DLcontrol field, a first transmission subframe, a first guard period GP, and a first uplink control ULcontrol field; and the second self-contained subframe includes a second transmission subframe, a third transmission subframe, a second guard period, and a second uplink control field, where a downlink control command of the second self-contained subframe is determined based on the first downlink control field, the second transmission subframe or the third transmission subframe of the second self-contained subframe is transmitted in a same subframe transmission direction used during subframe transmission on the neighboring frequency band, or the second transmission subframe or the third transmission subframe of the second self-contained subframe is transmitted in the first guard period of the neighboring frequency band, a subframe transmission direction of the second transmission subframe is the same as a subframe transmission direction of the third transmission subframe, a length of the second transmission subframe is less than or equal to a length of the third transmission subframe, the first GP is set in an interval, in the first self-contained subframe, in which an uplink or downlink transmission direction changes, and the second GP is set in an interval, in the second self-contained subframe, in which an uplink or downlink transmission direction changes; and processing, based on the configuration information of the second self-contained subframe, data carried in the second self-contained subframe.

In this embodiment of the present invention, in a self-contained subframe proposed in 5G NR, to distinguish between different types of subframes, a self-contained subframe for transmitting downlink data is referred to as a downlink-dominant self-contained subframe, and a self-contained subframe for transmitting uplink data is referred to as an uplink-dominant self-contained subframe. However, regardless of the downlink-dominant self-contained subframe or the uplink-dominant self-contained subframe, in transmission on neighboring frequency bands in a plurality of numerologies, transmission of data carried by a self-contained subframe of a current frequency band is affected by a self-contained subframe of the neighboring frequency band, causing mutual interference between the neighboring frequency bands. In this embodiment of the present invention, in a self-contained subframe structure used by UE or an eNB, the GP is set in an interval, in the self-contained subframe, in which an uplink or downlink transmission direction changes. Therefore, in the second self-contained subframe, uplink data transmission and downlink data transmission may be implemented. The second transmission subframe or the third transmission subframe of the second self-contained subframe is transmitted in the same subframe transmission direction used during transmission of the first self-contained subframe of the neighboring frequency band, or the second transmission subframe or the third transmission subframe of the second self-contained subframe is transmitted in the guard period of the neighboring frequency band. The second transmission subframe and the third transmission subframe have a same subframe transmission direction. Therefore, at a moment of uplink subframe transmission on the neighboring frequency band, the second self-contained subframe provided in this embodiment of the present invention does not perform downlink transmission; and at a moment of downlink subframe transmission on the neighboring frequency band, the second self-contained subframe provided in this embodiment of the present invention does not perform uplink transmission. Therefore, the second self-contained subframe structure used by the current frequency band provided in this embodiment of the present invention does not cause mutual interference to the subframe of the neighboring frequency band. Therefore, when data transmission is performed according to the second self-contained subframe structure designed in this embodiment of the present invention, a problem of mutual interference between neighboring frequency bands can be avoided. In the self-contained subframe structure in this embodiment of the present invention, the second transmission subframe and the third transmission subframe have the same subframe transmission direction, and the length of the second transmission subframe is less than or equal to the length of the third transmission subframe. Therefore, the second transmission subframe and the third transmission subframe may be configured based on a symbol quantity for specific data that needs to be carried in the second self-contained subframe, so that the third transmission subframe becomes a transmission subframe that can accommodate more types of symbol quantities, to meet a requirement that the self-contained subframe needs to carry different data symbol quantities.

With reference to the second aspect, in a first possible implementation of the second aspect, the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe; the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe; the second self-contained subframe further includes a second downlink control field, the second downlink control field includes a third downlink control symbol and a fourth downlink control symbol, the third downlink control symbol is set at a start part of the second downlink transmission subframe, and the fourth downlink control symbol is set at a start part of the third downlink transmission subframe; and the third downlink control symbol is aligned with the first downlink control symbol, or the third downlink control symbol is aligned with the second downlink control symbol; the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe. In the downlink-dominant second self-contained subframe, a downlink control symbol is set at the start of each of the second downlink transmission subframe and the third downlink transmission subframe, the third downlink control symbol is set at the start part of the second downlink transmission subframe, and the fourth downlink control symbol is set at the start part of the third downlink transmission subframe, so that a downlink control symbol in each downlink transmission subframe can carry control signaling.

With reference to the second aspect, in a second possible implementation of the second aspect, a difference $N_{rest}$ between the length of the third transmission subframe and the length of the second transmission subframe is calculated as follows:

$$N_{rest} = (N_{sym} - N_{GP} - N_{ctrl,UL} - N_{ctrl,DL} \times 2^m) - \left\lfloor \frac{N_{sym} - N_{GP} - N_{ctrl,UL} - N_{ctrl,DL} \times 2^m}{N_{slot}} \right\rfloor \times N_{slot};$$

where $N_{sym}$ indicates a quantity of symbols in the second self-contained subframe, $N_{GP}$ indicates a quantity of symbols in the second GP, $N_{ctrl,UL}$ is a quantity of symbols in the second uplink control field, $N_{slot}$ indicates a quantity of symbols included in one scheduling subframe, $2^m$ is a ratio of a subcarrier spacing in the current numerology to a subcarrier spacing in the reference numerology, and $N_{ctrl,DL}$ indicates a quantity of symbols in the first downlink control field.

With reference to the second aspect, in a third possible implementation of the second aspect, the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, and in the second self-contained subframe, the third uplink transmission subframe is located before the second uplink transmission subframe; the first downlink control field is set at a start part of the first self-contained subframe, and the first downlink control field is set before the first GP; the first GP is set between the first downlink control field and the first uplink transmission subframe, the first uplink control field is set at an end part of the first self-contained subframe, and the first uplink control field is set after the first uplink transmission subframe and the second GP is set before the third uplink transmission subframe, the second uplink control field includes a first-type uplink control field and a second-type uplink control field, the first-type uplink control field is set at an end part of the second self-contained subframe, and the first-type uplink control field is set after the second uplink transmission subframe; and the second-type uplink control field includes a first uplink control symbol and a second uplink control symbol, the first uplink control symbol is set at an end part of the second uplink transmission subframe, the second uplink control symbol is set at an end part of the third uplink transmission subframe, and start moments of the second GP and the first GP are aligned.

With reference to the second aspect, in a fourth possible implementation of the second aspect, the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe; the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe; the second self-contained subframe further includes a second downlink control field, the second downlink control field includes a first-type downlink control field and a second-type downlink control field, the first-type downlink control field is set at a start part of the second self-contained subframe, and the first-type downlink control field is set before the second downlink transmission subframe; the second-type downlink control field includes a third downlink control symbol and a fourth downlink control symbol, the third downlink control symbol is set at a start part of the second downlink transmission subframe, and the fourth downlink control symbol is set at a start part of the third downlink transmission subframe; and the third downlink control symbol is aligned with the second downlink control symbol; the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe. The second self-contained subframe further includes the second downlink control field, and start symbols of the second downlink control field and the first downlink control field are aligned, that is, the third downlink control symbol is aligned with the second downlink control symbol.

With reference to the second aspect, in a fifth possible implementation of the second aspect, the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, and in the second self-contained subframe, the third uplink transmission subframe is located before the second uplink transmission subframe; the first downlink control field is set at a start part of the first self-contained subframe, and the first downlink control field is set before the first GP; the second self-contained subframe further includes a second downlink control field, the second downlink control field is set at a start part of the second self-contained subframe, and the second downlink control field is aligned with the first downlink control field; the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set after the second uplink transmission subframe; and the second-type uplink control field includes a first uplink control symbol and a second uplink control symbol, the first uplink control symbol is set at an end part of the second uplink transmission subframe, and the second uplink control symbol is set at an end part of the third uplink transmission subframe.

With reference to the second aspect, in a sixth possible implementation of the second aspect, the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe; the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe; the second self-contained subframe further includes a second downlink control field, the second downlink control field includes a first-type downlink control field and a second-type downlink control field, the first-type downlink control field is set at a start part of the second self-contained subframe, and the first-type downlink control field is set at a start part of the second downlink transmission subframe; the second-type downlink control field includes a third downlink control symbol and a fourth downlink control symbol, the third downlink control symbol is set after the first-type downlink control field in the second downlink transmission subframe, and the fourth downlink control symbol is set at a start part of the third downlink transmission subframe; and the first-type downlink control field is aligned with the first downlink control symbol; the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe.

With reference to the second aspect, in a seventh possible implementation of the second aspect, the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, a length of the third uplink transmission subframe is greater than a length of the second uplink transmission subframe, and in the second self-contained subframe, the third uplink transmission subframe is located before the second uplink transmission subframe; the first downlink control field is set at a start part of the first self-contained subframe, and the first downlink control field is set before the first GP; the second self-contained subframe further includes a second downlink control field, the second downlink control field is set at a start part of the second self-contained subframe, and the second downlink control field is aligned with the first downlink control field; the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set at an end part of the second uplink transmission subframe; and the second-type uplink control field includes a first uplink control symbol and a second uplink control symbol, the first uplink control symbol is set before the first-type uplink control field in the second uplink transmission subframe, and the second uplink control symbol is set at an end part of the third uplink transmission subframe.

According to a third aspect, an embodiment of the present invention further provides a self-contained subframe configuration apparatus, including: a configuration module, configured to obtain configuration information of a self-contained subframe of a current frequency band based on a subframe transmission direction of a neighboring frequency band, where the self-contained subframe includes a downlink control DLcontrol field, a first transmission subframe, a second transmission subframe, a guard period GP, and an uplink control ULcontrol field, the first transmission subframe or the second transmission subframe of the self-contained subframe is transmitted in the same subframe transmission direction used during subframe transmission on the neighboring frequency band, or the first transmission subframe or the second transmission subframe of the self-contained subframe is transmitted in a guard period of the neighboring frequency band, the first transmission subframe and the second transmission subframe have a same subframe transmission direction, a length of the first transmission subframe is less than or equal to a length of the second transmission subframe, and the GP is set in an interval, in the self-contained subframe, in which an uplink or downlink transmission direction changes; and a data processing module, configured to process, based on the configuration information of the self-contained subframe, data carried in the self-contained subframe.

In the third aspect of the present invention, composition modules of the self-contained subframe configuration apparatus may further perform the steps described in the first aspect and the various possible implementations. For details, refer to the descriptions in the first aspect and the various possible implementations.

According to a fourth aspect, an embodiment of the present invention further provides a self-contained subframe configuration apparatus, including: a configuration module, configured to configure obtaining of, based on a first self-contained subframe that is configured on a neighboring frequency band by using a reference transmission type numerology, configuration information of a second self-contained subframe that is configured on a current frequency band by using a current numerology, where the first self-contained subframe includes a first downlink control DLcontrol field, a first transmission subframe, a first guard period GP, and a first uplink control ULcontrol field; and the second self-contained subframe includes a second transmission subframe, a third transmission subframe, a second guard period, and a second uplink control field, where a downlink control command of the second self-contained subframe is determined based on the first downlink control field, the second transmission subframe or the third transmission subframe of the second self-contained subframe is transmitted in a same subframe transmission direction used during subframe transmission on the neighboring frequency band, or the second transmission subframe or the third transmission subframe of the second self-contained subframe is transmitted in the first guard period of the neighboring frequency band, a subframe transmission direction of the second transmission subframe is the same as a subframe transmission direction of the third transmission subframe, a length of the second transmission subframe is less than or equal to a length of the third transmission subframe, the first GP is set in an interval, in the first self-contained subframe, in which an uplink or downlink transmission direction changes, and the second GP is set in an interval, in the second self-contained subframe, in which an uplink or downlink transmission direction changes; and a data processing module, configured to process, based on the configuration information of the second self-contained subframe, data carried in the second self-contained subframe.

In the fourth aspect of the present invention, composition modules of the self-contained subframe configuration apparatus may further perform the steps described in the second aspect and the various possible implementations. For details, refer to the descriptions in the second aspect and the various possible implementations.

BRIEF DESCRIPTION OF DRAWINGS

FIG. 5-*a* is a schematic structural diagram of a downlink-dominant self-contained subframe in a single numerology according to an embodiment of the present invention;

FIG. 5-*b* is a schematic structural diagram of an uplink-dominant self-contained subframe in a single numerology according to an embodiment of the present invention;

FIG. 5-*c* is a schematic structural diagram of another downlink-dominant self-contained subframe in a single numerology according to an embodiment of the present invention;

FIG. 5-*d* is a schematic structural diagram of another uplink-dominant self-contained subframe in a single numerology according to an embodiment of the present invention;

FIG. 5-*e* is a schematic structural diagram of another downlink-dominant self-contained subframe in a single numerology according to an embodiment of the present invention;

FIG. 5-*f* is a schematic structural diagram of another uplink-dominant self-contained subframe in a single numerology according to an embodiment of the present invention;

FIG. 5-*g* is a schematic structural diagram of another downlink-dominant self-contained subframe in a single numerology according to an embodiment of the present invention;

FIG. 5-*h* is a schematic structural diagram of another uplink-dominant self-contained subframe in a single numerology according to an embodiment of the present invention;

FIG. 6 is a schematic block flowchart of another self-contained subframe configuration method according to an embodiment of the present invention;

Figure 7:
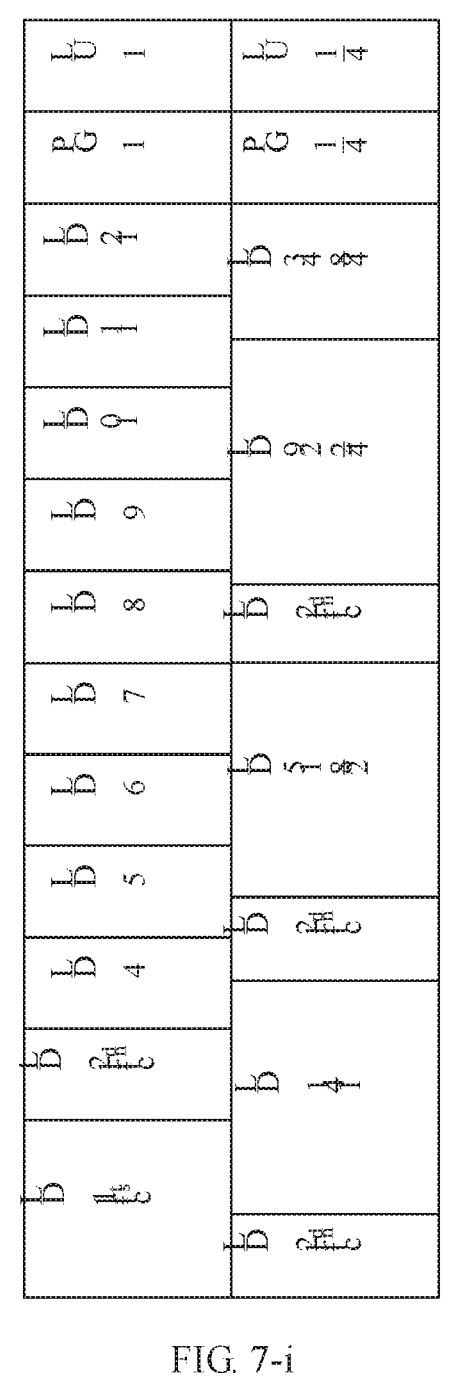
Figure 7:
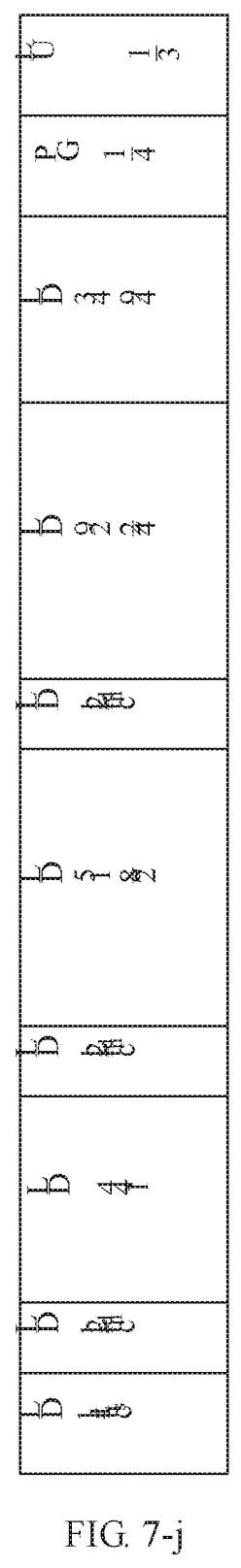
Figure 7:
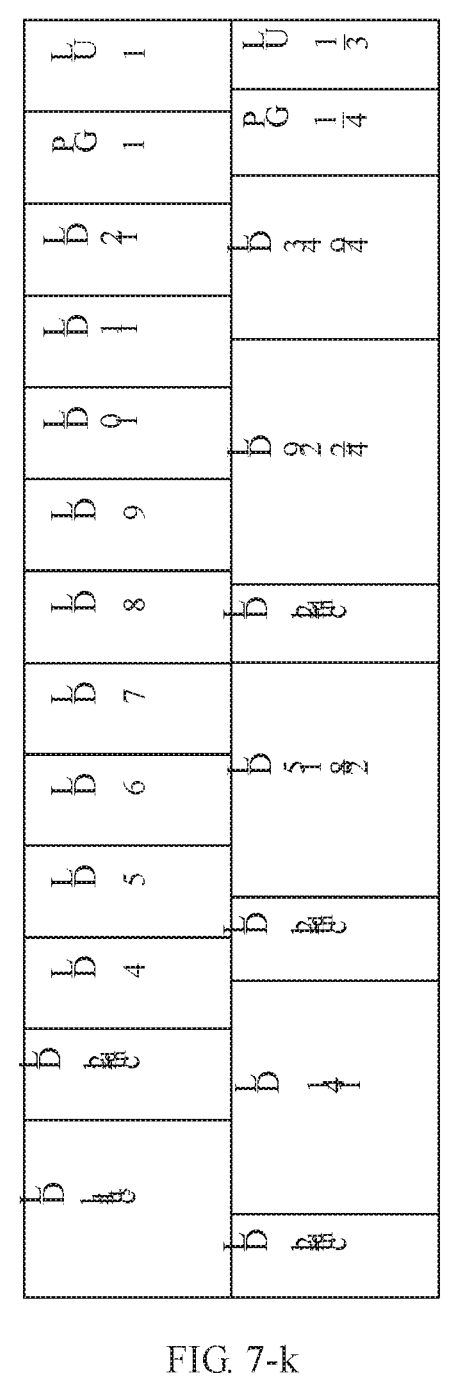

FIG. 7-*a* is a schematic structural diagram of a downlink-dominant self-contained subframe in a plurality of numerologies according to an embodiment of the present invention;

FIG. 7-*b* is a schematic structural diagram of another downlink-dominant self-contained subframe in a plurality of numerologies according to an embodiment of the present invention;

FIG. 7-*c* is a schematic structural diagram of another uplink-dominant self-contained subframe in a plurality of numerologies according to an embodiment of the present invention;

FIG. 7-*d* is a schematic structural diagram of another downlink-dominant self-contained subframe in a plurality of numerologies according to an embodiment of the present invention;

FIG. 7-*e* is a schematic structural diagram of another uplink-dominant self-contained subframe in a plurality of numerologies according to an embodiment of the present invention;

FIG. 7-*f* is a schematic structural diagram of another downlink-dominant self-contained subframe in a plurality of numerologies according to an embodiment of the present invention;

FIG. 7-*g* is a schematic structural diagram of another uplink-dominant self-contained subframe in a plurality of numerologies according to an embodiment of the present invention;

FIG. 7-*h* is a schematic structural diagram of another downlink-dominant self-contained subframe in a single numerology according to an embodiment of the present invention;

FIG. 7-*i* is a schematic structural diagram of another uplink-dominant self-contained subframe in a plurality of numerologies according to an embodiment of the present invention;

FIG. 7-*j* is a schematic structural diagram of another downlink-dominant self-contained subframe in a single numerology according to an embodiment of the present invention;

FIG. 7-*k* is a schematic structural diagram of another uplink-dominant self-contained subframe in a plurality of numerologies according to an embodiment of the present invention;

DESCRIPTION OF EMBODIMENTS

Embodiments of the present invention provide a self-contained subframe configuration method and apparatus, and provide a new self-contained subframe structure, to resolve a problem of mutual interference between neighboring frequency bands.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
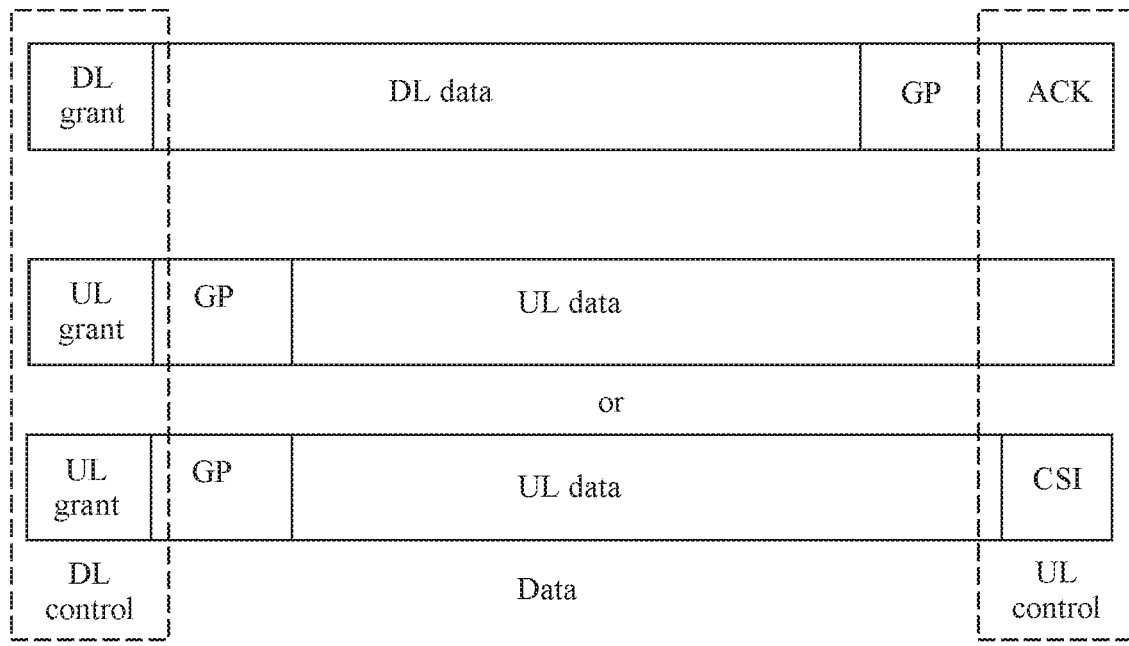
FIG. 1 is a schematic diagram of a frame structure of a self-contained subframe proposed in existing 5G NR.

In an existing self-contained subframe structure shown in FIG. 1, a DL control part at the start of the subframe includes control signaling of an eNB for the entire subframe. For a downlink-dominant subframe structure, DL control transmits a DL grant to notify UE of a time domain location or a frequency domain location at which the eNB will transmit downlink data to the UE, so that the UE listens on a corresponding time domain and frequency domain resource. For an uplink-dominant subframe structure, the DL control part transmits a UL grant to notify UE that the UE should perform uplink transmission on which time domain and frequency domain resources. A UL control part at the end of the subframe includes control signaling fed back by the UE to the eNB. The signaling of this part may be an ACK/NACK reply to downlink data of a current subframe or a previous subframe, or channel related information ted back by the UE such as CSI.

Figure 2:
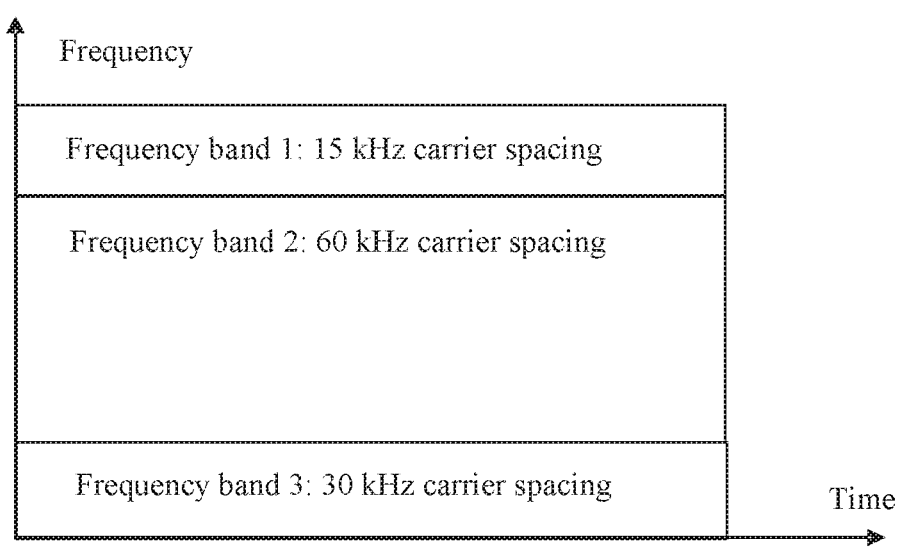
FIG. 2 is a schematic diagram of transmission on neighboring frequency bands of a plurality of numerologies.
Figure 3:
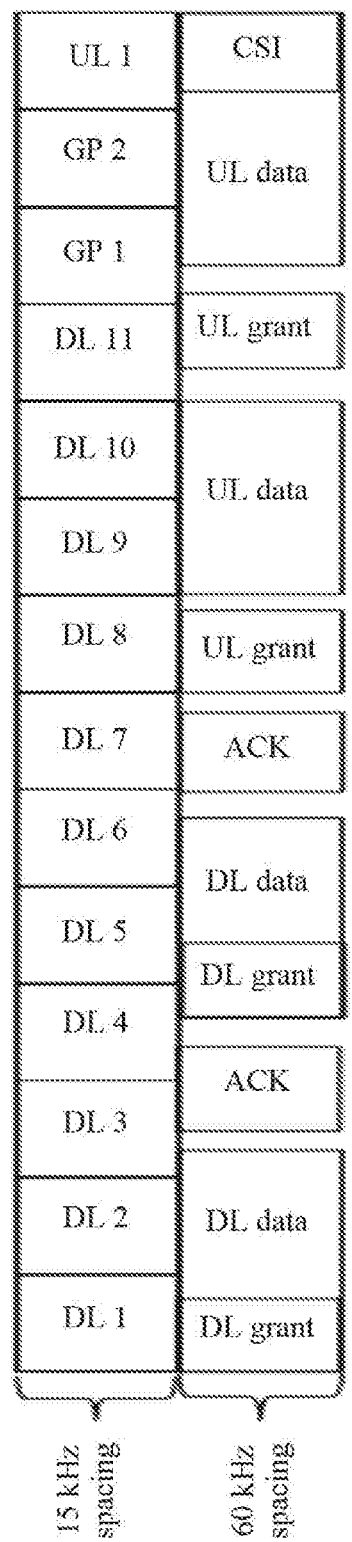
FIG. 3 is a schematic diagram of mutual interference between transmission on neighboring frequency bands of a plurality of numerologies.

In the embodiments of the present invention, FIG. 2 shows a schematic diagram of transmission on neighboring frequency bands of a plurality of numerologies. Based on an existing self-contained subframe (Self-contained Structure), when data carried in self-contained subframes of neighboring frequency bands is simultaneously transmitted on the frequency bands, because subframe carrying directions are different, uplink and downlink power is different greatly, and it is very difficult to implement full filtering and differentiation. For example, when a signal from a downlink transmission part is leaked to an uplink transmission part, the signal becomes interference to an uplink transmission receive end. In consideration of this, in the embodiments of the present invention, a new self-contained subframe structure in 5G NR is redesigned, so that mutual interference between neighboring frequency bands can be avoided fundamentally by redesigning a transmission subframe, a GP, a downlink control field, and an uplink control field that are included in the self-contained subframe. The following uses a specific embodiment as an example for description.

The following provides detailed descriptions separately.

Figure 4:
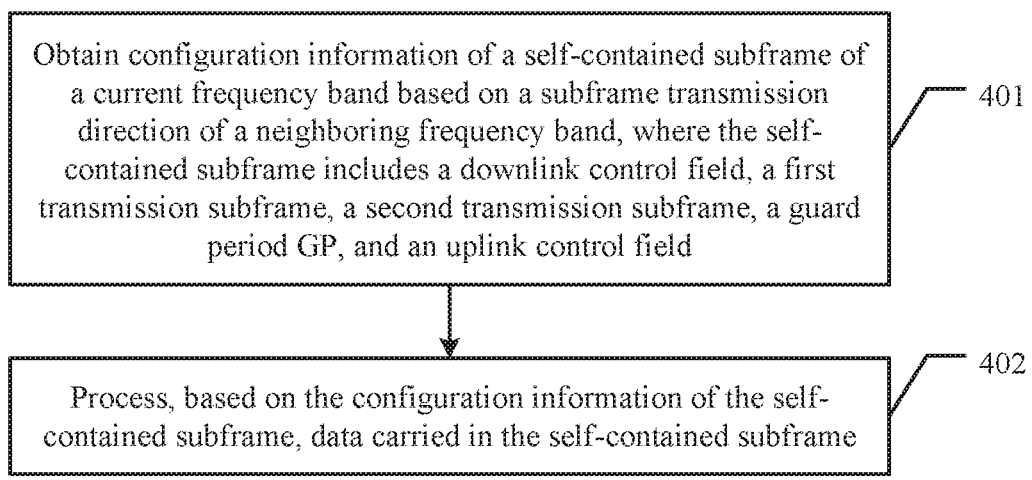
FIG. 4 is a schematic block flowchart of a self-contained subframe configuration method according to an embodiment of the present invention.

An embodiment of a self-contained subframe configuration method in the present invention may be applied to a 5G NR scenario. Referring to FIG. 4, the self-contained subframe configuration method provided in this embodiment of the present invention may include the following steps.

401. Obtain configuration information of a self-contained subframe of a current frequency band based on a subframe transmission direction of a neighboring frequency band, where the self-contained subframe includes a downlink control field, a first transmission subframe, a second transmission subframe, a guard period GP, and an uplink control field.

In this embodiment of the present invention, the first transmission subframe or the second transmission subframe of the designed self-contained subframe of the current frequency band is transmitted in the same subframe transmission direction used during subframe transmission on the neighboring frequency band, or the first transmission subframe or the second transmission subframe of the self-contained subframe is transmitted in a guard period of the neighboring frequency band, the first transmission subframe and the second transmission subframe have a same subframe transmission direction, a length of the first transmission subframe is less than or equal to a length of the second transmission subframe, and the GP is set in an interval, in the self-contained subframe, in which an uplink or downlink transmission direction changes.

In some embodiments of the present invention, step 401 of obtaining the configuration information of the self-contained subframe of the current frequency hand based on the subframe transmission direction of the neighboring frequency band may be specifically: generating, by a base station, the configuration information of the self-contained subframe of the current frequency band based on the subframe transmission direction of the neighboring frequency band; and notifying, by the base station, UE of the configuration information of the self-contained subframe. Alternatively, step 401 of obtaining the configuration information of the self-contained subframe of the current frequency band based on the subframe transmission direction of the neighboring frequency band may be: obtaining, by UE, the configuration information of the self-contained subframe of the current frequency band based on the subframe transmission direction of the neighboring frequency band, so that the UE can parse out a self-contained subframe structure used when a base station sends downlink data, and the UE can also use the self-contained subframe structure when sending uplink data to the base station.

In the self-contained subframe designed in this embodiment of the present invention, the self-contained subframe includes the downlink control DLcontrol the first transmission subframe, the second transmission subframe, the guard period GP, and the uplink control ULcontrol field. In a subsequent embodiment of the present invention, the DL control field is referred to as DLcontrol, and in a schematic diagram of the subsequent embodiment, the DL control field is further abbreviated as DL ctrl. DL control is used to transmit a DL grant to notify UE of a time domain location or a frequency domain location at which an eNB will transmit downlink data to the UE, so that the UE listens on a corresponding time domain and frequency domain resource. In addition, DL control may be further used to transmit a UL grant to notify UE that the UE should perform uplink transmission on which time domain and frequency domain resources. A UL control part at the end of the subframe includes control signaling fed back by the UE to the eNB. The signaling of this part may be an ACK/NACK reply to downlink data of a current subframe or a previous subframe, or channel related information fed back by the UE such as CSI.

In the self-contained subframe structure provided in this embodiment of the present invention, the GP is set in an interval, in the self-contained subframe, in which uplink and downlink transmission directions change. For example, in the self-contained subframe structure provided in this embodiment of the present invention, a transmission direction at a start moment is a downlink transmission direction, a GP is designed after transmission of a transmission subframe in the downlink transmission direction, and after the GP, the transmission direction of the self-contained subframe is adjusted to an uplink transmission direction.

In the designed self-contained subframe of the current frequency band in this embodiment of the present invention, a quantity of transmission subframes included in the self-contained subframe may be specifically determined based on a total quantity of symbols that the self-contained subframe needs to carry. In different application scenarios, quantities of transmission subframes included in the self-contained subframe are different. For example, the self-contained subframe may include two transmission subframes, or may include three transmission subframes, or may include more transmission subframes. This is not limited herein. All transmission subframes included in the self-contained subframe provided in this embodiment of the present invention may include at least two different types of transmission subframes. For ease of description, the two different types of transmission subframes may be respectively referred to as "a first transmission subframe" and "a second transmission subframe". The two types of transmission subframes have a same transmission direction, but have a same subframe length or different subframe lengths (that is, a quantity of symbols included in the subframe). For example, the self-contained subframe provided in this embodiment of the present invention may include three transmission subframes: a subframe 1, a subframe 2, and a subframe 3, respectively. The subframe 1 and the subframe 2 are of a same type, and the subframe 3 has a different type from those of the previous two subframes. In this case, the subframe 1 and the subframe 2 may be referred to as "first transmission subframes", and the subframe 3 may be referred to as "a second transmission subframe". In this embodiment of the present invention, a length of the second transmission subframe may be longer than or equal to a length of the first transmission subframe. Therefore, the first transmission subframe and the second transmission subframe may be configured based on a symbol quantity for specific data that needs to be carried in the self-contained subframe, so that the second transmission subframe becomes a transmission subframe that can accommodate more types of symbol quantities, to meet a requirement that the self-contained subframe needs to carry different data symbol quantities.

In this embodiment of the present invention, the first transmission subframe or the second transmission subframe is transmitted in the same subframe transmission direction used during subframe transmission on the neighboring frequency band, or the first transmission subframe or the second transmission subframe of the self-contained subframe is transmitted in the guard period of the neighboring frequency band. That is, the subframe transmission direction of the self-contained subframe used by the current frequency band is not affected by subframe transmission on the neighboring frequency band. For example, when the neighboring frequency band is in an uplink, the transmission direction of the self-contained subframe used by the current frequency band is also in an uplink, or in this case, the self-contained subframe used by the current frequency band is in a guard period. At a moment of uplink subframe transmission on the neighboring frequency band, the self-contained subframe provided in this embodiment of the present invention does not perform downlink transmission. At a moment of downlink subframe transmission on the neighboring frequency band, the self-contained subframe provided in this embodiment of the present invention does not perform uplink transmission. Therefore, the self-contained subframe structure used by the current frequency band provided in this embodiment of the present invention does not cause mutual interference to a subframe of the neighboring frequency band. Therefore, when data transmission is performed according to the self-contained subframe structure designed in this embodiment of the present invention, a problem of mutual interference between neighboring frequency bands can be avoided.

It should be noted that, in the foregoing embodiment of the present invention, in the self-contained subframe proposed in 5G NR, to distinguish between subframes of different types, a self-contained subframe for transmitting downlink data is referred to as a downlink-dominant self-contained subframe, and a self-contained subframe for transmitting uplink data is referred to as an uplink-dominant self-contained subframe. There may be a plurality of specific subframe configuration manners of the downlink-dominant self-contained subframe and the uplink-dominant self-contained subframe in actual application, which are described in detail by using examples in subsequent embodiments. For details, refer to the subsequent embodiments of the present invention for description.

It should be noted that, a frame structure configuration of the self-contained subframe provided in the foregoing embodiment of the present invention may be a transmission type or a configuration type, or may be referred to as a configuration manner of a self-contained subframe in a numerology. In a subsequent embodiment of the present invention, a configuration manner of a self-contained subframe in a plurality of numerologies is further provided. For details, refer to example description in the subsequent embodiment.

402. Process, based on the configuration information of the self-contained subframe, data carried in the self-contained subframe.

In this embodiment of the present invention, after the configuration information of the self-contained subframe is obtained, the data carried in the self-contained subframe can be processed according to a frame structure of the self-contained subframe. For example, after configuring the configuration information of the self-contained subframe, a base station sends the frame structure configuration of the self-contained subframe to UE, so that the base station can send downlink data to the UE by using the self-contained subframe, and the UE can receive the downlink data according to the pre-obtained frame structure of the self-contained subframe. For another example, after obtaining the configuration information of the self-contained subframe, the UE may send uplink data to the base station by using the self-contained subframe, and the base station may receive the uplink data according to the pre-configured frame structure of the self-contained subframe. A specific processing process of the data carried in the self-contained subframe may be specifically implemented with reference to an application scenario.

It can be learned from the examples of the present invention in the foregoing embodiment that, in the self-contained subframe proposed in 5G NR, to distinguish between different types of subframes, the self-contained subframe for transmitting downlink data is referred to as a downlink-dominant self-contained subframe, and the self-contained subframe for transmitting uplink data is referred to as an uplink-dominant self-contained subframe. However, regardless of the downlink-dominant self-contained subframe or the uplink-dominant self-contained subframe, in transmission on neighboring frequency bands of a plurality of numerologies, transmission of the data carried by the self-contained subframe of the current frequency band is affected by the self-contained subframes of the neighboring frequency bands, causing mutual interference between the neighboring frequency bands. In this embodiment of the present invention, in the self-contained subframe structure used by the UE or the eNB, the GP is set in an interval, in the self-contained subframe, in which uplink and downlink transmission directions change. Therefore, uplink data transmission and downlink data transmission may be implemented in the self-contained subframe. The first transmission subframe or the second transmission subframe of the self-contained subframe is transmitted in the same subframe transmission direction used during subframe transmission on the neighboring frequency band, or the first transmission subframe or the second transmission subframe of the self-contained subframe is transmitted in the guard period of the neighboring frequency band. The first transmission subframe and the second transmission subframe have the same subframe transmission direction. Therefore, at a moment of uplink subframe transmission on the neighboring frequency band, the self-contained subframe provided in this embodiment of the present invention does not perform downlink transmission; and at a moment of downlink subframe transmission on the neighboring frequency band, the self-contained subframe provided in this embodiment of the present invention does not perform uplink transmission. Therefore, the self-contained subframe structure used by the current frequency band provided in this embodiment of the present invention does not cause mutual interference to the subframe of the neighboring frequency band. Therefore, when data transmission is performed according to the self-contained subframe structure designed in this embodiment of the present invention, a problem of mutual interference between neighboring frequency bands can be avoided. In the self-contained subframe structure in this embodiment of the present invention, the first transmission subframe and the second transmission subframe have the same subframe transmission direction, and the length of the first transmission subframe is less than or equal to the length of the second transmission subframe. Therefore, the first transmission subframe and the second transmission subframe may be configured based on a symbol quantity for specific data that needs to be carried in the self-contained subframe, so that the second transmission subframe becomes a transmission subframe that can accommodate more types of symbol quantities, to meet a requirement that the self-contained subframe needs to carry different data symbol quantities.

In some embodiments of the present invention, the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is less than a length of the second downlink transmission subframe, and in the self-contained subframe, the second downlink transmission subframe is located after the first downlink transmission subframe;

the downlink control field includes a first downlink control symbol and a second downlink control symbol, the first downlink control symbol is set at a start part of the first downlink transmission subframe, and the second downlink control symbol is set at a start part of the second downlink transmission subframe;

the GP is set between the second downlink transmission subframe and the uplink control field; and the uplink control field is set at an end part of the self-contained subframe.

For example, in the downlink-dominant self-contained subframe, the downlink control field may be divided into two types of downlink control symbols. A downlink control symbol is set at the start of each of the first downlink transmission subframe and the second downlink transmission subframe, the first downlink control symbol is set at the start part of the first downlink transmission subframe, and the second downlink control symbol is set at the start part of the second downlink transmission subframe, so that a downlink control symbol in each downlink transmission subframe can carry control signaling.

In some embodiments of the present invention, a difference $N_{rest}$ between the length of the second transmission subframe and the length of the first transmission subframe is calculated as follows:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot};$$

where $N_{sym}$ indicates a quantity of symbols in the self-contained subframe, $N_{GP}$ indicates a quantity of symbols in the GP, is a quantity of symbols in the uplink control field, and $N_{slot}$ indicates a quantity of symbols included in one scheduling subframe.

Specifically, in the present invention, cross-subframe scheduling is designed based on a plurality of self-contained subframes, and first a self-contained cross-subframe structure in a single numerology is described. Referring to FIG. 5-*a*, a self-contained subframe provided in this embodiment of the present invention is referred to as a "new subframe" in an example below. A new downlink-dominant subframe structure designed by using a single numerology may include a plurality of symbols. Next, an example in which the self-contained subframe provided in this embodiment of the present invention includes 56 symbols is used for description. The new subframe includes three downlink transmission subframes, a GP, and an uplink control field. According to a preset scheduling unit length $N_{slot}$, for symbols of a downlink transmission part, every $N_{slot}$ symbols are grouped as one scheduling subframe from the start to the end, and a quantity of rest symbols is:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot};$$

where $N_{slot}$ may be 7, 14, or another value, $N_{sym}$ is 56, $N_{GP}$ is a quantity of symbols in the GP, and $N_{ctrl,UL}$ is a quantity of symbols in UL transmission. Herein, the rest $N_{rest}$ symbols are grouped into the last downlink transmission subframe, and are centrally scheduled by DL control of the downlink transmission subframe. In a schematic diagram of a subsequent embodiment, for simple annotation, all control is abbreviated as ctrl. When the value of $N_{slot}$ is 14, $N_{rest}$ is 3, and the new subframe structure is shown in FIG. 5-*a*. The first subframe of the new subframe structure includes 14 symbols marked as DL 1-14. DL 1-14 include a DL ctrl part at the start, and a range of transmission control signaling is from the first symbol to the fourteenth symbol, that is, DL 1-14. The second subframe of the new subframe structure includes 14 symbols marked as DL 15-28, and starts with a DL ctrl part, and a range of transmission control signaling is DL 15-28. The subframe 1 and the subframe 2 in FIG. 5-*a* may be the first downlink transmission subframe in the foregoing embodiment. The third subframe of the new subframe structure includes 17 symbols marked as DL 29-45, starts with a DL ctrl part, and a range of transmission control signaling is DL 29-45. It should be noted that the downlink transmission subframe includes 17 symbols, including 14 symbols and rest $N_{rest}$ symbols, and the 17 symbols are centrally configured by using control signaling of DL ctrl of the third subframe. The subframe 3 in FIG. 5-*a* may be the second downlink transmission subframe in the foregoing embodiment. In the method, DL ctrl may transmit a plurality of types of information, and may be used to transmit control signaling in downlink transmission in the subframe. One purpose is to notify UE of time domain and frequency domain locations, in the subframe, of downlink transmission data corresponding to the UE, or may be used to transmit channel information such as downlink CSI.

In the downlink-dominant self-contained subframe structure in FIG. 5-*a*, the subframe 1 and the subframe 2 may be the first downlink transmission subframe in the foregoing embodiment, and the subframe 3 may be the second downlink transmission subframe in the foregoing embodiment. Transmission directions of the subframe 1, the subframe 2, and the subframe 3 are the same (downlink), and quantities of symbols included in the subframe 1 and the subframe 2 are 14, but a quantity of symbols in the subframe 3 is 17. Therefore, when more symbols need to be transmitted in the self-contained subframe, a length of the subframe 3 may be different from those of the previous two subframes, so as to implement more flexible subframe scheduling.

In some embodiments of the present invention, the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is less than a length of the second uplink transmission subframe, and in the self-contained subframe, the second uplink transmission subframe is located before the first uplink transmission subframe;

the uplink control field includes a first uplink control symbol and a second uplink control symbol, the first uplink control symbol is set at an end part of the first uplink transmission subframe, and the second uplink control symbol is set at an end part of the second uplink transmission subframe;

the GP is set between the downlink control field and the second uplink transmission subframe; and the downlink control field is set at a start part of the self-contained subframe.

For example, in the uplink-dominant self-contained subframe, the uplink control field may be divided into two types of uplink control symbols. An uplink control symbol is set at the start of each of the first uplink transmission subframe and the second uplink transmission subframe, the first uplink control symbol is set at the end part of the first uplink transmission subframe, and the second uplink control symbol is set at the end part of the second uplink transmission subframe, so that an uplink control symbol in each uplink transmission subframe can carry control signaling.

For example, referring to FIG. 5-*b*, a new uplink-dominant subframe structure includes 56 symbols, including three downlink transmission subframes and a GP. According to a preset scheduling unit length $N_{slot}$, for symbols of an uplink transmission part, every $N_{slot}$ symbols are grouped as one scheduling subframe starting from the end to the start, and a quantity of rest symbols is:

$$N_{rest} = (N_{sym} - N_{GP} - N_{ctrl,DL}) - \left\lfloor \frac{N_{sym} - N_{GP} - N_{ctrl,DL}}{N_{slot}} \right\rfloor \times N_{slot};$$

where $N_{slot}$ may be 7, 14, or another value, $N_{sym}$ is 56, $N_{GP}$ is a quantity of symbols in the GP, and $N_{ctrl,DL}$ is a quantity of symbols in DL transmission. Herein, the rest $N_{rest}$ symbols are grouped into the first uplink transmission subframe. The uplink control field is transmitted at the end of each uplink transmission subframe. Uplink control UL ctrl may transmit information such as CSI reporting and UE memory state reporting (Buffer state report). When the value of $N_{slot}$ is 14, $N_{rest}$ is 7, and the new subframe structure is shown in FIG. 5-*b*. A subframe 2 may be the second uplink transmission subframe in the foregoing embodiment, and a subframe 3 may be the first uplink transmission subframe in the foregoing embodiment.

In the uplink-dominant self-contained subframe structure in FIG. 5-*b*, the subframe 2 may be the second downlink transmission subframe in the foregoing embodiment, and the subframe 3 may be the first downlink transmission subframe in the foregoing embodiment. Transmission directions of the subframe 2 and the subframe 3 are the same (both uplink), and a quantity of symbols included in the subframe 2 is 14+7, but a quantity of symbols in the subframe 3 is 14. Therefore, when more symbols need to be transmitted in the self-contained subframe, a length of the subframe 2 may be different from that of the subframe 3, so as to implement more flexible subframe scheduling.

In some embodiments of the present invention, the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is less than a length of the second downlink transmission subframe, and in the self-contained subframe, the second downlink transmission subframe is located after the first downlink transmission subframe;

the downlink control field includes a first-type downlink control field and a second-type downlink control field, the first-type downlink control field is set at a start part of the self-contained subframe, and the first-type downlink control field is set at a start part of the first downlink transmission subframe; and the second-type downlink control field includes a first downlink control symbol and a second downlink control symbol, the first downlink control symbol is set after the first-type downlink control field in the first downlink transmission subframe, and the second downlink control symbol is set at a start part of the second downlink transmission subframe;

the GP is set between the second downlink transmission subframe and the uplink control field; and the uplink control field is set at an end part of the self-contained subframe.

Specifically, the downlink control field may be divided into two levels: the first-type downlink control field and the second-type downlink control field. The first level appears at the start of a new subframe structure, and the second level appears at the start of each subframe, so that a downlink control symbol in each downlink transmission subframe can carry control signaling.

For example, as shown in FIG. 5-c, a new subframe structure designed by using a single numerology includes 56 symbols, including three downlink transmission subframes, a GP, and uplink control. DL control of the new subframe is divided into two levels. The first level appears at the start of the new subframe structure, and the second level appears at the start of each subframe. According to a preset scheduling unit length $N_{slot}$, for symbols of a downlink transmission part, every $N_{slot}$ symbols are grouped as one scheduling subframe starting from the start to the end, and a quantity of rest symbols is:

$$N_{rest} = (N_{sym} - N_{GP} - N_{ctrl, UL}) - \left\lfloor \frac{N_{sym} - N_{GP} - N_{ctrl, UL}}{N_{slot}} \right\rfloor \times N_{slot};$$

where $N^{slot}$ may be 7, 14, or another value, $N_{sym}$ is 56, $N_{GP}$ is a quantity of symbols in the GP, and $N_{ctrl, UL}$ is a quantity of symbols in UL transmission. Herein, the rest $N_{rest}$ symbols are grouped into the last downlink transmission subframe, and are centrally scheduled by DL control of the downlink transmission subframe. In the figure, for simple annotation, all control is abbreviated as ctrl. When the value of $N_{slot}$ is 14, $N_{rest}$ is 3, and the new subframe structure is shown in FIG. 5-c. The first subframe of the new subframe structure includes 14 symbols marked as DL 1-14, and starts with a DL $1^{st}$ ctrl part, used to transmit transmission control signaling that covers the entire 56 symbols. Optionally, the control signaling of this part may transmit a configured ID, used to notify all UEs of a configuration method for the 56 symbols in the new subframe. A DL 2nd ctrl part follows the DL $1^{st}$ ctrl part, and a control signaling range starts from DL 2nd ctrl to the symbol DL 14. The second subframe of the new subframe structure includes 14 symbols marked as DL 15-28, and starts with a DL $2^{nd}$ ctrl part, and a range of transmission control signaling is DL 15-28. The subframe 1 and the subframe 2 may be the first downlink transmission subframe in the foregoing embodiment. The third subframe of the new subframe structure includes 17 symbols marked as DL 29-45, and starts with a DL $2^{nd}$ ctrl part, and a range of transmission control signaling is DL 29-45. The subframe 3 in FIG. 5-c may be the second downlink transmission subframe in the foregoing embodiment. It should be noted that the downlink transmission subframe includes 17 symbols, including 14 symbols and rest $N_{rest}$ symbols, and the 17 symbols are centrally configured by using control signaling of DL $2^{nd}$ ctrl of the third subframe. In the method, DL $2^{nd}$ ctrl may transmit a plurality of types of information, and may be used to transmit control signaling in downlink transmission in the subframe. One purpose is to notify UE of time domain and frequency domain locations, in the subframe, of downlink transmission data corresponding to the UE, or may be used to transmit channel information such as downlink CSI.

In the downlink-dominant self-contained subframe structure in FIG. 5-c, the subframe 1 and the subframe 2 may be the first downlink transmission subframe in the foregoing embodiment, and the subframe 3 may be the second downlink transmission subframe in the foregoing embodiment. Transmission directions of the subframe 1, the subframe 2, and the subframe 3 are the same (downlink), and quantities of symbols included in the subframe 1 and the subframe 2 are 14, but a quantity of symbols in the subframe 3 is 17. Therefore, when more symbols need to be transmitted in the self-contained subframe, a length of the subframe 3 may be different from those of the previous two subframes, so as to implement more flexible subframe scheduling. In addition, in FIG. 5-c, the subframe 1 includes two levels of downlink control: DL $1^{st}$ ctrl and DL $2^{nd}$ ctrl, where DL $1^{st}$ ctrl is used to transmit transmission control signaling that covers the entire 56 symbols, and DL $2^{nd}$ ctrl is used to transmit a transmission control command of the subframe 1.

In some embodiments of the present invention, the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is less than a length of the second uplink transmission subframe, and in the self-contained subframe, the second uplink transmission subframe is located before the first uplink transmission subframe;

the uplink control field includes a first-type uplink control field and a second-type uplink control field, the first-type uplink control field is set at an end part of the self-contained subframe, and the first-type uplink control field is set at an end part of the first uplink transmission subframe; and the second-type uplink control field includes a first uplink control symbol and a second uplink control symbol, the first uplink control symbol is set before the first-type uplink control field in the first uplink transmission subframe, and the second uplink control symbol is set at an end part of the second uplink transmission subframe;

the GP is set between the downlink control field and the second uplink transmission subframe; and the downlink control field is set at a start part of the self-contained subframe.

Specifically, the uplink control field may be divided into two levels: the first-type uplink control field and the second-type uplink control field. The first level appears at the end of a new subframe structure, and the second level appears at the end of each subframe, so that an uplink control symbol in each uplink transmission subframe can carry control signaling.

For example, as shown in FIG. 5-d, a new uplink-dominant subframe structure includes 56 symbols, including three downlink transmission subframes and a GP. According to a preset scheduling unit length $N_{slot}$, for symbols of an uplink transmission part, every $N_{slot}$ symbols are grouped as one scheduling subframe starting from the end to the start, and a quantity of rest symbols is:

$$N_{rest} = (N_{sym} - N_{GP} - N_{ctrl,DL}) - \left\lfloor \frac{N_{sym} - N_{GP} - N_{ctrl,DL}}{N_{slot}} \right\rfloor \times N_{slot};$$

where $N_{slot}$ may be 7, 14, or another value, $N_{sym}$ is 56, $N_{GP}$ is a quantity of symbols in the GP, and $N_{ctrl,DL}$ is a quantity of symbols in DL transmission. Herein, the rest $N_{rest}$ symbols are grouped into the first uplink transmission subframe. Uplink control is transmitted at the end of each uplink transmission subframe. Uplink control UL ctrl is divided into two levels. The first level of uplink control is located at the end of the entire 56 symbols, and may be used to transmit relatively key control information such as an ACK/NACK reply. The second level of uplink control is located at the end of each subframe, and may be used to transmit information such as CSI reporting and UE memory state reporting (Buffer state report). When the value of $N_{slot}$ is 14, $N_{rest}$ is 7, and the new subframe structure is shown in FIG. 5-d. The second level of uplink control may not be transmitted in the third subframe. At the start of the first subframe, the first level of downlink control may indicate uplink and downlink transmission configurations used for the entire 56 symbols. The subframe 2 in FIG. 5-d may be the second uplink transmission subframe in the foregoing embodiment, and the subframe 3 may be the first uplink transmission subframe in the foregoing embodiment.

Further, in some embodiments of the present invention, based on the uplink-dominant self-contained subframe in the foregoing embodiment, the self-contained subframe further includes a downlink transmission subframe, and the downlink control field is set at a start part of the downlink transmission subframe; and the downlink control field includes a first-type downlink control field and a second-type downlink control field, the first-type downlink control field is set at a start part of the self-contained subframe, the first-type downlink control field is set at the start part of the downlink transmission subframe, and the second-type downlink control field is set after the first-type downlink control field in the downlink transmission subframe.

For example, referring to FIG. 5-d, the subframe 1 in FIG. 5-d may be a downlink transmission subframe, a downlink control field is set at a start part of the downlink transmission subframe, and the downlink control field may be divided into two levels: a first-type downlink control field and a second-type downlink control field. The first level appears at the start of the new subframe structure, and the second level appears at the start of each subframe, so that the downlink control field in the downlink transmission subframe can carry control signaling.

In the uplink-dominant self-contained subframe structure in FIG. 5-d, the subframe 2 may be the second downlink transmission subframe in the foregoing embodiment, and the subframe 3 may be the first downlink transmission subframe in the foregoing embodiment. Transmission directions of the subframe 2 and the subframe 3 are the same (both uplink), and a quantity of symbols included in the subframe 2 is 14+7, but a quantity of symbols in the subframe 3 is 14. Therefore, when more symbols need to be transmitted in the self-contained subframe, a length of the subframe 2 may be different from that of the subframe 3, so as to implement more flexible subframe scheduling. In addition, in FIG. 5-d, the subframe 3 includes two levels of uplink control.

In some embodiments of the present invention, the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is equal to a length of the second downlink transmission subframe, and in the self-contained subframe, the second downlink transmission subframe is located after the first downlink transmission subframe;

the downlink control field includes a first-type downlink control field and a second-type downlink control field, the first-type downlink control field is set at a start part of the self-contained subframe, and the first-type downlink control field is set before the first downlink transmission subframe; and the second-type downlink control field includes a first downlink control symbol and a second downlink control symbol, the first downlink control symbol is set at a start part of the first downlink transmission subframe, and the second downlink control symbol is set at a start part of the second downlink transmission subframe;

the GP is set between the second downlink transmission subframe and the uplink control field; and the uplink control field is set at an end part of the self-contained subframe.

The first-type downlink control field in the downlink control field is independent of the first downlink transmission subframe, and the length of the first downlink transmission subframe is equal to the length of the second downlink transmission subframe, so as to facilitate subframe transmission.

For example, referring to FIG. 5-e, a new downlink-dominant subframe structure designed by using a single numerology includes 56 symbols, including DL $1^{st}$ control, three downlink transmission subframes, a GP, and uplink control. According to a preset scheduling unit length $N_{slot}$, starting from the end of DL $1^{st}$ control to the end, for symbols of a downlink transmission part, every $N_{slot}$ symbols are grouped as one scheduling subframe. A quantity of symbols included in DL $1^{st}$ control is:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot};$$

where $N_{slot}$ may be 7, 14, or another value, $N_{sym}$ is 56, $N_{GP}$ is a quantity of symbols in the GP, and $N_{ctrl,UL}$ is a quantity of symbols in UL transmission. Alternatively, a length of DL $1^{st}$ control may be preset in advance, so that after DL $1^{st}$ control, the GP, and UL ctrl are removed, a quantity of rest symbols is exactly an integer multiple of $N_{slot}$. When the value of $N_{slot}$ is 14, $N_{DL, 1st}$ is 3, and the new subframe structure is shown in FIG. 5-e. The DL $1^{st}$ ctrl part is used to transmit transmission control signaling that covers the entire 56 symbols. Optionally, the control signaling of this part may transmit a configured ID, used to notify all UEs of a configuration method for the 56 symbols in the new subframe. The first subframe of the new subframe structure includes 14 symbols marked as DL 4-17, and starts with a DL $2^{nd}$ ctrl part, and a range of transmission control signaling is DL 4-17. The second subframe of the new subframe structure includes 14 symbols marked as DL 18-31, and starts with a DL $2^{nd}$ ctrl part, and a range of transmission control signaling is DL 18-31. The subframe 1 and the subframe 2 may be the first downlink transmission subframe in the foregoing embodiment. The third subframe of the new subframe structure includes 14 symbols marked as DL 32-45, starts with a DL $2^{nd}$ ctrl part, and a range of transmission control signaling is DL 29-45. The subframe 3 may be the second downlink transmission subframe in the foregoing embodiment. In the method, DL $2^{nd}$ ctrl may transmit a plurality of types of information, and may be used to transmit control signaling in downlink transmission in the subframe. One purpose is to notify UE of time domain and frequency domain locations, in the subframe, of downlink transmission data corresponding to the UE, or may be used to transmit channel information such as downlink CSI.

In the downlink-dominant self-contained subframe structure in FIG. 5-*e*, the subframe 1 and the subframe 2 may be the first downlink transmission subframe in the foregoing embodiment. The subframe 3 may be the second downlink transmission subframe in the foregoing embodiment. Transmission directions of the subframe 1, the subframe 2, and the subframe 3 are the same (downlink). Quantities of symbols included in the subframe 1 and the subframe 2 are 14, but a quantity of symbols in the subframe 3 is 14. Lengths of the downlink transmission subframes are the same, so as to facilitate subframe scheduling. In addition, in FIG. 5-*e*, the DL $1^{st}$ ctrl part is used to transmit transmission control signaling that covers the entire 56 symbols, and DL $1^{st}$ ctrl is independent of the subframe 1.

In some embodiments of the present invention, the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is equal to a length of the second uplink transmission subframe, and in the self-contained subframe, the second uplink transmission subframe is located before the first uplink transmission subframe;

the uplink control field includes a first-type uplink control field and a second-type uplink control field, the first-type uplink control field is set at an end part of the self-contained subframe, and the first-type uplink control field is set after the first uplink transmission subframe; and the second-type uplink control field includes a first uplink control symbol and a second uplink control symbol, the first uplink control symbol is set at an end part of the first uplink transmission subframe, and the second uplink control symbol is set at an end part of the second uplink transmission subframe;

the GP is set between the downlink control field and the second uplink transmission subframe; and the downlink control field is set at a start part of the self-contained subframe.

The uplink control field may be divided into two levels: the first-type uplink control field and the second-type uplink control field. The first level appears at the end of a new subframe structure, and the second level appears at the end of each subframe, so that an uplink control symbol in each uplink transmission subframe can carry control signaling.

For example, referring to FIG. 5-*f*, a new uplink-dominant subframe structure includes 56 symbols, including DL $1^{st}$ control, three subframes, a GP, and UL $1^{st}$ control. According to a preset scheduling unit length $N_{slot}$, starting from the end of the GP to UL ctrl, for symbols of an uplink transmission part, every $N_{slot}$ symbols are grouped as one scheduling subframe. Quantities of symbols included in DL $1^{st}$ control and UL $1^{st}$ control may be preset, so that after DL $1^{st}$ control, the GP, and UL $1^{st}$ control are removed, a quantity of rest symbols is exactly an integer multiple of $N_{slot}$. When the value of $N_{slot}$ is 14, $N_{DL, 1st}$ is 3, and the new subframe structure is shown in FIG. 5-*f*. A subframe 2 may be the second uplink transmission subframe in the foregoing embodiment, and a subframe 3 may be the first uplink transmission subframe in the foregoing embodiment.

In the uplink-dominant self-contained subframe structure in FIG. 5-*f*, the subframe 2 may be the second downlink transmission subframe in the foregoing embodiment, and the subframe 3 may be the first downlink transmission subframe in the foregoing embodiment. Transmission directions of the subframe 2 and the subframe 3 are the same (both uplink), and quantities of symbols in the subframe 2 and the subframe 3 are the same, so as to facilitate subframe scheduling. In addition, in FIG. 5-*f*, the UL $1^{st}$ ctrl part is independent of the subframe 3.

Further, in some embodiments of the present invention, based on the uplink-dominant self-contained subframe in the foregoing embodiment, the self-contained subframe further includes a downlink transmission subframe, and the downlink control field is set at a start part of the downlink transmission subframe; and the downlink control field includes a first-type downlink control field and a second-type downlink control field, the first-type downlink control field is set at a start part of the self-contained subframe, the first-type downlink control field is set before the downlink transmission subframe, and the second-type downlink control field is set at the start part of the downlink transmission subframe.

For example, referring to FIG. 5-*f*, a subframe 1 in FIG. 5-*f* may be a downlink transmission subframe, the downlink control field is set at a start part of the downlink transmission subframe, and the downlink control field may be divided into two levels: the first-type downlink control field and the second-type downlink control field. The first level appears at the start of the new subframe structure, and the second level appears at the start of each subframe, so that the downlink control field in the downlink transmission subframe can carry control signaling.

In some embodiments of the present invention, the self-contained subframe is specifically a downlink-dominant self-contained subframe, the self-contained subframe includes M downlink transmission subframes, M is a positive integer, the first transmission subframe is specifically a first downlink transmission subframe in the M downlink transmission subframes, the second transmission subframe is specifically a second downlink transmission subframe in the M downlink transmission subframes, a length of the first downlink transmission subframe is equal to a length of the second downlink transmission subframe, and in the self-contained subframe, the second downlink transmission subframe is located after the first downlink transmission subframe;

the downlink control field is set at a start part of the self-contained subframe, the downlink control field is set before the first downlink transmission subframe, M downlink control symbols are divided from the downlink control field, the M downlink control symbols are respectively corresponding to the M downlink transmission subframes, and each downlink control symbol is used to transmit control signaling of a corresponding downlink transmission subframe;

the GP is set between the second downlink transmission subframe and the uplink control field; and the uplink control field is set at an end part of the self-contained subframe.

Each downlink transmission subframe no longer includes the downlink control symbol; instead, the downlink control field is set at the start part of the self-contained subframe, the downlink control symbols corresponding to the downlink transmission subframes are divided from the downlink control field, and each downlink control symbol is used to transmit control signaling of a corresponding downlink transmission subframe.

Further, in some embodiments of the present invention, M is calculated as follows:

$$M = \left\lfloor \frac{N_{sym} - N_{GP} - N_{ctrl,UL}}{N_{slot} + 1} \right\rfloor;$$

where $N_{sym}$ indicates a quantity of symbols in the self-contained subframe, $N_{GP}$ indicates a quantity of symbols in the GP, $N_{ctrl,UL}$ is a quantity of symbols in the uplink control field, and $N_{slot}$ indicates a quantity of symbols included in one scheduling subframe;

a quantity $N_{ctrl,DL}$ of symbols in the downlink control field is calculated as follows:

$$N_{ctrl,DL} = N_{sym} - N_{GP} - N_{ctrl,UL} - M \times N_{slot};$$

where $N_{sym}$ indicates the quantity of symbols in the self-contained subframe, $N_{GP}$ indicates the quantity of symbols in the GP, is the quantity of symbols in the uplink control field, and $N_{slot}$ indicates a quantity of symbols included in one scheduling subframe.

For example, referring to FIG. 5-g, a new downlink-dominant subframe structure designed by using a single numerology includes 56 symbols, including DL control, M downlink transmission subframes, a GP, and uplink control. A quantity of symbols included in DL control is M. As shown in the foregoing formula, $N_{slot}$ may be 7, 14, or another value, is 56, $N_{GP}$ is a quantity of symbols in the GP, and $N_{ctrl,\ UL}$ is a quantity of symbols transmitted by UL control. According to a preset scheduling unit length $N_{slot}$, starting from the end of DL control to the end, for symbols of a downlink transmission part, every $N_{slot}$ symbols are grouped as one scheduling subframe. The DL ctrl part is used to transmit transmission control signaling that covers the entire 56 symbols. Optionally, the control signaling of this part may transmit a configured ID, used to notify all UEs of a configuration method for the 56 symbols in the new subframe. In addition, M symbols may be divided from the DL ctrl part, are respectively corresponding to the M downlink transmission subframes, and are used to transmit control signaling of the corresponding downlink transmission subframes. For example, the M symbols are used to notify UE of time domain and frequency domain locations, in the subframe, of downlink transmission data corresponding to the UE; or may be used to transmit channel information such as downlink CSI. When the value of $N_{slot}$ is 7, $N_{ctrl,\ DL}$ is 10, M is 5, and the new subframe structure is shown in FIG. 5-g. The first subframe of the new subframe structure includes seven symbols marked as DL 11-17. The second subframe of the new subframe structure includes seven symbols marked as DL 18-24. The third subframe of the new subframe structure includes seven symbols marked as DL 25-31. The fourth subframe of the new subframe structure includes seven symbols marked as DL 32-38. The fifth subframe of the new subframe structure includes seven symbols marked as DL 39-45.

In some embodiments of the present invention, the self-contained subframe is specifically an uplink-dominant self-contained subframe, the self-contained subframe includes M uplink transmission subframes, M is a positive integer, the first transmission subframe is specifically a first uplink transmission subframe in the M uplink transmission subframes, the second transmission subframe is specifically a second uplink transmission subframe in the M uplink transmission subframes, a length of the first uplink transmission subframe is equal to a length of the second uplink transmission subframe, and in the self-contained subframe, the second uplink transmission subframe is located before the first uplink transmission subframe;

the downlink control field is set at a start part of the self-contained subframe, M downlink control symbols are divided from the downlink control field, the M downlink control symbols are respectively corresponding to the M uplink transmission subframes, and each downlink control symbol is used to transmit control signaling of a corresponding uplink transmission subframe;

the GP is set between the downlink control field and the second uplink transmission subframe; and the uplink control field is set at an end part of the self-contained subframe, and the uplink control field is set after the first uplink transmission subframe.

Each uplink transmission subframe no longer includes the uplink control symbol; instead, the downlink control field is set at the start part of the self-contained subframe, and the downlink control field is set at the end part of the self-contained subframe. The uplink control symbols corresponding to the uplink transmission subframes are divided from the uplink control field, and each uplink control symbol is used to transmit control signaling of a corresponding uplink transmission subframe.

For example, referring to FIG. 5-h, a new uplink-dominant subframe structure includes 56 symbols, including DL control, M uplink transmission subframes, a GP, and uplink control. A quantity of symbols included in DL control is:

$$M = \left\lfloor \frac{N_{sym} - N_{GP} - N_{ctrl,UL}}{N_{slot} + 1} \right\rfloor;$$

$$N_{ctrl,DL} = N_{sym} - N_{GP} - N_{ctrl,UL} - M \times N_{slot};$$

where $N_{slot}$ may be 7, 14, or another value, $N_{sym}$ is 56, $N_{GP}$ is a quantity of symbols in the GP, and $N_{ctrl,\ UL}$ is a quantity of symbols transmitted by UL control. According to a preset scheduling unit length $N_{slot}$, starting from the end of the GP to UL ctrl, for symbols of an uplink transmission part, every $N_{slot}$ symbols are grouped as one scheduling subframe. The DL ctrl part is used to transmit transmission control signaling that covers the entire 56 symbols. Optionally, the control signaling of this part may transmit a configured ID, used to notify all UEs of a configuration method for the 56 symbols in the new subframe. In addition, M symbols may be divided from the DL ctrl part, are respectively corresponding to the M uplink transmission subframes, and are used to transmit control signaling of the corresponding uplink transmission subframes. When the value of $N_{slot}$ is 7, $N_{ctrl, DL}$ is 10, $N_{ctrl, UL}$ is 4, M is 5, and the new subframe structure is shown in FIG. 5-$h$.

In the downlink-dominant self-contained subframe structure in FIG. 5-$g$, and the uplink-dominant self-contained subframe structure in FIG. 5-$h$, a control symbol is no longer set in each transmission subframe; instead, a control field is separately set at the start part and the end part of the self-contained subframe. In addition, transmission directions of transmission subframes in the self-contained subframe are the same and are free from power interference from a neighboring frequency band.

In some embodiments of the present invention, the self-contained subframe includes M transmission subframes, M is a positive integer, the M transmission subframes include a downlink transmission subframe and an uplink transmission subframe, a quantity of downlink transmission subframes is N, N is a positive integer, a quantity of uplink transmission subframes is (M−N), a first transmission subframe and a second transmission subframe belong to N downlink transmission subframes, or a first transmission subframe and a second transmission subframe belong to (M−N) uplink transmission subframes, and in the self-contained subframe, the second transmission subframe is located after the first transmission subframe;

the downlink control field is set at a start part of the self-contained subframe, M downlink control symbols are divided from the downlink control field, the M downlink control symbols are respectively corresponding to the N downlink transmission subframes and the (M−N) uplink transmission subframes, and each downlink control symbol is used to transmit control signaling of a corresponding transmission subframe;

the GP is set between the first transmission subframe and the second transmission subframe; and the uplink control field is set at an end part of the self-contained subframe, and the uplink control field is set after the uplink transmission subframe.

The self-contained subframe includes M transmission subframes. The M transmission subframes are further classified into an uplink transmission subframe and a downlink transmission subframe according to subframe transmission directions. Specifically, the foregoing embodiment describes a case in which all the M subframes are uplink or downlink subframes. In actual use, the following time domain arrangement of a frame structure may also occur: DL ctrl at the start, N downlink transmission subframes (N=1, 2, . . . , M) with a subframe length $N_{slot}$, a GP, (M−N) uplink transmission subframes with a subframe length $N_{slot}$, and UL ctrl at the end.

The foregoing embodiment describes the configuration manner of the self-contained subframe in a single numerology. The following describes a configuration manner of a self-contained subframe in a plurality of numerologies. Referring to FIG. 6, a self-contained subframe configuration method provided in an embodiment of the present invention may include the following steps.

601. Obtain, based on a first self-contained subframe that is configured by using a reference transmission type numerology on a neighboring frequency band, configuration information of a second self-contained subframe that is configured by using a current numerology on a current frequency band.

The first self-contained subframe includes a first downlink control DLcontrol field, a first transmission subframe, a first guard period GP, and a first uplink control ULcontrol field; and the second self-contained subframe includes a second transmission subframe, a third transmission subframe, a second guard period, and a second uplink control field, where a downlink control command of the second self-contained subframe is determined based on the first downlink control field, the second transmission subframe or the third transmission subframe of the second self-contained subframe is transmitted in a same subframe transmission direction used during subframe transmission on the neighboring frequency band, or the second transmission subframe or the third transmission subframe of the second self-contained subframe is transmitted in the first guard period of the neighboring frequency band, a subframe transmission direction of the second transmission subframe is the same as a subframe transmission direction of the third transmission subframe, a length of the second transmission subframe is less than or equal to a length of the third transmission subframe, the first GP is set in an interval, in the first self-contained subframe, in which an uplink or downlink transmission direction changes, and the second GP is set in an interval, in the second self-contained subframe, in which an uplink or downlink transmission direction changes.

In some embodiments of the present invention, step 601 of obtaining, based on a first self-contained subframe that is configured by using a reference transmission type numerology on a neighboring frequency band, configuration information of a second self-contained subframe that is configured by using a current numerology on a current frequency band may be specifically as follows: Based on the first self-contained subframe that is configured by using the reference transmission type numerology on the neighboring frequency band, a base station generates the configuration information of the second self-contained subframe that is configured by using the current numerology on the current frequency band; and the base station then notifies UE of the configuration information of the second self-contained subframe. Alternatively, step 601 of obtaining, based on a first self-contained subframe that is configured by using a reference transmission type numerology on a neighboring frequency band, configuration information of a second self-contained subframe that is configured by using a current numerology on a current frequency band may be as follows: Based on the first self-contained subframe that is configured by using the reference transmission type numerology on the neighboring frequency band, UE obtains the configuration information of the second self-contained subframe that is configured by using the current numerology on the current frequency band, so that the UE can parse out the second self-contained subframe structure used by a base station when sending downlink data, and the UE can also use the second self-contained subframe structure when sending uplink data to the base station.

In the second self-contained subframe designed in this embodiment of the present invention, the second self-contained subframe includes the second downlink control field, the second transmission subframe, the third transmission subframe, the second guard period GP, and the second uplink control field. In a subsequent embodiment of the present invention, the DL control field is referred to as DLcontrol, and in a schematic diagram of the subsequent embodiment, the DL control field is further abbreviated as DL ctrl. DL control transmits a DL grant to notify UE of a time domain location or a frequency domain location at which an eNB will transmit downlink data to the UE, so that the UE listens on a corresponding time domain and frequency domain resource. In addition, DL control may further transmit a UL grant to notify UE that the UE should perform uplink transmission on which time domain and frequency domain resources. A UL control part at the end of the subframe includes control signaling fed back by the UE to the eNB. The signaling of this part may be an ACK/NACK reply to downlink data of a current subframe or a previous subframe, or channel related information fed back by the UE such as CSI.

In the second self-contained subframe structure provided in this embodiment of the present invention, the second GP is set in an interval, in the second self-contained subframe, in which uplink and downlink transmission directions change. For example, in the second self-contained subframe structure provided in this embodiment of the present invention, a transmission direction at a start moment is a downlink transmission direction, a GP is designed after transmission of a transmission subframe in the downlink transmission direction, and after the GP, the transmission direction of the second self-contained subframe is adjusted to an uplink transmission direction.

In this embodiment of the present invention, the downlink control command of the second self-contained subframe is determined based on the first downlink control field. Therefore, the downlink control field may no longer be configured in the second self-contained subframe. There is an association relationship between the numerology used by the current frequency band and the reference numerology used by the neighboring frequency band. Therefore, the second self-contained subframe may use the first downlink control field of the first self-contained subframe as a reference to determine a downlink control command of the current frequency band.

In this embodiment of the present invention, the second transmission subframe or the third transmission subframe of the second self-contained subframe is transmitted in the same subframe transmission direction used during subframe transmission on the neighboring frequency band, or the second transmission subframe or the third transmission subframe of the second self-contained subframe is transmitted in the first guard period of the neighboring frequency band. That is, the subframe transmission direction of the second self-contained subframe used by the current frequency band is not affected by transmission of the first self-contained subframe of the neighboring frequency band. For example, when the neighboring frequency band is in an uplink, the transmission direction of the self-contained subframe used by the current frequency band is also in an uplink, or in this case, the self-contained subframe used by the current frequency band is in a guard period. At a moment of uplink subframe transmission on the neighboring frequency band, the self-contained subframe provided in this embodiment of the present invention does not perform downlink transmission. At a moment of downlink subframe transmission on the neighboring frequency band, the self-contained subframe provided in this embodiment of the present invention does not perform uplink transmission. Therefore, the self-contained subframe structure used by the current frequency band provided in this embodiment of the present invention does not cause mutual interference to a subframe of the neighboring frequency band. Therefore, when data transmission is performed according to the self-contained subframe structure designed in this embodiment of the present invention, a problem of mutual interference between neighboring frequency bands can be avoided.

It should be noted that, in the foregoing embodiment of the present invention, in the self-contained subframe proposed in 5G NR, to distinguish between subframes of different types, a self-contained subframe for transmitting downlink data is referred to as a downlink-dominant self-contained subframe, and a self-contained subframe for transmitting uplink data is referred to as an uplink-dominant self-contained subframe. There may be a plurality of specific subframe configuration manners of the downlink-dominant self-contained subframe and the uplink-dominant self-contained subframe in actual application, which are described in detail by using examples in subsequent embodiments. For details, refer to the subsequent embodiments of the present invention for description. In a subsequent embodiment of the present invention, a configuration manner for a self-contained subframe in a plurality of numerologies is further provided. For details, refer to an example in the subsequent embodiment for description.

602. Process, based on the configuration information of the second self-contained subframe, data carried in the second self-contained subframe.

In this embodiment of the present invention, after the configuration information of the second self-contained subframe is obtained, the data carried in the second self-contained subframe can be processed according to a frame structure of the second self-contained subframe. For example, after configuring the configuration information of the second self-contained subframe, the base station sends a frame structure configuration of the second self-contained subframe to the UE, so that the base station can send downlink data to the UE by using the second self-contained subframe, and the UE can receive the downlink data according to the pre-obtained frame structure of the second self-contained subframe. For another example, after obtaining the configuration information of the second self-contained subframe, the UE may send uplink data to the base station by using the second self-contained subframe, and the base station may receive the uplink data according to the pre-configured frame structure of the second self-contained subframe. A specific processing process of the data carried in the second self-contained subframe may be specifically implemented with reference to an application scenario.

It can be learned from the examples of the present invention in the foregoing embodiments that, in the self-contained subframe proposed in 5G NR, to distinguish between different types of subframes, the self-contained subframe for transmitting downlink data is referred to as a downlink-dominant self-contained subframe, and the self-contained subframe for transmitting uplink data is referred to as an uplink-dominant self-contained subframe. However, regardless of the downlink-dominant self-contained subframe or the uplink-dominant self-contained subframe, in transmission on neighboring frequency bands of a plurality of numerologies, transmission of the data carried by the self-contained subframe of the current frequency band is affected by the self-contained subframe of the neighboring frequency band, causing mutual interference between the neighboring frequency bands. In this embodiment of the present invention, in the self-contained subframe structure used by the UE or the eNB, the GP is set in an interval, in the self-contained subframe, in which uplink and downlink transmission directions change. Therefore, uplink data transmission and downlink data transmission may be implemented in the second self-contained subframe. The second transmission subframe or the third transmission subframe of the second self-contained subframe is transmitted in the same subframe transmission direction used during transmission of the first self-contained subframe of the neighboring frequency band, or the second transmission subframe or the third transmission subframe of the second self-contained subframe is transmitted in the guard period of the neighboring frequency band. The second transmission subframe and the third transmission subframe have a same subframe transmission direction. Therefore, at a moment of uplink subframe transmission on the neighboring frequency band, the second self-contained subframe provided in this embodiment of the present invention does not perform downlink transmission; and at a moment of downlink subframe transmission on the neighboring frequency band, the second self-contained subframe provided in this embodiment of the present invention does not perform uplink transmission. Therefore, the second self-contained subframe structure used by the current frequency band provided in this embodiment of the present invention does not cause mutual interference to the subframe of the neighboring frequency band. Therefore, when data transmission is performed according to the second self-contained subframe structure designed in this embodiment of the present invention, a problem of mutual interference between neighboring frequency bands can be avoided. In the self-contained subframe structure in this embodiment of the present invention, the second transmission subframe and the third transmission subframe have the same subframe transmission direction, and the length of the second transmission subframe is less than or equal to the length of the third transmission subframe. Therefore, the second transmission subframe and the third transmission subframe may be configured based on a symbol quantity for specific data that needs to be carried in the second self-contained subframe, so that the third transmission subframe becomes a transmission subframe that can accommodate more types of symbol quantities, to meet a requirement that the self-contained subframe needs to carry different data symbol quantities.

In some embodiments of the present invention, the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe;

the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe;

the second self-contained subframe further includes a second downlink control field, the second downlink control field includes a third downlink control symbol and a fourth downlink control symbol, the third downlink control symbol is set at a start part of the second downlink transmission subframe, and the fourth downlink control symbol is set at a start part of the third downlink transmission subframe; and the third downlink control symbol is aligned with the first downlink control symbol, or the third downlink control symbol is aligned with the second downlink control symbol;

the first GP is set between the first downlink transmission subframe and the first uplink control field, and the first uplink control field is set at an end part of the first self-contained subframe, and the second GP is set between the third downlink transmission subframe and the second uplink control field, and the second uplink control field is set at an end part of the second self-contained subframe.

For example, in the downlink-dominant second self-contained subframe, a downlink control symbol is set at the start of each of the second downlink transmission subframe and the third downlink transmission subframe, the third downlink control symbol is set at the start part of the second downlink transmission subframe, and the fourth downlink control symbol is set at the start part of the third downlink transmission subframe, so that a downlink control symbol in each downlink transmission subframe can carry control signaling.

Specifically, in the present invention, cross-subframe scheduling is designed based on a plurality of self-contained subframes, and first a self-contained cross-subframe structure in a plurality of numerologies is described. For example, referring to FIG. 7-a, the self-contained subframe provided in this embodiment of the present invention is referred to as a "new subframe" in the example below. A new downlink-dominant subframe structure designed by using a plurality of numerologies includes 56 symbols, including three downlink transmission subframes, a GP, and uplink control. DL control of the new subframe is divided into two levels. The first level appears at the start of a reference numerology, and the second level appears at the start of each subframe. The reference numerology herein is usually a numerology with a relatively small subcarrier spacing and a relatively long symbol length. To avoid mutual interference, in another numerology, a configuration of the reference numerology is used to determine a new subframe configuration used by the current numerology. In this case, DL $1^{st}$ control is transmitted at the start of the reference numerology. To perform decoding, UE of another numerology needs to determine, by referring to transmission in the reference numerology, the new subframe configuration used by the current numerology.

According to a preset scheduling unit length $N_{slot}$, for symbols of a downlink transmission part, every $N_{slot}$ symbols are grouped as one scheduling subframe starting from the start to the end, and a quantity of rest symbols is:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot};$$

where $N_{slot}$ may be 7, 14, or another value, $N_{sym}$ is 56, $N_{GP}$ is a quantity of symbols in the GP, and $N_{ctrl,UL}$ is a quantity of symbols in UL transmission. Herein, the rest $N_{rest}$ symbols are grouped into the last downlink transmission subframe, and are centrally scheduled by DL $2^{nd}$ control of the downlink transmission subframe. In FIG. 7-a, for simple annotation, all control is abbreviated as ctrl. When the value of $N_{slot}$ is 14, $N_{ctrl, 1st}$ is 2, $N_{rest}$ is 3, and the new subframe structure is shown in FIG. 7-a. The first subframe of the new subframe structure includes 14 symbols marked as DL 1-14, and starts with a DL $2^{nd}$ ctrl part, and a range of transmission control signaling is from the first symbol to the fourteenth symbol, that is, DL 1-14. The second subframe of the new subframe structure includes 14 symbols marked as DL 15-28, and starts with a DL $2^{nd}$ ctrl part, and a range of transmission control signaling is DL 15-28. The subframe 1 and the subframe 2 in FIG. 7-a may be the second downlink transmission subframe in the foregoing embodiment. The third subframe of the new subframe structure includes 17 symbols marked as DL 9-45, and starts with a DL $2^{nd}$ ctrl part, and a range of transmission control signaling is DL 29-45. It should be noted that the downlink transmission subframe includes 17 symbols, including 14 symbols and rest N$_{rest}$ symbols, and the 17 symbols are centrally configured by using control signaling of DL 2$^{nd}$ ctrl of the third subframe. The subframe 3 in FIG. 7-$a$ may be the third downlink transmission subframe in the foregoing embodiment. In the method, DL 2$^{nd}$ ctrl may transmit a plurality of types of information, and may be used to transmit control signaling in downlink transmission in the subframe. One purpose is to notify UE of time domain and frequency domain locations, in the subframe, of downlink transmission data corresponding to the UE, or may be used to transmit channel information such as downlink CSI.

In some embodiments of the present invention, a difference N$_{rest}$ between the length of the third transmission subframe and the length of the second transmission subframe is calculated as follows:

$$N_{rest} = (N_{sym} - N_{GP} - N_{ctrl,UL} - N_{ctrl,DL} \times 2^m) - \left\lfloor \frac{N_{sym} - N_{GP} - N_{ctrl,UL} - N_{ctrl,DL} \times 2^m}{N_{slot}} \right\rfloor \times N_{slot};$$

where N$_{sym}$ indicates a quantity of symbols in the second self-contained subframe, N$_{GP}$ indicates a quantity of symbols in the second GP, N$_{ctrl,UL}$ is a quantity of symbols in the second uplink control field, N$_{slot}$ indicates a quantity of symbols included in one scheduling subframe, $2^m$ is a ratio of a subcarrier spacing in the current numerology to a subcarrier spacing in the reference numerology, and N$_{ctrl,DL}$ indicates a quantity of symbols in the first downlink control field.

For example, referring to FIG. 7-$b$, a new downlink-dominant subframe structure designed by using a plurality of numerologies includes three downlink transmission subframes, a GP, and uplink control. DL control of the new subframe is divided into two levels. The first level appears at the start of a reference numerology, and the second level appears at the start of each subframe. According to a preset scheduling unit length N$_{slot}$, for symbols of a downlink transmission part, starting from the end of DL 1$^{st}$ ctrl to the end, every N$_{slot}$ symbols are grouped as one scheduling subframe, and a quantity of rest symbols is:

$$N_{rest} = (N_{sym} - N_{GP} - N_{ctrl,UL} - N_{ctrl,1st} \times 2^m) - \left\lfloor \frac{N_{sym} - N_{GP} - N_{ctrl,UL} - N_{ctrl,1st} \times 2^m}{N_{slot}} \right\rfloor \times N_{slot};$$

where N$_{slot}$ may be 7, 14, or another value, N$_{sym}$ is 56, N$_{GP}$ is a quantity of symbols in the GP, N$_{ctrl,UL}$ is a quantity of symbols in UL transmission, and $2^m$ is the ratio of the subcarrier spacing in the current numerology to the subcarrier spacing in the reference numerology. Herein, the rest N$_{rest}$ symbols are grouped into the last downlink transmission subframe, and are centrally scheduled by DL 2$^{nd}$ control of the downlink transmission subframe. In FIG. 7-$b$, for simple annotation, all control is abbreviated as ctrl. When the value of N$_{slot}$ is 14, N$_{ctrl,1st}$ is 2, in is 2, N$_{rest}$ is 9, and the new subframe structure is shown in FIG. 7-$b$. The first subframe of the new subframe structure includes 14 symbols marked as DL 1-14, and starts with a DL 2$^{nd}$ ctrl part, and a range of transmission control signaling is from the first symbol to the fourteenth symbol, that is, DL 1-14. The second subframe of the new subframe structure includes 23 symbols marked as DL 15-37, and starts with a DL 2$^{nd}$ ctrl part, and a range of transmission control signaling is DL 15-37. It should be noted that the downlink transmission subframe includes 23 symbols, including 14 symbols and rest N$_{rest}$ symbols, and the 23 symbols are centrally configured by using control signaling of DL 2$^{nd}$ ctrl of the second subframe. In the method, DL 2$^{nd}$ ctrl may transmit a plurality of types of information, and may be used to transmit control signaling in downlink transmission in the subframe. One purpose is to notify UE of time domain and frequency domain locations, in the subframe, of downlink transmission data corresponding to the UE, or may be used to transmit channel information such as downlink CSI.

In some embodiments of the present invention, the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, and in the second self-contained subframe, the third uplink transmission subframe is located before the second uplink transmission subframe;

the first downlink control field is set at a start part of the first self-contained subframe, and the first downlink control field is set before the first GP;

the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set after the second uplink transmission subframe; and the second-type uplink control field includes a first uplink control symbol and a second uplink control symbol, the first uplink control symbol is set at an end part of the second uplink transmission subframe, the second uplink control symbol is set at an end part of the third uplink transmission subframe, and start moments of the second GP and the first GP are aligned.

For example, referring to FIG. 7-$c$, a new uplink-dominant subframe structure includes downlink control, a GP, two uplink transmission subframes, and uplink control. UL control of the new subframe is divided into two levels. The first level appears at the end of an entire cross-subframe, and may be used to transmit relatively key control information such as an ACK/NACK reply. The second level appears at the end of each subframe, and may be used to transmit information such as CSI reporting and UE memory state reporting (Buffer state report). According to a preset scheduling unit length N$^{slot}$, for symbols of an uplink transmission part, starting from UL 1$^{st}$ control to the GP, every N$_{slot}$ symbols are grouped as one scheduling subframe starting from back to front, and a quantity of rest symbols is:

$$N_{rest} = (N_{sym} - N_{GP} - N_{ctrl,UL} - N_{ctrl,1st} \times 2^m) -$$

$$\left\lfloor \frac{N_{sym} - N_{GP} - N_{ctrl,UL} - N_{ctrl,1st} \times 2^m}{N_{slot}} \right\rfloor \times N_{slot};$$

where $N_{slot}$ may be 7, 14, or another value, $N_{sym}$ is 56, $N_{GP}$ is a quantity of symbols in the GP, $N_{ctrl,UL}$ is a quantity of symbols in UL transmission at the first level, and $2^m$ is a ratio of a subcarrier spacing in the current numerology to a subcarrier spacing in the reference numerology. Herein, the rest $N_{rest}$ symbols are grouped into the first uplink transmission subframe. When $N_{slot}$ is 14, $N_{DL,\ 1st}$ is 2, m is 2, $N_{rest}$ is 9, and the new subframe structure is shown in FIG. 7-c.

It should be noted that, in FIG. 7-b and FIG. 7-c, the self-contained subframes in the first rows in the figures are the first self-contained subframe in the foregoing embodiment, the self-contained subframes in the second rows in the figures are the second self-contained subframe in the foregoing embodiment, the second self-contained subframe does not include a downlink control field, the first self-contained subframe includes a downlink control field, and in the second self-contained subframe, a downlink control command of the second self-contained subframe is determined by using the downlink control field of the first self-contained subframe as a reference.

In some embodiments of the present invention, the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe;

the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe;

the second self-contained subframe further includes a second downlink control field, the second downlink control field includes a first-type downlink control field and a second-type downlink control field, the first-type downlink control field is set at a start part of the second self-contained subframe, and the first-type downlink control field is set before the second downlink transmission subframe; the second-type downlink control field includes a third downlink control symbol and a fourth downlink control symbol, the third downlink control symbol is set at a start part of the second downlink transmission subframe, and the fourth downlink control symbol is set at a start part of the third downlink transmission subframe; and the third downlink control symbol is aligned with the second downlink control symbol;

the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe.

The second self-contained subframe further includes a second downlink control field, and start symbols of the second downlink control field and the first downlink control field are aligned, that is, the third downlink control symbol is aligned with the second downlink control symbol.

For example, referring to FIG. 7-d, a new downlink-dominant subframe structure designed by using a plurality of numerologies includes 56 symbols, including three downlink transmission subframes, a GP, and uplink control. DL control of the new subframe is divided into two levels. The first level appears at the start of the entire subframe, and the second level appears at the start of each subframe. It should be noted that in different numerologies, DL $1^{st}$ control is transmitted at the start of their new subframes, and start duration of the new subframes may be the same in different numerologies. If a capability of UE is sufficient. DL $1^{st}$ control of different numerologies may be separately received, and is combined for decoding to improve reliability of DL $1^{st}$ control. According to a preset scheduling unit length $N_{slot}$, for symbols of a downlink transmission part, starting from the end of DL $1^{st}$ ctrl to the end, every $N_{slot}$ symbols are grouped as one scheduling subframe, and a quantity of rest symbols is:

$$N_{rest} = (N_{sym} - N_{GP} - N_{ctrl,UL} - N_{ctrl,1st} \times 2^m) - \left\lfloor \frac{N_{sym} - N_{GP} - N_{ctrl,UL} - N_{ctrl,1st} \times 2^m}{N_{slot}} \right\rfloor \times N_{slot};$$

where $N_{slot}$ may be 7, 14, or another value, $N_{sym}$ is 56, $N_{GP}$ is a quantity of symbols in the GP, $N_{ctrl,UL}$ is a quantity of symbols in UL transmission, and is a ratio of a subcarrier spacing in the current numerology to a subcarrier spacing in the reference numerology. Herein, the rest $N_{rest}$ symbols are grouped into the last downlink transmission subframe, and are centrally scheduled by DL $2^{nd}$ control of the downlink transmission subframe. In FIG. 7-d, for simple annotation, all control is abbreviated as ctrl. When the value of $N_{slot}$ is 14, $N_{ctrl,\ 1st}$ is 2, m is 2, $N_{rest}$ is 9, and the new subframe structure is shown in FIG. 7-d. The first subframe of the new subframe structure includes 14 symbols marked as DL 1-14, and starts with a DL $2^{nd}$ ctrl part, and a range of transmission control signaling is from the first symbol to the fourteenth symbol, that is, DL 1-14. The second subframe of the new subframe structure includes 23 symbols marked as DL 15-37, and starts with a DL $2^{nd}$ ctrl part, and a range of transmission control signaling is DL 15-37. It should be noted that the downlink transmission subframe includes 23 symbols, including 14 symbols and rest $N_{rest}$ symbols, and the 23 symbols are centrally configured by using control signaling of DL $2^{nd}$ ctrl of the second subframe. In the method, DL $2^{nd}$ ctrl may transmit a plurality of types of information, and may be used to transmit control signaling in downlink transmission in the subframe. One purpose is to notify UE of time domain and frequency domain locations, in the subframe, of downlink transmission data corresponding to the UE, or may be used to transmit channel information such as downlink CSI.

In some embodiments of the present invention, the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, and in the second self-contained subframe, the third uplink transmission subframe is located before the second uplink transmission subframe;

the first downlink control field is set at a start part of the first self-contained subframe, and the first downlink control field is set before the first GP;

the second self-contained subframe further includes a second downlink control field, the second downlink control field is set at a start part of the second self-contained subframe, and the second downlink control field is aligned with the first downlink control field;

the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set after the second uplink transmission subframe; and the second-type uplink control field includes a first uplink control symbol and a second uplink control symbol, the first uplink control symbol is set at an end part of the second uplink transmission subframe, and the second uplink control symbol is set at an end part of the third uplink transmission subframe.

For example, referring to FIG. 7-e, a new uplink-dominant subframe structure includes downlink control, a GP, two uplink transmission subframes, and uplink control. UL control of the new subframe is divided into two levels. The first level appears at the end of an entire cross-subframe, and may be used to transmit relatively key control information such as an ACK/NACK reply. The second level appears at the end of each subframe, and may be used to transmit information such as CSI reporting and UE memory state reporting (Buffer state report). According to a preset scheduling unit length $N_{slot}$, for symbols of an uplink transmission part, starting from UL $1^{st}$ control to the GP, every $N_{slot}$ symbols are grouped as one scheduling subframe starting from back to front, and a quantity of rest symbols is:

$$N_{rest} = (N_{sym} - N_{GP} - N_{ctrl,UL} - N_{ctrl,1st} \times 2^m) - \left\lfloor \frac{N_{sym} - N_{GP} - N_{ctrl,UL} - N_{ctrl,1st} \times 2^m}{N_{slot}} \right\rfloor \times N_{slot};$$

where $N_{slot}$ may be 7, 14, or another value, $N_{sym}$ is 56, $N_{GP}$ is a quantity of symbols in the GP, $N_{ctrl,UL}$ is a quantity of symbols in UL transmission at the first level, and $2^m$ is a ratio of a subcarrier spacing in the current numerology to a subcarrier spacing in the reference numerology. Herein, the rest $N_{rest}$ symbols are grouped into the first uplink transmission subframe. When $N_{slot}$ is 14, $N_{DL,1st}$ is 2, m is 2, $N_{rest}$ is 9, and the new subframe structure is shown in FIG. 7-e.

In some embodiments of the present invention, the first self-contained subframe is specifically a downlink-dominant self-contained subframe, the second self-contained subframe is specifically a downlink-dominant self-contained subframe, the first transmission subframe is specifically a first downlink transmission subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe;

the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe;

the second self-contained subframe further includes a second downlink control field, the second downlink control field includes a first-type downlink control field and a second-type downlink control field, the first-type downlink control field is set at a start part of the second self-contained subframe, and the first-type downlink control field is set at a start part of the second downlink transmission subframe; the second-type downlink control field includes a third downlink control symbol and a fourth downlink control symbol, the third downlink control symbol is set after the first-type downlink control field in the second downlink transmission subframe, and the fourth downlink control symbol is set at a start part of the third downlink transmission subframe; and the first-type downlink control field is aligned with the first downlink control symbol;

the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe.

For example, referring to FIG. 7-f, a new downlink-dominant subframe structure designed by using a plurality of numerologies includes 56 symbols, including three downlink transmission subframes, a GP, and uplink control. DL control of the new subframe is divided into two levels. The first level appears at the start of the entire subframe, and the second level appears at the start of each subframe. It should be noted that in different numerologies, DL $1^{st}$ control is transmitted at the start of their new subframes, and start duration of the new subframes may be the same in different numerologies. According to a preset scheduling unit length $N_{slot}$, for symbols of a downlink transmission part, every $N_{slot}$ symbols are grouped as one scheduling subframe starting from the start of the new subframe to the end, and a quantity of rest symbols is:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot};$$

where $N_{slot}$ may be 7, 14, or another value, $N_{sym}$ is 56, $N_{GP}$ is a quantity of symbols in the GP, and $N_{ctrl,UL}$ is a quantity of symbols in UL transmission. Herein, the rest $N_{rest}$ symbols are grouped into the last downlink transmission subframe, and are centrally scheduled by DL $2^{nd}$ control of the downlink transmission subframe. In the figure, for simple annotation, all control is abbreviated as ctrl. When the value of $N_{slot}$ is 14, $N_{ctrl,1st}$ is 8, $N_{rest}$ is 3, and the new subframe structure is shown in FIG. 7-f. The first subframe of the new subframe structure includes 14 symbols marked as DL 1-14, and starts with a DL $2^{nd}$ ctrl part, and a range of transmission control signaling is from the ninth symbol to the fourteenth symbol, that is, DL 9-14. The second subframe of the new subframe structure includes 14 symbols marked as DL 15-28, and starts with a DL $2^{nd}$ ctrl part, and a range of transmission control signaling is DL 15-28. The third subframe of the new subframe structure includes 17 symbols marked as DL 29-45, and starts with a DL $2^{nd}$ ctrl part, and a range of transmission control signaling is DL 29-45. It should be noted that the downlink transmission subframe includes 17 symbols, including 14 symbols and rest $N_{rest}$ symbols, and the 17 symbols are centrally configured by using control signaling of DL $2^{nd}$ ctrl of the third subframe. In the method, DL $2^{nd}$ ctrl may transmit a plurality of types of information, and may be used to transmit control signaling in downlink transmission in the subframe. One purpose is to notify UE of time domain and frequency domain locations, in the subframe, of downlink transmission data corresponding to the UE, or may be used to transmit channel information such as downlink CSI.

In some embodiments of the present invention, the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, a length of the third uplink transmission subframe is greater than a length of the second uplink transmission subframe, and in the second self-contained subframe, the third uplink transmission subframe is located before the second uplink transmission subframe;

the first downlink control field is set at a start part of the first self-contained subframe, and the first downlink control field is set before the first GP;

the second self-contained subframe further includes a second downlink control field, the second downlink control field is set at a start part of the second self-contained subframe, and the second downlink control field is aligned with the first downlink control field;

the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set at an end part of the second uplink transmission subframe; and the second-type uplink control field includes a first uplink control symbol and a second uplink control symbol, the first uplink control symbol is set before the first-type uplink control field in the second uplink transmission subframe, and the second uplink control symbol is set at an end part of the third uplink transmission subframe.

For example, referring to FIG. 7-g, a new uplink-dominant subframe structure includes 56 symbols, including downlink control, a GP, and two uplink transmission subframes. UL control of the new subframe is divided into two levels. The first level is at the end of the second uplink transmission subframe, and the second level appears at the end of each subframe. It should be noted that in different numerologies, DL control is transmitted at the start of their new subframes, and start duration of the new subframes may be the same in different numerologies. According to a preset scheduling unit length $N_{slot}$, for symbols of a downlink transmission part, every $N_{slot}$ symbols are grouped as one scheduling subframe starting from the end of the new subframe to the start, and a quantity of rest symbols is:

$$N_{rest} = (N_{sym} - N_{GP} - N_{ctrl,DL}) - \left\lfloor \frac{N_{sym} - N_{GP} - N_{ctrl,DL}}{N_{slot}} \right\rfloor \times N_{slot};$$

where $N_{slot}$ may be 7, 14, or another value, $N_{sym}$ is 56, $N_{GP}$ is a quantity of symbols in the GP, and $N_{ctrl,DL}$ is a quantity of symbols in DL control transmission. Herein, the rest $N_{rest}$ symbols are grouped into the first uplink transmission subframe. When the value of $N_{slot}$ is 14, $N_{ctrl, 1st}$ is 8, $N_{rest}$ is 13, and the new subframe structure is shown in FIG. 7-g.

It can be learned from the foregoing examples that a cross-subframe scheduling manner is designed in the present invention, and a self-contained cross-subframe structure in a single numerology is designed in the present invention and includes different control signaling designs and time domain locations of the control signaling in the subframe. A specific self-contained cross-subframe structure is described in the next section in detail. A self-contained cross-subframe structure in a plurality of numerologies is designed in the present invention, and includes a two-level control signaling design, and time domain locations of the two levels of control signaling in the subframe.

For better understanding and implementation of the foregoing solution of the embodiment of the present invention, the following provides detailed description by using a corresponding application scenario as an example.

Next, two embodiments are provided. In each embodiment, downlink-dominant subframe configuration in a single numerology and downlink-dominant subframe configuration in a plurality of numerologies are provided, and detailed descriptions are provided.

First, determining of a GP in a self-contained subframe is described: In a communications system, GP duration between base station sending and base station receiving needs to cover two parts. The first part is a transform time from receiving to sending on a UE device, and is denoted as $T_{transform}$, and the second part is a sum of a time from transmitting a message from a base station to UE and a time from sending a message from the UE to the base station, and is denoted as $T_{round}$. When a base station simultaneously sends a signal to a plurality of UEs, to enable signals sent by different UEs to reach the base station at a same moment, the different UEs have different uplink advance $T_{advance}$. For UE for which there is a relatively long time from the base station to the UE, relatively large uplink advance is used. That is, the UE can send a signal in advance, so as to compensate for a time loss between the base station and the UE and achieve signal synchronization.

In the present invention of the design, the GP may be determined in the following manner. First, the base station broadcasts a maximum supported $T_{round}$, namely, $T_{round}^{max}$; or a maximum supported time advance $T_{round}^{max}$; or broadcasts a quantity $N_{GP,x}$ of symbols occupied by a GP required by a subcarrier spacing $15 \times 2^x$ kHz. For a subcarrier spacing $15 \times 2^y$ kHz, when y<x, a length of the GP is:

$$T_{GP} = \left\lceil \frac{T_{round}^{max} + T_{transform}}{2192T_s/2^y} \right\rceil \times 2192T_s/2^y;$$

$$T_{GP} = \left\lceil \frac{2T_{advance}^{max} + T_{transform}}{2192T_s/2^y} \right\rceil \times 2192T_s/2^y;$$

$$T_{GP} = \left\lceil \frac{N_{GP,n}}{2^{x-y}} \right\rceil \times 2192T_s/2^y.$$

Specifically, $2192\ T_s$ is a time length of one symbol when the subcarrier spacing is 15 kHz, where $1\ T_s=1/(15360*2048)$ second.

In the foregoing manner, it is determined that the time length of the GP is four symbols. When the single numerology is used, it can be calculated that when the value of $N_{slot}$ is 14, $N_{rest}$ is 6, and a configuration is shown in FIG. 7-$h$. When the plurality of numerologies are used, it can be calculated that when the value of $N_{slot}$ is 14, a configuration is shown in FIG. 7-$i$.

The foregoing embodiment illustrates one of manners of obtaining the GP, and provides a configuration manner based on the GP and the most possible new subframe structure. In this embodiment of the present invention, subframes with different symbol quantities may be flexibly configured, and downlink control signaling at a first level and downlink control signaling at a second level are separately used to indicate a DL symbol configuration, so that mutual interference between different numerologies can be effectively avoided, and transmission efficiency with different symbol quantities is improved.

In this embodiment of the present invention, the GP determining method may be achieved by using different coverage areas of a cell. When only $T_{transform}$ and a default value of the uplink advance are included, a GP length at a 60 kHz subcarrier is four symbols. When a coverage area of 15 km is included, the GP length is seven symbols; when 30 km is included, the GP length is 13 symbols; and when the included range is 100 km, the GP length is 40 symbols, which are, for example, shown in Table 1.

| 60 kHz configuration | DL | GP | UL |
| --- | --- | --- | --- |
| 1 | 14 + 14 + 14 + 7 | 4 | 3 |
| 2 | 14 + 14 + 14 | 7 | 7 |
| 3 | 14 + 14 + 14 | 13 | 1 |
| 4 | 14 + 14 + 7 | 4 | 14 + 3 |
| 5 | 14 + 14 + 7 | 7 | 14 |
| 6 | 14 + 14 | 13 | 14 + 1 |
| 7 | 14 + 7 | 4 | 14 + 14 + 3 |
| 8 | 14 + 7 | 7 | 14 + 14 |
| 9 | 14 | 13 | 14 + 14 + 1 |
| 10 | 14 | 40 | 2 |
| 11 | 2 | 40 | 14 |

In the foregoing manner, when an eNB broadcasts ID=1, it is determined that a time length of the GP is four symbols, and a time length of UL is three symbols. When the single numerology is used, it can be calculated that when the value of $N_{slot}$ is 14, $N_{rest}$ is 7, and a configuration is shown in FIG. 7-$j$. When the plurality of numerologies are used, it can be calculated that when the value of $N_{slot}$ is 14, a configuration is shown in FIG. 7-$k$.

In this embodiment of the present invention, two new subframe design methods in a single numerology and in a plurality of numerologies are provided to flexibly schedule symbols of a plurality of subframes and effectively avoid mutual interference between transmission in different numerologies. For example, in the present invention, a new subframe structure in a single numerology is designed and includes different control signaling designs and time domain locations of the control signaling in the subframe. Method 1: Grouping is performed based on a subframe length, and a rest symbol is grouped into an adjacent subframe for unified scheduling. Method 2: Two levels of DL control are used, a length of the first level of DL control is $N_{ctrl,1st}$ and is located at the start, and $N_{rest}$ is grouped into an adjacent subframe for unified scheduling. Method 3: Two levels of DL control are used, the first level of DL control is located at the start, and the rest is grouped based on a subframe length; and the second level of DL control is located at the start of each group. Method 4: Grouping is performed based on $N_{solt}$ to calculate total DL control.

For another example, in the present invention, a new subframe structure in a plurality of numerologies is designed and includes different control signaling designs and time domain locations of the control signaling in the subframe. Method 1: A first level of DL control is transmitted in a reference numerology, and the first level of DL control is not transmitted in another numerology. Method 2: A first level of DL control is transmitted in a reference numerology, and transmission on another numerology begins at the end of the first level of DL control. Method 3: A first level of DL control is transmitted synchronously in a plurality of numerologies. Method 4: A first level of DL control is transmitted in a plurality of numerologies, and the first level of DL control is grouped into the first subframe.

Further, the first level of DL control is used to transmit transmission control signaling that covers entire 56 symbols. Optionally, the control signaling of this part may transmit a configured ID, used to notify all UEs of a configuration method for the 56 symbols in the new subframe. For the plurality of numerologies, if a capability of UE is sufficient, DL $1^{st}$ control of different numerologies may be separately received, and then combined for decoding.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

To better implement the foregoing solutions of the embodiments of the present invention, the following further provides related apparatuses for implementing the foregoing solutions.

Figure 8:
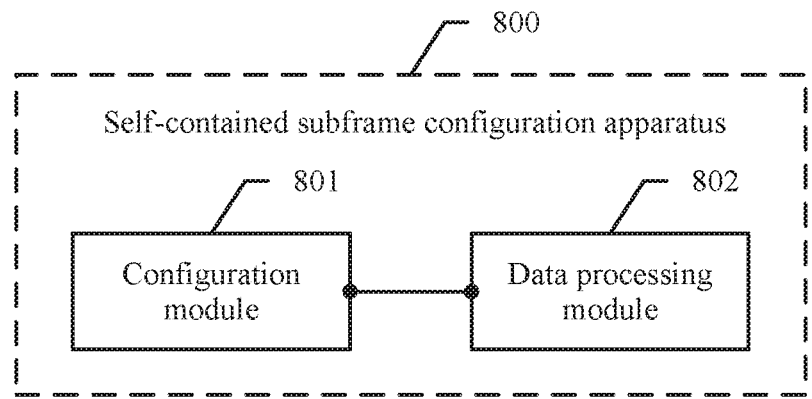
FIG. 8 is a schematic structural diagram of composition of a self-contained subframe configuration apparatus according to an embodiment of the present invention.

Referring to FIG. 8, a self-contained subframe configuration apparatus 800 provided in an embodiment of the present invention may include a configuration module 801 and a data processing module 802.

The configuration module 801 is configured to obtain configuration information of a self-contained subframe of a current frequency band based on a subframe transmission direction of a neighboring frequency band, where the self-contained subframe includes a downlink control DLcontrol field, a first transmission subframe, a second transmission subframe, a guard period GP, and an uplink control ULcontrol field, the first transmission subframe or the second transmission subframe of the self-contained subframe is transmitted in the same subframe transmission direction used during subframe transmission on the neighboring frequency band, or the first transmission subframe or the second transmission subframe of the self-contained subframe is transmitted in a guard period of the neighboring frequency band, the first transmission subframe and the second transmission subframe have a same subframe transmission direction, a length of the first transmission subframe is less than or equal to a length of the second transmission subframe, and the GP is set in an interval, in the self-contained subframe, in which an uplink or downlink transmission direction changes; and the data processing module 802 is configured to process, based on the configuration information of the self-contained subframe, data carried in the self-contained subframe.

In some embodiments of the present invention, the configuration module is specifically configured to configure that the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is less than a length of the second downlink transmission subframe, and in the self-contained subframe, the second downlink transmission subframe is located after the first downlink transmission subframe;

the downlink control field includes a first downlink control symbol and a second downlink control symbol, the first downlink control symbol is set at a start part of the first downlink transmission subframe, and the second downlink control symbol is set at a start part of the second downlink transmission subframe;

the GP is set between the second downlink transmission subframe and the uplink control field; and the uplink control field is set at an end part of the self-contained subframe.

In some embodiments of the present invention, the configuration module is specifically configured to configure a difference $N_{rest}$ between the length of the second transmission subframe and the length of the first transmission subframe to be calculated as follows:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot};$$

where $N_{sym}$ indicates a quantity of symbols in the self-contained subframe, $N_{GP}$ indicates a quantity of symbols in the GP, $N_{ctrl,UL}$ is a quantity of symbols in the uplink control field, and $N_{slot}$ indicates a quantity of symbols included in one scheduling subframe.

In some embodiments of the present invention, the configuration module is specifically configured to configure that the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is less than a length of the second uplink transmission subframe, and in the self-contained subframe, the second uplink transmission subframe is located before the first uplink transmission subframe;

the uplink control field includes a first uplink control symbol and a second uplink control symbol, the first uplink control symbol is set at an end part of the first uplink transmission subframe, and the second uplink control symbol is set at an end part of the second uplink transmission subframe;

the GP is set between the downlink control field and the second uplink transmission subframe; and the downlink control field is set at a start part of the self-contained subframe.

In some embodiments of the present invention, the configuration module is specifically configured to configure that the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is less than a length of the second downlink transmission subframe, and in the self-contained subframe, the second downlink transmission subframe is located after the first downlink transmission subframe;

the downlink control field includes a first-type downlink control field and a second-type downlink control field, the first-type downlink control field is set at a start part of the self-contained subframe, and the first-type downlink control field is set at a start part of the first downlink transmission subframe; and the second-type downlink control field includes a first downlink control symbol and a second downlink control symbol, the first downlink control symbol is set after the first-type downlink control field in the first downlink transmission subframe, and the second downlink control symbol is set at a start part of the second downlink transmission subframe;

the GP is set between the second downlink transmission subframe and the uplink control field; and the uplink control field is set at an end part of the self-contained subframe.

In some embodiments of the present invention, the configuration module is specifically configured to configure that the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is less than a length of the second uplink transmission subframe, and in the self-contained subframe, the second uplink transmission subframe is located before the first uplink transmission subframe;

the uplink control field includes a first-type uplink control field and a second-type uplink control field, the first-type uplink control field is set at an end part of the self-contained subframe, and the first-type uplink control field is set at an end part of the first uplink transmission subframe; and the second-type uplink control field includes a first uplink control symbol and a second uplink control symbol, the first uplink control symbol is set before the first-type uplink control field in the first uplink transmission subframe, and the second uplink control symbol is set at an end part of the second uplink transmission subframe;

the GP is set between the downlink control field and the second uplink transmission subframe; and the downlink control field is set at a start part of the self-contained subframe.

In some embodiments of the present invention, the configuration module is specifically configured to configure that the self-contained subframe further includes a downlink transmission subframe, where the downlink control field is set at a start part of the downlink transmission subframe; and the downlink control field includes a first-type downlink control field and a second-type downlink control field, the first-type downlink control field is set at a start part of the self-contained subframe, the first-type downlink control field is set at a start part of the downlink transmission subframe, and the second-type downlink control field is set after the first-type downlink control field in the downlink transmission subframe.

In some embodiments of the present invention, the configuration module is specifically configured to configure that the self-contained subframe is specifically a downlink-dominant self-contained subframe, the first transmission subframe is specifically a first downlink transmission subframe, the second transmission subframe is specifically a second downlink transmission subframe, a length of the first downlink transmission subframe is equal to a length of the second downlink transmission subframe, and in the self-contained subframe, the second downlink transmission subframe is located after the first downlink transmission subframe;

the downlink control field includes a first-type downlink control field and a second-type downlink control field, the first-type downlink control field is set at a start part of the self-contained subframe, and the first-type downlink control field is set before the first downlink transmission subframe; and the second-type downlink control field includes a first downlink control symbol and a second downlink control symbol, the first downlink control symbol is set at a start part of the first downlink transmission subframe, and the second downlink control symbol is set at a start part of the second downlink transmission subframe;

the GP is set between the second downlink transmission subframe and the uplink control field; and the uplink control field is set at an end part of the self-contained subframe.

In some embodiments of the present invention, the configuration module is specifically configured to configure that the self-contained subframe is specifically an uplink-dominant self-contained subframe, the first transmission subframe is specifically a first uplink transmission subframe, the second transmission subframe is specifically a second uplink transmission subframe, a length of the first uplink transmission subframe is equal to a length of the second uplink transmission subframe, and in the self-contained subframe, the second uplink transmission subframe is located before the first uplink transmission subframe;

the uplink control field includes a first-type uplink control field and a second-type uplink control field, the first-type uplink control field is set at an end part of the self-contained subframe, and the first-type uplink control field is set after the first uplink transmission subframe; and the second-type uplink control field includes a first uplink control symbol and a second uplink control symbol, the first uplink control symbol is set at an end part of the first uplink transmission subframe, and the second uplink control symbol is set at an end part of the second uplink transmission subframe;

the GP is set between the downlink control field and the second uplink transmission subframe; and the downlink control field is set at a start part of the self-contained subframe.

In some embodiments of the present invention, the configuration module is specifically configured to configure that the self-contained subframe further includes a downlink transmission subframe, where the downlink control field is set at a start part of the downlink transmission subframe; and the downlink control field includes a first-type downlink control field and a second-type downlink control field, the first-type downlink control field is set at a start part of the self-contained subframe, the first-type downlink control field is set before the downlink transmission subframe, and the second-type downlink control field is set at a start part of the downlink transmission subframe.

In some embodiments of the present invention, the configuration module is specifically configured to configure that the self-contained subframe is specifically a downlink-dominant self-contained subframe, the self-contained subframe includes M downlink transmission subframes, M is a positive integer, the first transmission subframe is specifically a first downlink transmission subframe in the M downlink transmission subframes, the second transmission subframe is specifically a second downlink transmission subframe in the M downlink transmission subframes, a length of the first downlink transmission subframe is equal to a length of the second downlink transmission subframe, and in the self-contained subframe, the second downlink transmission subframe is located after the first downlink transmission subframe;

the downlink control field is set at a start part of the self-contained subframe, the downlink control field is set before the first downlink transmission subframe, M downlink control symbols are divided from the downlink control field, the M downlink control symbols are respectively corresponding to the M downlink transmission subframes, and each downlink control symbol is used to transmit control signaling of a corresponding downlink transmission subframe;

the GP is set between the second downlink transmission subframe and the uplink control field; and the uplink control field is set at an end part of the self-contained subframe.

In some embodiments of the present invention, the configuration module is specifically configured to configure M to be calculated as follows:

$$M = \left\lfloor \frac{N_{sym} - N_{GP} - N_{ctrl,UL}}{N_{slot} + 1} \right\rfloor;$$

where $N_{sym}$ indicates a quantity of symbols in the self-contained subframe, $N_{GP}$ indicates a quantity of symbols in the GP, $N_{ctrl,UL}$ is a quantity of symbols in the uplink control field, and $N_{slot}$ indicates a quantity of symbols included in one scheduling subframe; and a quantity $N_{ctrl,DL}$ of symbols in the downlink control field is calculated as follows:

$$N_{ctrl,DL} = N_{sym} - N_{GP} - N_{ctrl,UL} - M \times N_{slot};$$

where $N_{sym}$ indicates the quantity of symbols in the self-contained subframe, $N_{GP}$ indicates the quantity of symbols in the GP, $N_{ctrl,UL}$ is the quantity of symbols in the uplink control field, and $N_{slot}$ indicates a quantity of symbols included in one scheduling subframe.

In some embodiments of the present invention, the configuration module is specifically configured to configure that the self-contained subframe is specifically an uplink-dominant self-contained subframe, the self-contained subframe includes M uplink transmission subframes, M is a positive integer, the first transmission subframe is specifically a first uplink transmission subframe in the M uplink transmission subframes, the second transmission subframe is specifically a second uplink transmission subframe in the M uplink transmission subframes, a length of the first uplink transmission subframe is equal to a length of the second uplink transmission subframe, and in the self-contained subframe, the second uplink transmission subframe is located before the first uplink transmission subframe;

the downlink control field is set at a start part of the self-contained subframe, M downlink control symbols are divided from the downlink control field, the M downlink control symbols are respectively corresponding to the M uplink transmission subframes, and each downlink control symbol is used to transmit control signaling of a corresponding uplink transmission subframe;

the GP is set between the downlink control field and the second uplink transmission subframe; and the uplink control field is set at an end part of the self-contained subframe, and the uplink control field is set after the first uplink transmission subframe.

In some embodiments of the present invention, the configuration module is specifically configured to configure that the self-contained subframe includes M transmission subframes, M is a positive integer, the M transmission subframes include a downlink transmission subframe and an uplink transmission subframe, a quantity of downlink transmission subframes is N, N is a positive integer, a quantity of uplink transmission subframes is (M−N), the first transmission subframe and the second transmission subframe belong to the N downlink transmission subframes, or the first transmission subframe and the second transmission subframe belong to the (M−N) uplink transmission subframes, and in the self-contained subframe, the second transmission subframe is located after the first transmission subframe;

the downlink control field is set at a start part of the self-contained subframe, M downlink control symbols are divided from the downlink control field, the M downlink control symbols are respectively corresponding to the N downlink transmission subframes and the (M−N) uplink transmission subframes, and each downlink control symbol is used to transmit control signaling of a corresponding transmission subframe;

the GP is set between the first transmission subframe and the second transmission subframe; and the uplink control field is set at an end part of the self-contained subframe, and the uplink control field is set after the uplink transmission subframe.

The following describes another self-contained subframe configuration apparatus provided in an embodiment of the present invention, and the apparatus may include a configuration module and a data processing module.

The configuration module is configured to configure obtaining of, based on a first self-contained subframe that is configured on a neighboring frequency band by using a reference transmission type numerology, configuration information of a second self-contained subframe that is configured on a current frequency band by using a current numerology, where the first self-contained subframe includes a first downlink control DLcontrol field, a first transmission subframe, a first guard period GP, and a first uplink control ULcontrol field; and the second self-contained subframe includes a second transmission subframe, a third transmission subframe, a second guard period, and a second uplink control field, where a downlink control command of the second self-contained subframe is determined based on the first downlink control field, the second transmission subframe or the third transmission subframe of the second self-contained subframe is transmitted in a same subframe transmission direction used during subframe transmission on the neighboring frequency band, or the second transmission subframe or the third transmission subframe of the second self-contained subframe is transmitted in the first guard period of the neighboring frequency band, a subframe transmission direction of the second transmission subframe is the same as a subframe transmission direction of the third transmission subframe, a length of the second transmission subframe is less than or equal to a length of the third transmission subframe, the first GP is set in an interval, in the first self-contained subframe, in which an uplink or downlink transmission direction changes, and the second GP is set in an interval, in the second self-contained subframe, in which an uplink or downlink transmission direction changes; and the data processing module is configured to process, based on the configuration information of the second self-contained subframe, data carried in the second self-contained subframe.

In some embodiments of the present invention, the configuration module is specifically configured to: configure that the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe;

the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe;

the second self-contained subframe further includes a second downlink control field, the second downlink control field includes a third downlink control symbol and a fourth downlink control symbol, the third downlink control symbol is set at a start part of the second downlink transmission subframe, and the fourth downlink control symbol is set at a start part of the third downlink transmission subframe; and the third downlink control symbol is aligned with the first downlink control symbol, or the third downlink control symbol is aligned with the second downlink control symbol;

the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe.

In some embodiments of the present invention, the configuration module is specifically configured to configure a difference $N_{rest}$ between the length of the third transmission subframe and the length of the second transmission subframe to be calculated as follows:

$$N_{rest} = (N_{sym} - N_{GP} - N_{ctrl,UL} - N_{ctrl,DL} \times 2^m) - \left\lfloor \frac{N_{sym} - N_{GP} - N_{ctrl,UL} - N_{ctrl,DL} \times 2^m}{N_{slot}} \right\rfloor \times N_{slot};$$

where $N_{sym}$ indicates a quantity of symbols in the second self-contained subframe, $N_{GP}$ indicates a quantity of symbols in the second GP, $N_{ctrl,UL}$ is a quantity of symbols in the second uplink control field, $N_{slot}$ indicates a quantity of symbols included in one scheduling subframe, $2^m$ is a ratio of a subcarrier spacing in the current numerology to a subcarrier spacing in the reference numerology, and $N_{ctrl,DL}$ indicates a quantity of symbols in the first downlink control field.

In some embodiments of the present invention, the configuration module is specifically configured to configure that the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, and in the second self-contained subframe, the third uplink transmission subframe is located before the second uplink transmission subframe;

the first downlink control field is set at a start part of the first self-contained subframe, and the first downlink control field is set before the first GP;

the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set after the second uplink transmission subframe; and the second-type uplink control field includes a first uplink control symbol and a second uplink control symbol, the first uplink control symbol is set at an end part of the second uplink transmission subframe, the second uplink control symbol is set at an end part of the third uplink transmission subframe, and start moments of the second GP and the first GP are aligned.

In some embodiments of the present invention, the configuration module is specifically configured to: configure that the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe;

the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe;

the second self-contained subframe further includes a second downlink control field, the second downlink control field includes a first-type downlink control field and a second-type downlink control field, the first-type downlink control field is set at a start part of the second self-contained subframe, and the first-type downlink control field is set before the second downlink transmission subframe; the second-type downlink control field includes a third downlink control symbol and a fourth downlink control symbol, the third downlink control symbol is set at a start part of the second downlink transmission subframe, and the fourth downlink control symbol is set at a start part of the third downlink transmission subframe; and the third downlink control symbol is aligned with the second downlink control symbol;

the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe.

In some embodiments of the present invention, the configuration module is specifically configured to configure that the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, and in the second self-contained subframe, the third uplink transmission subframe is located before the second uplink transmission subframe;

the first downlink control field is set at a start part of the first self-contained subframe, and the first downlink control field is set before the first GP;

the second self-contained subframe further includes a second downlink control field, the second downlink control field is set at a start part of the second self-contained subframe, and the second downlink control field is aligned with the first downlink control field;

the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set after the second uplink transmission subframe; and the second-type uplink control field includes a first uplink control symbol and a second uplink control symbol, the first uplink control symbol is set at an end part of the second uplink transmission subframe, and the second uplink control symbol is set at an end part of the third uplink transmission subframe.

In some embodiments of the present invention, the configuration module is specifically configured to: configure that the first self-contained subframe is specifically a downlink-dominant self-contained subframe, the first transmission subframe is specifically a first downlink transmission subframe, the second self-contained subframe is specifically a downlink-dominant self-contained subframe, the second transmission subframe is specifically a second downlink transmission subframe, the third transmission subframe is specifically a third downlink transmission subframe, a length of the second downlink transmission subframe is less than a length of the third downlink transmission subframe, and in the second self-contained subframe, the third downlink transmission subframe is located after the second downlink transmission subframe;

the first downlink control field includes a first downlink control symbol and a second downlink control symbol, the first downlink control symbol is set at a start part of the first self-contained subframe, the first downlink control symbol is set before the first downlink transmission subframe, and the second downlink control symbol is set at a start part of the first downlink transmission subframe;

the second self-contained subframe further includes a second downlink control field, the second downlink control field includes a first-type downlink control field and a second-type downlink control field, the first-type downlink control field is set at a start part of the second self-contained subframe, and the first-type downlink control field is set at a start part of the second downlink transmission subframe; the second-type downlink control field includes a third downlink control symbol and a fourth downlink control symbol, the third downlink control symbol is set after the first-type downlink control field in the second downlink transmission subframe, and the fourth downlink control symbol is set at a start part of the third downlink transmission subframe; and the first-type downlink control field is aligned with the first downlink control symbol;

the first GP is set between the first downlink transmission subframe and the first uplink control field, and the first uplink control field is set at an end part of the first self-contained subframe; and the second GP is set between the third downlink transmission subframe and the second uplink control field, and the second uplink control field is set at an end part of the second self-contained subframe.

In some embodiments of the present invention, the configuration module is specifically configured to: configure that the first self-contained subframe is specifically an uplink-dominant self-contained subframe, the first transmission subframe is specifically a first uplink transmission subframe, the second self-contained subframe is specifically an uplink-dominant self-contained subframe, the second transmission subframe is specifically a second uplink transmission subframe, the third transmission subframe is specifically a third uplink transmission subframe, a length of the third uplink transmission subframe is greater than a length of the second uplink transmission subframe, and in the second self-contained subframe, the third uplink transmission subframe is located before the second uplink transmission subframe;

the first downlink control field is set at a start part of the first self-contained subframe, and the first downlink control field is set before the first GP;

the second self-contained subframe further includes a second downlink control field, the second downlink control field is set at a start part of the second self-contained subframe, and the second downlink control field is aligned with the first downlink control field;

the first GP is set between the first downlink control field and the first uplink transmission subframe, the first uplink control field is set at an end part of the first self-contained subframe, and the first uplink control field is set after the first uplink transmission subframe; and the second GP is set before the third uplink transmission subframe, the second uplink control field includes a first-type uplink control field and a second-type uplink control field, the first-type uplink control field is set at an end part of the second self-contained subframe, and the first-type uplink control field is set at an end part of the second uplink transmission subframe; and the second-type uplink control field includes a first uplink control symbol and a second uplink control symbol, the first uplink control symbol is set before the first-type uplink control field in the second uplink transmission subframe, and the second uplink control symbol is set at an end part of the third uplink transmission subframe.

It should be noted that content such as information exchange between the modules/units of the apparatus and the execution processes thereof is based on the same idea as the method embodiments of the present invention, and produces the same technical effects as the method embodiments of the present invention. For the specific content, reference may be made to the foregoing description in the method embodiments of the present invention, and the details are not described herein again.

An embodiment of the present invention further provides a computer storage medium, where the computer storage medium stores a program, and executing the program includes a part or all of the steps described in the foregoing method embodiments.

Figure 9:
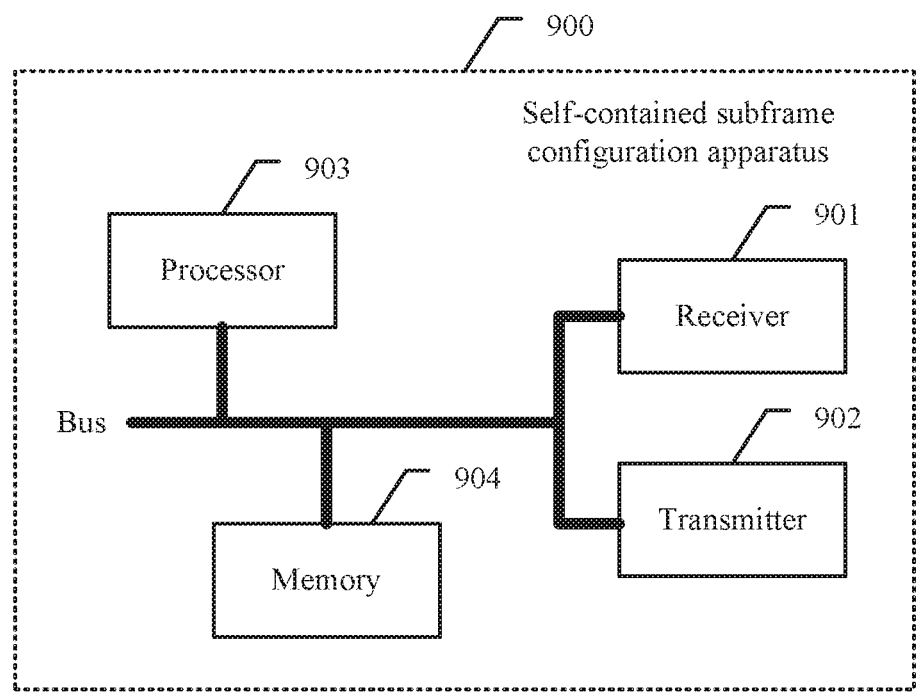
FIG. 9 is a schematic structural diagram of composition of another self-contained subframe configuration apparatus according to an embodiment of the present invention.

The following describes another self-contained subframe configuration apparatus provided in an embodiment of the present invention. Referring to FIG. 9, the self-contained subframe configuration apparatus 900 includes:

a receiver 901, a transmitter 902, a processor 903, and a memory 904 (there may be one or more processors 903 in the self-contained subframe configuration apparatus 900, and one processor is used as an example in FIG. 9). In some embodiments of the present invention, the receiver 901, the transmitter 902, the processor 903, and the memory 904 may be connected by using a bus or in another manner, and that they are connected by using a bus is used as an example in FIG. 9.

The memory 904 may include a read-only memory and a random access memory, and provide an instruction and data to the processor 903. A part of the memory 904 may further include a nonvolatile random access memory (English full name: Nonvolatile Random Access Memory, NVRAM for short). The memory 904 stores an operating system and an operation instruction, an executable module or a data structure, or a subset thereof, or an extended set thereof. The operation instruction may include various operation instructions, so as to implement various operations. The operating system may include various system programs, so as to implement various basic services and process hardware-based tasks.

The processor 903 controls an operation of the self-contained subframe configuration apparatus, and the processor 903 may be further referred to as a central processing unit (English full name: Central Processing Unit, CPU for short). In a specific application, components are coupled together by using a bus system. The bus system may further include a power bus, a control bus, a status signal bus, and the like, in addition to a data bus. However, for clear description, various types of buses in the figure are marked as the bus system.

The methods disclosed in the foregoing embodiments of the present invention may be applied to the processor 903, or implemented by the processor 903. The processor 903 may be an integrated circuit chip and has a signal processing capability. In an implementation process, steps in the foregoing methods can be implemented by using a hardware integrated logical circuit in the processor 903, or by using instructions in a form of software. The processor 903 may be a general purpose processor, a digital signal processor (English full name: digital signal processor, DSP for short), an application-specific integrated circuit (English full name: Application Specific Integrated Circuit, ASIC for short), a field programmable gate array (English full name: Field Programmable Gate Array, FPGA for short) or another programmable logical device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 904, and the processor 903 reads information in the memory 904 and completes the steps in the foregoing methods in combination with hardware of the processor.

In this embodiment of the present invention, the processor 903 is configured to execute the self-contained subframe configuration method described in the foregoing embodiment, where a frame structure of a configured self-contained subframe is stored in the memory 904. For details, refer to the frame structure configuration process of the self-contained subframe in the foregoing embodiment, and details are not described herein again.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. Person of ordinary skill in the art may understand and implement the embodiments of the present invention without creative efforts.

Based on the description of the foregoing implementations, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation in most cases. Based on such an understanding, the technical solutions of the present invention essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

In conclusion, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A self-contained subframe configuration apparatus, comprising:
   a processor; and
   a memory configured to store instructions executable by the processor to cause the self-contained subframe configuration apparatus to:
   obtain configuration information of a self-contained subframe of a current frequency band based on a subframe transmission direction of a neighboring frequency band, wherein the self-contained subframe comprises M transmission subframes, wherein M is a positive integer, wherein the M transmission subframes comprise a downlink transmission subframe, a downlink control (DLcontrol) field, an uplink transmission subframe, a first transmission subframe, a second transmission subframe, a guard period (GP), and an uplink control (ULcontrol) field, wherein a quantity of downlink transmission subframes is N, wherein N is a positive integer, wherein a quantity of uplink transmission subframes is (M−N), wherein the first transmission subframe and the second transmission subframe belong to one of the N downlink transmission subframes or the (M−N) uplink transmission subframes, wherein, in the self-contained subframe, the second transmission subframe is located after the first transmission subframe, wherein the DLcontrol field is set at a start part of the self-contained subframe, wherein M DLcontrol symbols are divided from the DLcontrol field, wherein the M DLcontrol symbols respectively correspond to the N downlink transmission subframes and the (M−N) uplink transmission subframes, wherein the first transmission subframe or the second transmission subframe is transmitted in a subframe transmission direction used during subframe transmission on the neighboring frequency band or in a guard period of the neighboring frequency band, wherein the first transmission subframe and the second transmission subframe have a same subframe transmission direction, wherein a first length of the first transmission subframe is less than or equal to a second length of the second transmission subframe, and wherein the GP is set in an interval in the self-contained subframe in which an uplink or downlink transmission direction changes; and
   process, based on the configuration information, data carried in the self-contained subframe.

2. The self-contained subframe configuration apparatus of claim 1, wherein the self-contained subframe is a downlink-dominant self-contained subframe, wherein the first transmission subframe is a first downlink transmission subframe, wherein the second transmission subframe is a second downlink transmission subframe, wherein, in the self-contained subframe, the second downlink transmission subframe is located after the first downlink transmission subframe, wherein the DLcontrol field comprises a first DLcontrol symbol and a second DLcontrol symbol, wherein the first DLcontrol symbol is set at a start part of the first downlink transmission subframe, wherein the second DLcontrol symbol is set at a start part of the second downlink transmission subframe, wherein the GP is set between the second downlink transmission subframe and the ULcontrol field, and wherein the ULcontrol field is set at an end part of the self-contained subframe.

3. The self-contained subframe configuration apparatus according to of claim 1, wherein a difference $N_{rest}$ between the second length and the first length is calculated as follows:

$$N_{rest} = (N_{sym} - N_{GP} - N_{ctrl,UL}) - \left\lfloor \frac{N_{sym} - N_{GP} - N_{ctrl,UL}}{N_{slot}} \right\rfloor \times N_{slot},$$

wherein $N_{sym}$ indicates a quantity of symbols in the self-contained subframe, wherein $N_{GP}$ indicates a quantity of symbols in the GP, wherein $N_{ctrl,UL}$ indicates a quantity of symbols in the ULcontrol field, and wherein $N_{slot}$ indicates a quantity of symbols comprised in one scheduling subframe.

4. The self-contained subframe configuration apparatus according to of claim 1, wherein the self-contained subframe is an uplink-dominant self-contained subframe, wherein the first transmission subframe is a first uplink transmission subframe, wherein the second transmission subframe is a second uplink transmission subframe, wherein, in the self-contained subframe, the second uplink transmission subframe is located before the first uplink transmission subframe, wherein the ULcontrol field comprises a first ULcontrol symbol and a second ULcontrol symbol, wherein the first ULcontrol symbol is set at an end part of the first uplink transmission subframe, wherein the second ULcontrol symbol is set at an end part of the second uplink transmission subframe, wherein the GP is set between the DLcontrol field and the second uplink transmission subframe, and wherein the DLcontrol field is set at a start part of the self-contained subframe.

5. The self-contained subframe configuration apparatus according to of claim 1, wherein the self-contained subframe is a downlink-dominant self-contained subframe, wherein the first transmission subframe is a first downlink transmission subframe, wherein the second transmission subframe is a second downlink transmission subframe, wherein, in the self-contained subframe, the second downlink transmission subframe is located after the first downlink transmission subframe, wherein the DLcontrol field comprises a first-type DLcontrol field and a second-type DLcontrol field, wherein the first-type DLcontrol field is set at a start part of the first downlink transmission subframe, wherein the second-type DLcontrol field comprises a first DLcontrol symbol and a second DLcontrol symbol, wherein the first DLcontrol symbol is set after the first-type DLcontrol field in the first downlink transmission subframe, wherein the second DLcontrol symbol is set at a start part of the second downlink transmission subframe, wherein the GP is set between the second downlink transmission subframe and the ULcontrol field, and wherein the ULcontrol field is set at an end part of the self-contained subframe.

6. The self-contained subframe configuration apparatus according to of claim 1, wherein the self-contained subframe is an uplink-dominant self-contained subframe, wherein the first transmission subframe is a first uplink transmission subframe, wherein the second transmission subframe is a second uplink transmission subframe, wherein, in the self-contained subframe, the second uplink transmission subframe is located before the first uplink transmission subframe, wherein the ULcontrol field comprises a first-type ULcontrol field and a second-type ULcontrol field, wherein the first-type ULcontrol field is set at an end part of the first uplink transmission subframe, wherein the second-type ULcontrol field comprises a first ULcontrol symbol and a second ULcontrol symbol, wherein the first ULcontrol symbol is set before the first-type ULcontrol field in the first uplink transmission subframe, wherein the second ULcontrol symbol is set at an end part of the second uplink transmission subframe, wherein the GP is set between the DLcontrol field and the second uplink transmission subframe, and wherein the DLcontrol field is set at a start part of the self-contained subframe.

7. The self-contained subframe configuration apparatus according to of claim 6, wherein the self-contained subframe further comprises a downlink transmission subframe, wherein the DLcontrol field is set at a start part of the downlink transmission subframe, wherein the DLcontrol field comprises a first-type DLcontrol field and a second-type DLcontrol field, wherein the first-type DLcontrol field is set at the start part of the downlink transmission subframe, and wherein the second-type DLcontrol field is set after the first-type DLcontrol field in the downlink transmission subframe.

8. The self-contained subframe configuration apparatus according to of claim 1, wherein the self-contained subframe is a downlink-dominant self-contained subframe, wherein the first transmission subframe is a first downlink transmission subframe, wherein the second transmission subframe is a second downlink transmission subframe, wherein the first length is equal to the second length, wherein, in the self-contained subframe, the second downlink transmission subframe is located after the first downlink transmission subframe, wherein the DLcontrol field comprises a first-type DLcontrol field and a second-type DLcontrol field, wherein the first-type DLcontrol field is set at a start part of the self-contained subframe, wherein the first-type DLcontrol field is set before the first downlink transmission subframe, wherein the second-type DLcontrol field comprises a first DLcontrol symbol and a second DLcontrol symbol, wherein the first DLcontrol symbol is set at a start part of the first downlink transmission subframe, wherein the second DLcontrol symbol is set at a start part of the second downlink transmission subframe, wherein the GP is set between the second downlink transmission subframe and the ULcontrol field, and wherein the ULcontrol field is set at an end part of the self-contained subframe.

9. The self-contained subframe configuration apparatus according to of claim 1, wherein the self-contained subframe is an uplink-dominant self-contained subframe, wherein the first transmission subframe is a first uplink transmission subframe, wherein the second transmission subframe is a second uplink transmission subframe, wherein the first length is equal to the second length, wherein, in the self-contained subframe, the second uplink transmission subframe is located before the first uplink transmission subframe, wherein the ULcontrol field comprises a first-type ULcontrol field and a second-type ULcontrol field, wherein the first-type ULcontrol field is set at an end part of the self-contained subframe, wherein the first-type ULcontrol field is set after the first uplink transmission subframe, wherein the second-type ULcontrol field comprises a first ULcontrol symbol and a second ULcontrol symbol, wherein the first ULcontrol symbol is set at an end part of the first uplink transmission subframe, wherein the second ULcontrol symbol is set at an end part of the second uplink transmission subframe, wherein the GP is set between the DLcontrol field and the second uplink transmission subframe, and wherein the DLcontrol field is set at a start part of the self-contained subframe.

10. The self-contained subframe configuration apparatus according to of claim 9, wherein the self-contained subframe further comprises a downlink transmission subframe, wherein the DLcontrol field is set at a start part of the downlink transmission subframe, wherein the DLcontrol field comprises a first-type DLcontrol field and a second-type DLcontrol field, wherein the first-type DLcontrol field is set at the start part of the self-contained subframe, wherein the first-type DLcontrol field is set before the downlink transmission subframe, and wherein the second-type DLcontrol field is set at the start part of the downlink transmission subframe.

11. The self-contained subframe configuration apparatus according to of claim 1, wherein the self-contained subframe is a downlink-dominant self-contained subframe, wherein the self-contained subframe comprises M downlink transmission subframes, wherein M is a positive integer, wherein the first transmission subframe is a first downlink transmission subframe in the M downlink transmission subframes, wherein the second transmission subframe is a second downlink transmission subframe in the M downlink transmission subframes, wherein the first length is equal to the second length, wherein, in the self-contained subframe, the second downlink transmission subframe is located after the first downlink transmission subframe, wherein the DLcontrol field is set at a start part of the self-contained subframe, wherein the DLcontrol field is set before the first downlink transmission subframe, wherein M DLcontrol symbols are divided from the DLcontrol field, wherein the M DLcontrol symbols respectively correspond to the M downlink transmission subframes, wherein each DLcontrol symbol is configured to transmit control signaling of a corresponding downlink transmission subframe, wherein the GP is set between the second downlink transmission subframe and the ULcontrol field, and wherein the ULcontrol field is set at an end part of the self-contained subframe.

12. The self-contained subframe configuration apparatus of claim 11, wherein M is calculated as follows:

$$M = \left\lfloor \frac{N_{sym} - N_{GP} - N_{ctrl,UL}}{N_{slot} + 1} \right\rfloor,$$

wherein $N_{sym}$ indicates a quantity of symbols in the self-contained subframe, wherein $N_{GP}$ indicates a quantity of symbols in the GP, wherein $N_{ctrl,UL}$ indicates a quantity of symbols in the ULcontrol field, wherein $N_{slot}$ indicates a quantity of symbols comprised in one scheduling subframe, and wherein a quantity $N_{ctrl,DL}$ of symbols in the DLcontrol field is calculated as follows:

$$N_{ctrl,DL} = N_{sym} - N_{GP} - N_{ctrl,UL} - M \times N_{slot}.$$

13. The self-contained subframe configuration apparatus of claim 1, wherein the self-contained subframe is an uplink-dominant self-contained subframe, wherein the self-contained subframe comprises M uplink transmission subframes, wherein M is a positive integer, wherein the first transmission subframe is a first uplink transmission subframe in the M uplink transmission subframes, wherein the second transmission subframe is a second uplink transmission subframe in the M uplink transmission subframes, wherein the first length is equal to the second length, wherein, in the self-contained subframe, the second uplink transmission subframe is located before the first uplink transmission subframe, wherein the DLcontrol field is set at a start part of the self-contained subframe, wherein M DLcontrol symbols are divided from the DLcontrol field, wherein the M DLcontrol symbols respectively correspond to the M uplink transmission subframes, wherein each DLcontrol symbol is configured to transmit control signaling of a corresponding uplink transmission subframe, wherein the GP is set between the DLcontrol field and the second uplink transmission subframe, wherein the ULcontrol field is set at an end part of the self-contained subframe, and wherein the ULcontrol field is set after the first uplink transmission subframe.

14. The self-contained subframe configuration apparatus of claim 1, wherein each DLcontrol symbol is configured to transmit control signaling of a corresponding transmission subframe, wherein the GP is set between the first transmission subframe and the second transmission subframe, wherein the ULcontrol field is set at an end part of the self-contained subframe, and wherein the ULcontrol field is set after the uplink transmission subframe.

15. A computer program product comprising instructions stored on a non-transitory medium and that, when executed by a processor, cause an apparatus to:
obtain configuration information of a self-contained subframe of a current frequency band based on a subframe transmission direction of a neighboring frequency band, wherein the self-contained subframe comprises M transmission subframes, wherein M is a positive integer, wherein the M transmission subframes comprise a downlink transmission subframe, a downlink control (DLcontrol) field, an uplink transmission subframe, a first transmission subframe, a second transmission subframe, a guard period (GP), and an uplink control (ULcontrol) field, wherein a quantity of downlink transmission subframes is N, wherein N is a positive integer, wherein a quantity of uplink transmission subframes is (M−N), wherein the first transmission subframe and the second transmission subframe belong to one of the N downlink transmission subframes or the (M−N) uplink transmission subframes, wherein, in the self-contained subframe, the second transmission subframe is located after the first transmission subframe, wherein the DLcontrol field is set at a start part of the self-contained subframe, wherein M DLcontrol symbols are divided from the DLcontrol field, wherein the M DLcontrol symbols respectively correspond to the N downlink transmission subframes and the (M−N) uplink transmission subframes, wherein the first transmission subframe or the second transmission subframe is transmitted in a subframe transmission direction used during subframe transmission on the neighboring frequency band or in a guard period of the neighboring frequency band, wherein the first transmission subframe and the second transmission subframe have a same subframe transmission direction, wherein a first length of the first transmission subframe is less than or equal to a second length of the second transmission subframe, and wherein the GP is set in an interval in the self-contained subframe in which an uplink or downlink transmission direction changes; and process, based on the configuration information, data carried in the self-contained subframe.

16. The computer program product of claim 15, wherein the self-contained subframe is a downlink-dominant self-contained subframe, wherein the first transmission subframe is a first downlink transmission subframe, wherein the second transmission subframe is a second downlink transmission subframe, wherein, in the self-contained subframe, the second downlink transmission subframe is located after the first downlink transmission subframe, wherein the DLcontrol field comprises a first DLcontrol symbol and a second DLcontrol symbol, wherein the first DLcontrol symbol is set at a start part of the first downlink transmission subframe, wherein the second DLcontrol symbol is set at a start part of the second downlink transmission subframe, wherein the GP is set between the second downlink transmission subframe and the ULcontrol field, and wherein the ULcontrol field is set at an end part of the self-contained subframe.

17. The computer program product of claim 15, wherein a difference $N_{rest}$ between the second length and the first length is calculated as follows:

$$N_{rest} = (N_{sym} - N_{GP} - N_{ctrl,UL} - N_{ctrl,DL} \times 2^m) - \left\lfloor \frac{N_{sym} - N_{GP} - N_{ctrl,UL} - N_{ctrl,DL} \times 2^m}{N_{slot}} \right\rfloor \times N_{slot},$$

wherein $N_{sym}$ indicates a quantity of symbols in the self-contained subframe, wherein $N_{GP}$ indicates a quantity of symbols in the GP, wherein $N_{ctrl,UL}$ indicates a quantity of symbols in the ULcontrol field, and wherein $N_{slot}$ indicates a quantity of symbols comprised in one scheduling subframe.

18. The computer program product of claim 15, wherein the self-contained subframe is an uplink-dominant self-contained subframe, wherein the first transmission subframe is a first uplink transmission subframe, wherein the second transmission subframe is a second uplink transmission subframe, wherein, in the self-contained subframe, the second uplink transmission subframe is located before the first uplink transmission subframe, wherein the ULcontrol field comprises a first ULcontrol symbol and a second ULcontrol symbol, wherein the first ULcontrol symbol is set at an end part of the first uplink transmission subframe, wherein the second ULcontrol symbol is set at an end part of the second uplink transmission subframe, wherein the GP is set between the DLcontrol field and the second uplink transmission subframe, and wherein the DLcontrol field is set at a start part of the self-contained subframe.

19. The computer program product of claim 15, wherein the self-contained subframe is a downlink-dominant self-contained subframe, wherein the first transmission subframe is a first downlink transmission subframe, wherein the second transmission subframe is a second downlink transmission subframe, wherein, in the self-contained subframe, the second downlink transmission subframe is located after the first downlink transmission subframe, wherein the DLcontrol field comprises a first-type DLcontrol field and a second-type DLcontrol field, wherein the first-type DLcontrol field is set at a start part of the first downlink transmission subframe, wherein the second-type DLcontrol field comprises a first DLcontrol symbol and a second DLcontrol symbol, wherein the first DLcontrol symbol is set after the first-type DLcontrol field in the first downlink transmission subframe, wherein the second DLcontrol symbol is set at a start part of the second downlink transmission subframe, wherein the GP is set between the second downlink transmission subframe and the ULcontrol field, and wherein the ULcontrol field is set at an end part of the self-contained subframe.

20. The computer program product of claim 15, wherein the self-contained subframe is a downlink-dominant self-contained subframe, wherein the self-contained subframe comprises M downlink transmission subframes, wherein M is a positive integer, wherein the first transmission subframe is a first downlink transmission subframe in the M downlink transmission subframes, wherein the second transmission subframe is a second downlink transmission subframe in the M downlink transmission subframes, wherein the first length is equal to the second length, wherein, in the self-contained subframe, the second downlink transmission subframe is located after the first downlink transmission subframe, wherein the DLcontrol field is set at a start part of the self-contained subframe, wherein the DLcontrol field is set before the first downlink transmission subframe, wherein M DLcontrol symbols are divided from the DLcontrol field, wherein the M DLcontrol symbols respectively correspond to the M downlink transmission subframes, wherein each DLcontrol symbol is configured to transmit control signaling of a corresponding downlink transmission subframe, wherein the GP is set between the second downlink transmission subframe and the ULcontrol field, and wherein the ULcontrol field is set at an end part of the self-contained subframe.

* * * * *

UNITED STATES PATENT AND TRADEMARK OFFICE
CERTIFICATE OF CORRECTION

PATENT NO. : 11,595,164 B2
APPLICATION NO. : 16/333113
DATED : February 28, 2023
INVENTOR(S) : Yun Liu et al.

It is certified that error appears in the above-identified patent and that said Letters Patent is hereby corrected as shown below:

In the Claims

Claim 3, Column 61, Line 17: "according to of claim 1" should read "of claim 1"

Claim 4, Column 61, Line 33: "according to of claim 1" should read "of claim 1"

Claim 5, Column 61, Line 50: "according to of claim 1" should read "of claim 1"

Claim 6, Column 62, Line 6: "according to of claim 1" should read "of claim 1"

Claim 7, Column 62, Line 25: "according to of claim 6" should read "of claim 6"

Claim 8, Column 62, Line 36: "according to of claim 1" should read "of claim 1"

Claim 9, Column 62, Line 59: "according to of claim 1" should read "of claim 1"

Claim 10, Column 63, Line 16: "according to of claim 9" should read "of claim 9"

Claim 11, Column 63, Line 27: "according to of claim 1" should read "of claim 1"

Claim 17, Column 65, Line 30: "$(N_{sym}-N_{GP}-N_{ctrl,UL}-N_{ctrl,DL}\times 2^m)$" should read "$(N_{sym}-N_{GP}-N_{ctrl,UL})$"

Claim 17, Column 65, Line 31: "$N_{sym}-N_{GP}-N_{ctrl,UL}-N_{ctrl,DL}\times 2^m$" should read "$N_{sym}-N_{GP}-N_{ctrl,UL}$"

Signed and Sealed this
Eleventh Day of April, 2023

Katherine Kelly Vidal
*Director of the United States Patent and Trademark Office*